US007767781B2

(12) United States Patent
Phelps et al.

(10) Patent No.: US 7,767,781 B2
(45) Date of Patent: *Aug. 3, 2010

(54) PREPARATION OF LOW-ACID POLYALKYLENE TEREPHTHALATE AND PREPARATION OF MACROCYCLIC POLYESTER OLIGOMER THEREFROM

(75) Inventors: Peter D. Phelps, Williamstown, MA (US); Gary R. Faler, Glenville, NY (US)

(73) Assignee: Cyclics Corporation, Schenectady, NY (US)

(*) Notice: Subject to any disclaimer, the term of this patent is extended or adjusted under 35 U.S.C. 154(b) by 576 days.

This patent is subject to a terminal disclaimer.

(21) Appl. No.: 11/388,768

(22) Filed: Mar. 24, 2006

(65) Prior Publication Data
US 2006/0235185 A1 Oct. 19, 2006

Related U.S. Application Data

(63) Continuation-in-part of application No. 11/351,679, filed on Feb. 10, 2006, now Pat. No. 7,309,756, which is a continuation of application No. 10/999,212, filed on Nov. 29, 2004, now Pat. No. 7,022,806, which is a continuation of application No. 10/373,666, filed on Feb. 24, 2003, now Pat. No. 6,855,798, which is a continuation of application No. 09/945,233, filed on Aug. 31, 2001, now Pat. No. 6,525,164.

(60) Provisional application No. 60/665,648, filed on Mar. 25, 2005, provisional application No. 60/229,894, filed on Sep. 1, 2000.

(51) Int. Cl.
C08G 63/00 (2006.01)
C08G 63/02 (2006.01)

(52) U.S. Cl. .................... 528/272; 528/271; 528/274; 528/279; 528/480; 528/483

(58) Field of Classification Search .................. 528/272, 528/274, 279, 271, 480, 481, 483
See application file for complete search history.

(56) References Cited

U.S. PATENT DOCUMENTS

| | | | |
|---|---|---|---|
| 2,628,171 A | 2/1953 | Green | |
| 3,018,272 A | 1/1962 | Griffing et al. | |
| 3,090,753 A | 5/1963 | Matuszak et al. | |
| 3,786,067 A | 1/1974 | Throckmorton et al. | |
| 3,859,246 A | 1/1975 | Jackson, Jr. et al. | |
| 3,964,923 A | 6/1976 | Zetmeir | |
| 3,979,354 A | 9/1976 | Dyckman et al. | |
| 4,012,460 A | 3/1977 | Takahashi | |
| 4,056,514 A * | 11/1977 | Strehler et al. ............... | 528/274 |
| 4,063,009 A | 12/1977 | Ziegler et al. | |
| 4,075,319 A | 2/1978 | Dyckman et al. | |
| 4,082,709 A | 4/1978 | Dyckman et al. | |
| 4,101,600 A | 7/1978 | Zhukov et al. | |
| 4,115,468 A | 9/1978 | Antonov et al. | |
| 4,118,432 A | 10/1978 | Kabanov et al. | |
| 4,129,548 A | 12/1978 | McDonnell | |
| 4,140,669 A | 2/1979 | Phipps, Jr. et al. | |
| 4,165,305 A | 8/1979 | Sundie et al. | |
| 4,187,197 A | 2/1980 | Kabanov et al. | |
| 4,230,824 A | 10/1980 | Nodelman | |
| 4,232,087 A | 11/1980 | Trask | |
| 4,233,232 A | 11/1980 | Howarth | |
| 4,235,825 A | 11/1980 | Milam | |
| 4,341,842 A | 7/1982 | Lampe | |
| 4,377,684 A | 3/1983 | Bolon et al. | |
| 4,409,266 A | 10/1983 | Wieczorrek et al. | |
| 4,461,854 A | 7/1984 | Smith | |
| 4,478,963 A | 10/1984 | McGarry | |
| 4,518,283 A | 5/1985 | Gebauer et al. | |
| 4,520,123 A | 5/1985 | Hall | |
| 4,525,565 A | 6/1985 | Laisney et al. | |
| 4,535,102 A | 8/1985 | Kusumoto et al. | |
| 4,547,531 A | 10/1985 | Waknine | |
| 4,559,262 A | 12/1985 | Cogswell et al. | |
| 4,568,703 A | 2/1986 | Ashida | |
| 4,584,254 A | 4/1986 | Nakayama et al. | |
| 4,590,259 A | 5/1986 | Kosky et al. | |
| 4,591,624 A | 5/1986 | Hall | |
| 4,605,731 A | 8/1986 | Evans et al. | |
| 4,616,077 A | 10/1986 | Silva | |

(Continued)

FOREIGN PATENT DOCUMENTS

BE 676324 6/1966

(Continued)

OTHER PUBLICATIONS

"Rompp-Chemielexikon," 1992, Thieme 6, XP002343043.
Ahjopalo, L. et al. (2000) "Cyclic Oligomers in Saturated Polyesters," *Polymer*, vol. 41, No. 23, 8283-8290.
Bagshaw et al., "*Templating of Mesoporous Molecular Sieves by Nonionic Polyethylene Oxide Surfactants*," Science, 269, p. 1242, Sep. 1, 1995.
Beach, A. Christopher G. "The Preparation of Mirrors by Sputtering Metals onto Glass Surfaces," *A. Inst. P.*, Chelsea Polytechnic, M.S. received, Mar. 17, 1930.
Brunelle (1995) "*Macrocycles for the Synthesis of High Molecular Weight Polymers*," pp. 197-235, ch. 6, New Methods of Polymer Synthesis: vol. 2, edited by J.R. Ebdon and G.C. Eastmond.

(Continued)

*Primary Examiner*—Terressa M Boykin
(74) *Attorney, Agent, or Firm*—Goodwin Procter LLP

(57) ABSTRACT

The invention provides methods and systems for manufacturing low-acid polyalkylene terephthalate, for example, polybutylene terephthalate (PBT). The invention also provides methods and systems for preparing macrocyclic polyester oligomer (MPO) from low-acid polyalkylene terephthalate. Finally, the invention provides methods and systems for preparing MPO via reaction of a diol and a dialkyl ester in an organic solvent to form non-isolated, low-acid polyalkylene terephthalate which undergoes cyclization (depolymerization) to form MPO.

38 Claims, 14 Drawing Sheets

U.S. PATENT DOCUMENTS

| | | | |
|---|---|---|---|
| 4,638,077 A | 1/1987 | Brunelle et al. |
| 4,644,053 A | 2/1987 | Brunelle et al. |
| 4,647,633 A | 3/1987 | Kostelnik |
| 4,672,003 A | 6/1987 | Letoffe |
| 4,680,345 A | 7/1987 | Kobayashi et al. |
| 4,725,666 A | 2/1988 | Curatolo et al. |
| 4,727,134 A | 2/1988 | Brunelle et al. |
| 4,740,583 A | 4/1988 | Brunelle et al. |
| 4,757,132 A | 7/1988 | Brunelle et al. |
| 4,785,060 A | 11/1988 | Nagler |
| 4,803,288 A | 2/1989 | Kitamura et al. |
| 4,812,524 A | 3/1989 | Baghdachi |
| 4,816,548 A | 3/1989 | Evans et al. |
| 4,824,595 A | 4/1989 | Richter et al. |
| 4,829,144 A | 5/1989 | Brunelle et al. |
| 4,831,001 A | 5/1989 | Evans et al. |
| 4,845,178 A | 7/1989 | Hostetler et al. |
| 4,852,591 A | 8/1989 | Wisotzki et al. |
| 4,880,848 A | 11/1989 | Ghali |
| 4,888,411 A | 12/1989 | Shannon et al. |
| 4,889,885 A | 12/1989 | Usuki et al. |
| 4,889,903 A | 12/1989 | Baghdachi |
| 4,900,706 A | 2/1990 | Sasaki et al. |
| 4,904,810 A | 2/1990 | Brunelle et al. |
| 4,909,846 A | 3/1990 | Barfurth et al. |
| 4,927,728 A | 5/1990 | Isoda et al. |
| 4,942,198 A | 7/1990 | Dickerhof et al. |
| 4,960,915 A | 10/1990 | Thiele |
| 4,980,453 A | 12/1990 | Brunelle et al. |
| 4,992,228 A | 2/1991 | Heck et al. |
| 4,994,541 A | 2/1991 | Dell et al. |
| 4,999,420 A | 3/1991 | Leitz et al. |
| 5,006,637 A | 4/1991 | Guggenheim et al. |
| 5,019,450 A | 5/1991 | Cogswell et al. |
| 5,023,346 A | 6/1991 | Schon et al. |
| 5,039,717 A | 8/1991 | Kawakami et al. |
| 5,039,783 A | 8/1991 | Brunelle et al. |
| 5,051,482 A | 9/1991 | Tepic |
| 5,071,711 A | 12/1991 | Heck et al. |
| 5,095,088 A | 3/1992 | Wang |
| 5,097,008 A | 3/1992 | Krabbenhoft et al. |
| 5,116,900 A | 5/1992 | Flautt et al. |
| 5,124,427 A | 6/1992 | Potter et al. |
| 5,159,024 A | 10/1992 | Brindopke et al. |
| 5,175,228 A | 12/1992 | Wang et al. |
| 5,191,013 A | 3/1993 | Cook et al. |
| 5,191,038 A | 3/1993 | Krabbenhoft et al. |
| 5,196,055 A | 3/1993 | Lesney et al. |
| 5,202,386 A | 4/1993 | Hogt et al. |
| 5,207,850 A | 5/1993 | Parekh |
| 5,214,158 A | 5/1993 | Brunelle et al. |
| 5,225,129 A | 7/1993 | van den Berg |
| 5,231,161 A | 7/1993 | Brunelle et al. |
| 5,235,018 A | 8/1993 | Potter et al. |
| 5,237,042 A * | 8/1993 | Kim et al. .................. 528/279 |
| 5,241,880 A | 9/1993 | Mizobata et al. |
| RE34,431 E | 11/1993 | Brunelle et al. |
| 5,260,376 A | 11/1993 | Nakahata et al. |
| 5,264,548 A | 11/1993 | Brunelle et al. |
| 5,281,669 A | 1/1994 | Kambour et al. |
| 5,288,837 A | 2/1994 | Munjal et al. |
| 5,300,392 A | 4/1994 | Odell et al. |
| 5,300,393 A | 4/1994 | Odell et al. |
| 5,300,590 A | 4/1994 | Cook et al. |
| 5,302,484 A | 4/1994 | Odell et al. |
| 5,314,779 A | 5/1994 | Odell et al. |
| 5,321,117 A | 6/1994 | Brunelle |
| 5,340,909 A | 8/1994 | Doerr et al. |
| 5,348,985 A | 9/1994 | Pearce et al. |
| 5,349,040 A | 9/1994 | Trinks et al. |
| 5,350,726 A | 9/1994 | Shaffer |
| 5,350,819 A | 9/1994 | Shaffer |
| 5,356,984 A | 10/1994 | Carbone et al. |
| 5,386,037 A | 1/1995 | Takekoshi et al. |
| 5,387,666 A | 2/1995 | Takekoshi et al. |
| 5,389,719 A | 2/1995 | Takekoshi et al. |
| 5,407,984 A | 4/1995 | Brunelle et al. |
| 5,408,001 A | 4/1995 | Nakahata et al. |
| 5,410,014 A | 4/1995 | Haese et al. |
| 5,418,303 A | 5/1995 | Shaffer |
| 5,420,226 A | 5/1995 | Hamer et al. |
| 5,426,156 A | 6/1995 | Bederke et al. |
| 5,434,244 A | 7/1995 | Warner et al. |
| 5,439,996 A | 8/1995 | Baird et al. |
| 5,444,146 A | 8/1995 | Potter et al. |
| 5,446,122 A | 8/1995 | Warner et al. |
| 5,448,001 A | 9/1995 | Baird |
| 5,466,744 A | 11/1995 | Evans et al. |
| 5,498,651 A | 3/1996 | Brunelle |
| 5,506,316 A | 4/1996 | Shaffer |
| 5,506,328 A | 4/1996 | Chandalia et al. |
| 5,508,343 A | 4/1996 | Holley |
| 5,516,879 A | 5/1996 | Yuo et al. |
| 5,519,108 A | 5/1996 | Yuo et al. |
| 5,525,673 A | 6/1996 | Nakahata et al. |
| 5,527,976 A | 6/1996 | Takekoshi et al. |
| 5,530,052 A | 6/1996 | Takekoshi et al. |
| 5,591,800 A | 1/1997 | Takekoshi et al. |
| 5,605,979 A | 2/1997 | Priddy, Jr. et al. |
| 5,610,260 A | 3/1997 | Schmalstieg et al. |
| 5,637,655 A | 6/1997 | Priddy, Jr. et al. |
| 5,646,306 A | 7/1997 | Elsasser, Jr. |
| 5,648,454 A | 7/1997 | Brunelle |
| 5,654,395 A | 8/1997 | Jackson, Jr. et al. |
| 5,656,712 A | 8/1997 | Mirossay |
| 5,661,214 A | 8/1997 | Brunelle et al. |
| 5,663,282 A | 9/1997 | Todt et al. |
| 5,668,186 A | 9/1997 | Brunelle et al. |
| 5,693,722 A | 12/1997 | Priddy, Jr. et al. |
| 5,700,888 A | 12/1997 | Hall |
| 5,703,183 A | 12/1997 | Shaffer |
| 5,707,439 A | 1/1998 | Takekoshi et al. |
| 5,710,086 A | 1/1998 | Brunelle et al. |
| 5,736,621 A | 4/1998 | Simon et al. |
| 5,756,644 A | 5/1998 | Hodge et al. |
| 5,760,161 A | 6/1998 | Goins, Jr. et al. |
| 5,786,440 A | 7/1998 | Kohler et al. |
| 5,795,423 A | 8/1998 | Johnson |
| 5,830,541 A | 11/1998 | Carswell et al. |
| 5,849,255 A | 12/1998 | Sawyer et al. |
| 5,849,830 A | 12/1998 | Tsipursky et al. |
| 5,869,586 A | 2/1999 | Riedel et al. |
| 5,900,474 A * | 5/1999 | Wang et al. .................. 528/272 |
| 5,936,029 A | 8/1999 | Hall |
| 5,947,392 A | 9/1999 | Molnar et al. |
| 5,952,455 A | 9/1999 | Yanagisawa et al. |
| 5,965,686 A | 10/1999 | Blank et al. |
| 5,968,642 A | 10/1999 | Saito |
| 6,074,978 A | 6/2000 | Shaffer |
| 6,078,135 A | 6/2000 | Lee et al. |
| 6,080,834 A | 6/2000 | Putzig et al. |
| 6,084,019 A | 7/2000 | Matayabas, Jr. et al. |
| 6,093,765 A | 7/2000 | Cottis |
| 6,121,466 A | 9/2000 | Osterholt et al. |
| 6,124,412 A | 9/2000 | Bin-Taleb et al. |
| 6,127,436 A | 10/2000 | Chatterjee et al. |
| 6,147,026 A | 11/2000 | Setiabudi et al. |
| 6,162,857 A | 12/2000 | Trexler, Jr. et al. |
| 6,171,995 B1 | 1/2001 | Muhlebach et al. |
| 6,191,318 B1 | 2/2001 | Park et al. |
| 6,211,316 B1 | 4/2001 | Seebach |
| 6,271,317 B1 | 8/2001 | Halasa et al. |
| 6,284,868 B1 | 9/2001 | Geprags et al. |
| 6,297,330 B1 | 10/2001 | Burch, Jr. et al. |

| | | | | | | |
|---|---|---|---|---|---|---|
| 6,353,030 B1 | 3/2002 | Prikoszovich et al. | | EP | 264835 B1 | 6/1992 |
| 6,369,157 B1 | 4/2002 | Winckler et al. | | EP | 0499747 | 8/1992 |
| 6,376,026 B1 | 4/2002 | Correll et al. | | EP | 235741 B1 | 1/1993 |
| 6,414,103 B1 | 7/2002 | Correll et al. | | EP | 543492 A1 | 5/1993 |
| 6,420,047 B2 | 7/2002 | Winckler et al. | | EP | 0566313 A2 | 10/1993 |
| 6,420,048 B1 | 7/2002 | Wang | | EP | 589640 A1 | 3/1994 |
| 6,432,486 B1 | 8/2002 | Paris et al. | | EP | 598604 A1 | 5/1994 |
| 6,436,548 B1 | 8/2002 | Phelps | | EP | 601753 A1 | 6/1994 |
| 6,436,549 B1 | 8/2002 | Wang | | EP | 635512 A1 | 1/1995 |
| 6,458,972 B1 | 10/2002 | Surburg et al. | | EP | 655476 A1 | 5/1995 |
| 6,472,500 B2 | 10/2002 | Dhawan et al. | | EP | 436186 B1 | 10/1995 |
| 6,525,164 B2 | 2/2003 | Faler | | EP | 688778 A1 | 12/1995 |
| 6,586,558 B2 | 7/2003 | Schmidt et al. | | EP | 0714926 A2 | 6/1996 |
| 6,639,009 B2 | 10/2003 | Winckler et al. | | EP | 699701 A3 | 9/1996 |
| 6,646,134 B2 | 11/2003 | Brugel | | EP | 0776927 | 6/1997 |
| 6,670,429 B2 | 12/2003 | Appelman et al. | | EP | 0798336 A2 | 10/1997 |
| 6,713,601 B2 | 3/2004 | Phelps | | EP | 1008629 | 6/2000 |
| 6,787,632 B2 | 9/2004 | Phelps et al. | | EP | 1026203 | 8/2000 |
| 6,806,346 B2 | 10/2004 | Brugel | | EP | 1111012 A9 | 6/2001 |
| 6,831,138 B2 | 12/2004 | Wang | | EP | 1172409 | 1/2002 |
| 6,855,798 B2 | 2/2005 | Faler | | EP | 0594385 | 5/2003 |
| 6,906,147 B2 | 6/2005 | Wang et al. | | EP | 1308208 | 5/2003 |
| 6,960,626 B2 | 11/2005 | Takekoshi et al. | | EP | 1354908 | 10/2003 |
| 6,962,968 B2 | 11/2005 | Phelps et al. | | EP | 1378540 | 1/2004 |
| 6,994,914 B2 | 2/2006 | Winckler et al. | | EP | 1420036 | 5/2004 |
| 7,022,806 B2 | 4/2006 | Faler | | EP | 1475402 | 11/2004 |
| 7,071,291 B2 | 7/2006 | Thompson et al. | | FR | 2 530 628 | 1/1984 |
| 7,151,143 B2 | 12/2006 | Wang et al. | | GB | 765597 | 1/1957 |
| 7,186,666 B2 | 3/2007 | Wang et al. | | GB | 798412 | 7/1958 |
| 7,196,160 B2 | 3/2007 | Dion et al. | | GB | 957841 | 5/1964 |
| 7,230,044 B2 | 6/2007 | Takekoshi et al. | | GB | 991020 | 5/1965 |
| 7,256,241 B2 | 8/2007 | Takekoshi et al. | | GB | 1044205 | 9/1966 |
| 7,304,123 B2 | 12/2007 | Thompson et al. | | GB | 1108921 | 4/1968 |
| 7,309,756 B2 | 12/2007 | Faler | | GB | 1273225 | 5/1972 |
| 7,329,703 B2 | 2/2008 | Dion et al. | | GB | 1349324 | 4/1974 |
| 2002/0028904 A1 | 3/2002 | Dhawan et al. | | GB | 2123405 A | 2/1984 |
| 2002/0137834 A1 | 9/2002 | Barbee et al. | | JP | 4621671 | 6/1971 |
| 2003/0130477 A1 | 7/2003 | Winckler et al. | | JP | 476425 | 10/1972 |
| 2004/0155380 A1 | 8/2004 | Kendall et al. | | JP | 57-122078 A | 7/1982 |
| 2004/0188883 A1 | 9/2004 | Barron et al. | | JP | 6275547 | 4/1987 |
| 2005/0054862 A1 | 3/2005 | Phelps et al. | | JP | 62141063 A | 6/1987 |
| 2005/0059768 A1 | 3/2005 | Dione et al. | | JP | 63156824 A | 11/1988 |
| 2005/0137333 A1 | 6/2005 | Bahr et al. | | JP | 02147657 A | 6/1990 |
| 2005/0245676 A1 | 11/2005 | Winckler et al. | | JP | 02298512 | 12/1990 |
| 2005/0282952 A1 | 12/2005 | Takekoshi et al. | | JP | 4253764 | 9/1992 |
| 2005/0288176 A1 | 12/2005 | Kuhlman et al. | | JP | 08-093594 | 4/1996 |
| 2005/0288420 A1 | 12/2005 | Paquette et al. | | JP | 09048876 | 2/1997 |
| 2006/0003887 A1 | 1/2006 | Paquette et al. | | JP | 09-110832 | 4/1997 |
| 2006/0004135 A1 | 1/2006 | Paquette et al. | | JP | 09-238806 | 9/1997 |
| 2006/0025562 A1 | 2/2006 | Dione et al. | | JP | 10-069915 | 3/1998 |
| 2006/0194946 A1 | 8/2006 | Thompson et al. | | JP | 10-194262 | 7/1998 |
| 2006/0205916 A1 | 9/2006 | Takekoshi et al. | | JP | 11-136942 | 5/1999 |
| 2006/0235185 A1 | 10/2006 | Phelps et al. | | JP | 2001031846 | 2/2001 |
| 2006/0235186 A1* | 10/2006 | Phelps et al. ............... 528/272 | | JP | 2002293902 | 10/2002 |
| 2006/0235233 A1 | 10/2006 | Phelps et al. | | JP | 2002293903 | 10/2002 |
| 2006/0287440 A1 | 12/2006 | Wang et al. | | JP | 2002308969 | 10/2002 |
| 2007/0037464 A1 | 2/2007 | Thompson et al. | | JP | 2002317041 | 10/2002 |
| 2007/0173630 A1 | 7/2007 | Bahr et al. | | JP | 02320499 | 11/2002 |
| | | | | JP | 02322272 | 11/2002 |
| | FOREIGN PATENT DOCUMENTS | | | JP | 02338672 | 11/2002 |
| | | | | JP | 2003082081 | 3/2003 |
| CH | 654304 A5 | 2/1986 | | SU | 1077893 | 3/1984 |
| CN | 1120555 | 4/1996 | | SU | 1532560 A1 | 12/1989 |
| DE | 3607627 | 9/1987 | | WO | WO 88/06605 | 9/1988 |
| DE | 4034574 A1 | 5/1992 | | WO | WO 91/09899 | 7/1991 |
| EP | 0000544 B1 | 8/1982 | | WO | WO 93/04106 | 3/1993 |
| EP | 0153785 A2 | 9/1985 | | WO | WO 95/00574 | 1/1995 |
| EP | 0172636 | 2/1986 | | WO | WO 95/30702 | 11/1995 |
| EP | 0216496 A2 | 4/1987 | | WO | WO 96/22319 | 7/1996 |
| EP | 0273148 | 7/1988 | | WO | WO 99/25485 | 5/1999 |
| EP | 0153785 B1 | 7/1989 | | WO | WO-00/27632 | 5/2000 |
| EP | 419254 A2 | 3/1991 | | WO | WO-00/38897 | 7/2000 |
| EP | 486832 A2 | 5/1992 | | WO | WO-01/53379 A1 | 7/2001 |

| | | |
|---|---|---|
| WO | WO-01/56694 A1 | 8/2001 |
| WO | WO-02/18476 A2 | 3/2002 |
| WO | WO-02/22738 A2 | 3/2002 |
| WO | WO-02/051616 A | 7/2002 |
| WO | WO-02/098946 A1 | 12/2002 |
| WO | WO-02/098947 | 12/2002 |
| WO | WO-03/002551 | 1/2003 |
| WO | WO-03/031059 | 4/2003 |
| WO | WO-03/031496 A1 | 4/2003 |
| WO | WO-03/080705 | 10/2003 |
| WO | WO-2004/058471 | 7/2004 |
| WO | WO-2004/058854 | 7/2004 |
| WO | WO-2004/058868 | 7/2004 |
| WO | WO-2004/058872 | 7/2004 |
| WO | WO-2004/060640 | 7/2004 |
| WO | WO-2005/063882 | 7/2005 |
| WO | WO-2005/090508 | 9/2005 |
| WO | WO-2005/105889 | 11/2005 |
| WO | WO 2005/121233 | 12/2005 |
| WO | WO 2006/009735 | 1/2006 |
| WO | WO 2006/009803 | 1/2006 |
| WO | WO 2006/009804 | 1/2006 |
| WO | WO 2006/028541 | 3/2006 |

OTHER PUBLICATIONS

Brunelle et al. (1997) "Semi-crystalline Polymers via Ring-Opening Polymerization: Preparation and Polymerization of Alkylene Phthalate Cyclic Oligomers," *Polymers Preprints* vol. 38, No. 2, pp. 381-382.

Brunelle et al. (1998) "Semicrystalline Polymers via Ring-Opening Polymerization: Preparation and Polymerization of Alkylene Phthalate Cyclic Oligomers," *Macromolecules* vol. 31, No. 15, 4782-4790.

Burch, R. R. et al. (2000) "Synthesis of Cyclic Oligoesters and Their Rapid Polymerization to High Molecular Weight" *Macromolecules*, vol. 33, No. 14, 5053-5064.

Chisholm et al. "Syntheses and structural characterization of 2,2'-methylene-bis (6-t-butyl-4-methyl-phenoxide) complexes of titanium, zirconium and tantalum," *Polyhedron*, vol. 16, No. 17, (1997) pp. 2941-2949.

Communication pursuant to Article 96(2) EPC for EP 01968581.7-2102, dated Nov. 11, 2003.

Communication pursuant to Article 51(4) EPC for EP 02756358.4-2117, dated Apr. 2, 2005.

Communication pursuant to Article 96(2) EPC for EP 01942649.3-2102, dated Jan. 9, 2004.

Communication pursuant to Article 96(2) EPC for EP 01968413.3-2102, dated Dec. 3, 2004.

Communication pursuant to Article 96(2) EPC for EP 02734665.9-2102, dated Dec. 3, 2004.

Communication pursuant to Article 96(2) EPC for EP 02756358.4-2117, dated May 6, 2004.

Communication pursuant to Article 96(2) EPC for EP 03714278.3-2102, dated Nov. 25, 2004.

Cotton, N. J. et al. (1993) "Rate and Extent of Supercritical Fluid Extraction of Cyclic Trimer from Poly(Ethylene Terephthalate) at Elevated Temperatures," *Journal of Chromatographic Science*, vol. 31, No. 5, 157-161.

Cussler et al. "Barrier Membranes," *Journal of Membrane Science*, 38 (1988) pp. 161-174.

Database WPI Section Ch, Week 199029, Derwent Publications Ltd., London, GB; Class A23, AN 1990-219860, XP002343080, Jun. 6, 1990.

Database WPI Section Ch, Week 199114, Derwent Publications Ltd., London, GB; Class A23, AN 1991-097785, XP002390855, Feb. 21, 1991.

Database WPI Section Ch, Week 199954, Derwent Publications Ltd., London, GB; Class A23, AN 1999-622614, XP002390856, May 18, 1999.

Deleuze et al. (1998) "Polymer-Supported Titanates as Catalysts for Transesterification Reactions," *Polymer*, vol. 39, No. 24, pp. 6109-6114.

Deleuze et al. (2000) "Synthesis of Porous Supports Containing N-(p-hydroxyphenyl)- or N-(3-4-dihydroxybenzyl) Maleimide-Anchored Titanates and Application as Catalysts for Transesterification and Epoxidation Reactions," *Journal of Polymer Science*, vol. 38, pp. 2879-2886.

DuPont™ Zonyl® Fluorosurfactants Dupont the Miracles of Science "*Chemicals to Enhance Your Product's Performance*," http://www.dupont.com/zonyl/perform.html, last searched on May 16, 2002 and pp. 1-3 downloaded on May 16, 2002.

DuPont™ Tyzor® "*Organic Titanates General Brochure*" (2001) E.I. du Pont de Nemours and Company, 12 pages.

Durfee et al. "Chemical and Electrochemical Reduction of Titanium (IV) Aryloxides," *Inorganic Chemistry*, 24 (1985) pp. 4569-4573.

Fantacci et al. "*Density Functional Study of Tetraphenolate and Calix[4]arene Complexes of Early Transition Metals*," *Inorganic Chemistry*, 40 (2001) pp. 1544-1549.

Fukushima et al. "Graphite Nanoplatelets as Reinforcements for Polymers: Structural, Electrical and Thermal Properties," *Proc. 2nd Ann., Automotive Comp. Conf., Soc. Plast. Eng.*, Sep. 2002, 7 pgs.

Fukushima et al. "Synthesis of an Intercalated Compound of Montmorillonite and 6-Polyamide," *Journal of Inclusion Phenomena*, 5 (1987) pp. 473-482.

Hall et al. "Recent research on the synthesis and applications of cyclic oligomers," *Reactive & Functional Polymers*, 41 (1999), pp. 133-139.

Hamb et al. "Synthesis of Cyclic Tris (Ethylene Terephthalate)," *Polymer Letters*, 5 (1967), pp. 1057-1058.

Hamilton et al. (1998) "Cyclic Polyesters: Part 8. Preparation and Characterization of Cyclic Oligomers in Six Aromatic Ester and Ether-Ester Systems," *Polymer* vol. 39, No. 14., 3241-3252.

Harrison, A. G. et al. (1997) "Analysis of cyclic oligomers of poly (ethylene terephthalate) by liquid chromatography/mass spectrometry," *Polymer Communications*, vol. 38, No. 10, 2549-2555.

Henshaw et al. (1994) "Recycling of a Cyclic Thermoplastic Composite Material by Injection and Compression Molding," *J. of Thermoplastic Composite Materials* vol. 7 (1), 14-29.

Hubbard, P. A. (1996) "*Polyesters via Macrocyclic Oligomers*," Dissertation presented at the University of Akron.

Jiminez, G., et al., "Structure and thermal/mechanical properties of poly (e-caprolactone)-clay blend," *Journal of Applied Polymer Science* (XP000916366 ISSN: 0021-8995), John Wiley and Sons, Inc., NY, vol. 64, No. 11, 1997, pp. 2211-2220.

Kaviratna et al., "Synthesis of Polyether-Clay Nanocomposites: Kinetics of Epoxide Self-Polymerization in Acidic Smectite Clays," *Polym. Prep.*, 31(1), 788 (1994).

Kizilcan et al., "Block Copolymers of Styrene Containing Oligomeric Ester of Terephthalic Acids," *Journal of Applied Polymer Science*, vol. 76, pp. 648-653 (2000).

Kojima et al., "Mechanical properties of nylon 6-clay hybrid," *J. Mater. Res.*, 8, 1185 (1993).

Kricheldorf, H. R. et al. (1997) "Macrocycles IV. Macrocyclic Polylactones as Bifunctional Monomers for Polycondensations," *Journal of Polymer Science*, vol. 36, No. 9, 1373-1378.

Kricheldorf, H. R. et al. (1998) "Macrocycles. 3. Telechelic Polylactones via Macrocyclic Polymerization" *Macromolecules*, vol. 31, No. 3, 614-620.

Krikorian, V., et al., "Unusual crystallization behavior of organoclay reinforced poly (-lactic acid) nanocomposites," *Macromolecules* (XP001200895 ISSN: 0024-9297), ACS, Washington, D.C., vol. 37, No. 17, Aug. 24, 2004, pp. 6480-6491.

Lancaster Results, Titanium (IV), http://www.lancastersynthesis.com <http://www.lancastersynthesis.com>/home_quick_search.htm; pp. 1-3 downloaded on Nov. 29, 2001; last searched on Apr. 22, 2002 and pp. 4-8 downloaded on Apr. 22, 2002.

Lattimer et al. (1998) "MALDI-MS Analysis of Pyrolysis Products From a Segmented Polyurethane," *Journal of Analytical and Applied Pyrolysis*, vol. 48, 1-15.

Lee, J. et al., "Fire Retardent Polyetherimide Nanocomposites," *Matter Res. Soc. Proc.*, 457, 513-518, (1997).

Lee, S.-S. et al., "*Synthesis of PET-Layered Silicate Nanocomposites Using Cyclic Ester Oligomers*," Polymeric Materials: Science and Engineering, 89, 370-1 (2003).

Lewis et al. (1999) "A Highly Efficient Preparation of Methacrylate Esters using Novel Solid Phase Titanium-Based Transesterification Catalysts," *Synlett*, pp. 957-959.

Lui et al. (1999) "Preparation of Cyclic Polyester Oligomers and Ultra-Low VOC Polyester Coatings" *Polymer Reprints*, vol. 40, No. 1, pp. 137-138.

Martin et al. (1987) "*Pultrusion*,", Engineered Materials Handbook: vol. 1 Composites, pp. 533-543.

Messersmith et al., "Polymer-Layered Silicate Nanocomposites: In Situ Intercalative Polymerization of ε-Caprolactone in Layered Silicates," *Chem. Mater.*, 5, 1064 (1993).

Messersmith et al., "Synthesis and barrier properties of poly (ε-caprolactone)-layered silicate nanocomposites," *Journal of Polymer Science: Part A; Polymer Chemistry* (XP002343042) vol. 33, 1995, pp. 1047-1057.

Miller, S. (1998) "*Macrocyclic polymers from cyclic oligomers of poly(butylene terephthalate)*," Dissertation Presented at University of Massachusetts, Amherst, MA US.

Mueller, F. J. et al. (1983) "Synthesis of Cyclic Oligomers of Butylene Terephthalate," *Makromol. Chem.*, vol. 184, No. 12, 2487-95.

Mueller, F. J. et al. (1983) "Synthesis of Cyclic Oligomers of Butylene Terephthalate," *Makromol. Chem.*, vol. 184, No. 12, 2487-95. (Translation).

Nazar, et al., "Synthesis and Properties of a New (PEO)x[Na(H2O)]0.25MoO3 Nanocomposites," *J. Mater. Res.*, 5(11), 1985 (1995).

Okada, et al., "Synthesis and Characterization of a Nylon 6-Clay Hybrid," *Polym. Prep.*, 28, 447, (1987).

Okuda et al. "Synthesis and Characterization of Mononuclear Titanium Complexes Containing a Bis(phenoxy) Ligand Derived from 2,2'-Methylene-bis(6-cert-butyl-4-methylphenol)," *Chem. Ber.*, vol. 128, (1995) pp. 221-227.

Oriakhi et al., "Poly(Pyrrole) and Poly (Thiophene)/ Clay Nanocomposites Via Latex-Colloid Interaction," *Mater. Res. Bull.*, 30, No. 6, p. 723, (1995).

PCT International Search Report and Written Opinion of the International Searching Authority, International application No. PCT/US2005/019494, issued Sep. 13, 2005.

PCT International Search Report and Written Opinion of the International Searching Authority, International application No. PCT/US2006/007672, issued Jul. 27, 2006.

PCT International Search Report and Written Opinion of the International Searching Authority, International application No. PCT/US2006/010541, issued Sep. 1, 2006.

Perovic et al. (1982) "Crystallization of Cyclic Oligomers in Commercial Poly(ethleneterephthalate) Films" *Polymer Bulletin* vol. 6, 277-283.

Product Detail and structure Image, Titanium (IV) butoxide, polymer, http://www.sigmaaldrich.com/cgi-in/hsrun/Distributed/HahtShop/HahtShop.htx:start=HS_FramesetMain., last searched on Mar. 27, 2002 and pp. 1-2 downloaded on Mar. 27, 2002.

Roelens, S. (1988) "Organotin-Mediated Synthesis of Macrocyclic Polyesters: Mechanism and Selectivity in the Reaction of Dioxastannolanes with Diacyl Dichlorides," *Journal of the Chemical Society*, Perkin Transactions 2, vol. 8, 1617-1625.

Ruddick et al. "A new method for the polymer-suported synthesis of cyclic oligoesters for potential applications in macrocyclic lactone synthesis and combinatorial chemistry," *J. Chem. Soc., Perkin Trans.* 1, 2002, pp. 627-637.

Scatteia et al., "*Rheology of PBT-Layered Silicate Nanocomposites Prepared by Melt Compounding*," Plastics, Rubbers and Composites, 33, 85-91 (2004) and references therein.

Spanagel et al. "*Macrocyclic Esters*," Contribution No. 153 from The Experimental Station of E.I. duPont deNemours & Company, vol. 57, pp. 929-934.

Toth et al. "Towards supported catalyst models: the synthesis, characterization, redox chemistry, and structures of the complexes Ti (Oar')$_4$ (Ar'=C$_6$H$_4$(2-t-Bu), C$_6$H(2,3,5,6-Me)$_4$)," *Canadian Journal of Chemistry*, vol. 69, (1991) pp. 172-178.

Tripathy, et al., "Poly (Butylene Terephthalate) Nanocomposites Prepared by In-Situ Polymerization," *Macromolecules*, 36, 8593-5 (2003).

Uhi et al. "Flame Retarduncy of Graphite Nanocomposites," *Polym. Mater. Sci. Eng.* 83:56(2000).

Usuki et al. "Swelling behavior of montmorillonite cation exchanged for ω-amino acids by ε-caprolactam," *J. Mater. Res.*, vol. 8, No. 5, May 1993, pp. 1174-1178.

Usuki et al. "Synthesis of nylon 6-clay hybrid," *J. Mater. Res.*, vol. 8, No. 5, May 1993, pp. 1179-1184.

Vankelecom et al. "Incorporation of Zeolites in polyimide Membranes," *J. Phys. Chem.*, 99, 13187 (1995).

Ward et al. "Gas barrier improvement using vermiculite and mica in polymer films," *Journal of Membrane Science*, 55 (1991) pp. 173-180.

Xiao et al. "Preparation of exfoliated graphite/polystyrene composite by polymerization-filling technique," *Polymer*, 42 (2001) pp. 4813-4816.

Yano, K. et al., "Synthesis and Properties of Polyimide-Clay Hybrid," *J. Polym. Sci., Part A, Polym. Chem.*, 31, 2493 (1993).

Youk et al. "Polymerization of Ethylene Terephthalate Cyclic Oligomers with Antimony Trioxide," *Macromolecules*, 33 (2000), pp. 3594-3599.

Perovic, A. (1985) "Morphological Instability of poly (ethylene terephthalate) cyclic oligomer crystals" *Journal of Material Science*, vol. 20, Iss. 4, 1370-1374.

\* cited by examiner

THF Generation Rate in Solution Polymerization

Figures 13A, B, C
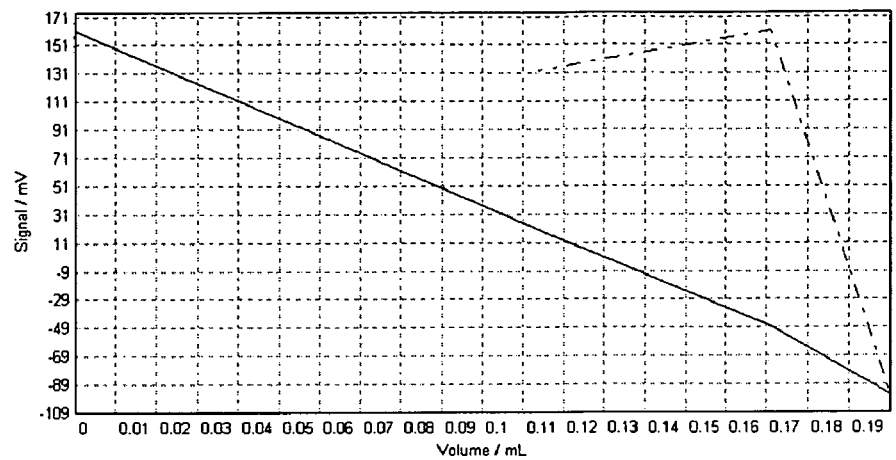
Blank
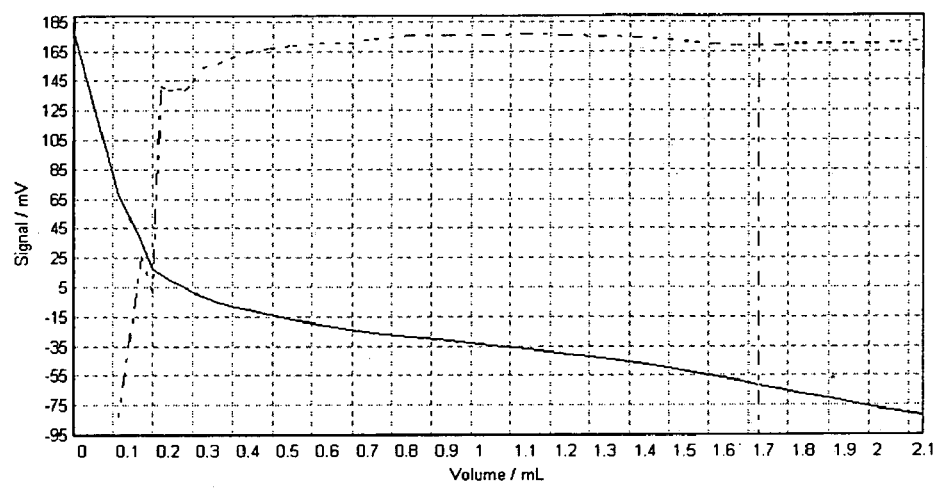
1g Valox 315
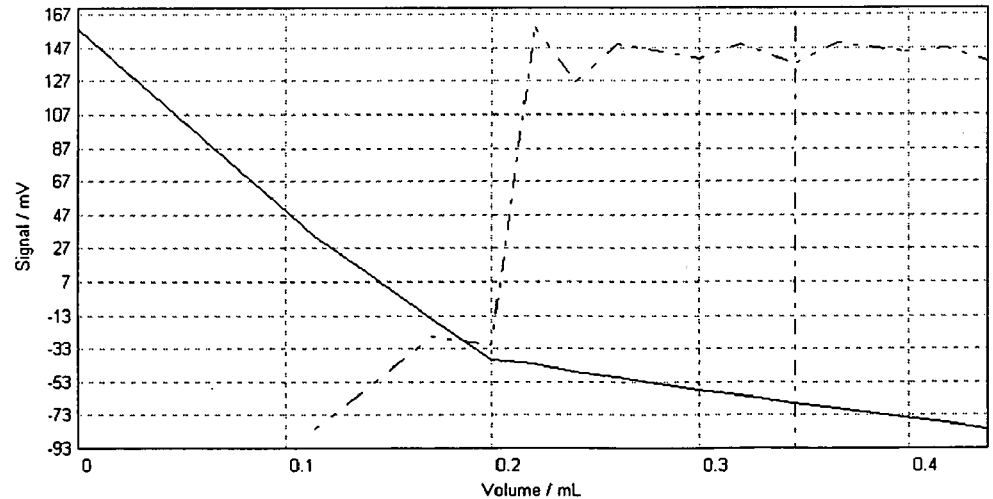
2g of PBT from Example 1, Reaction 10

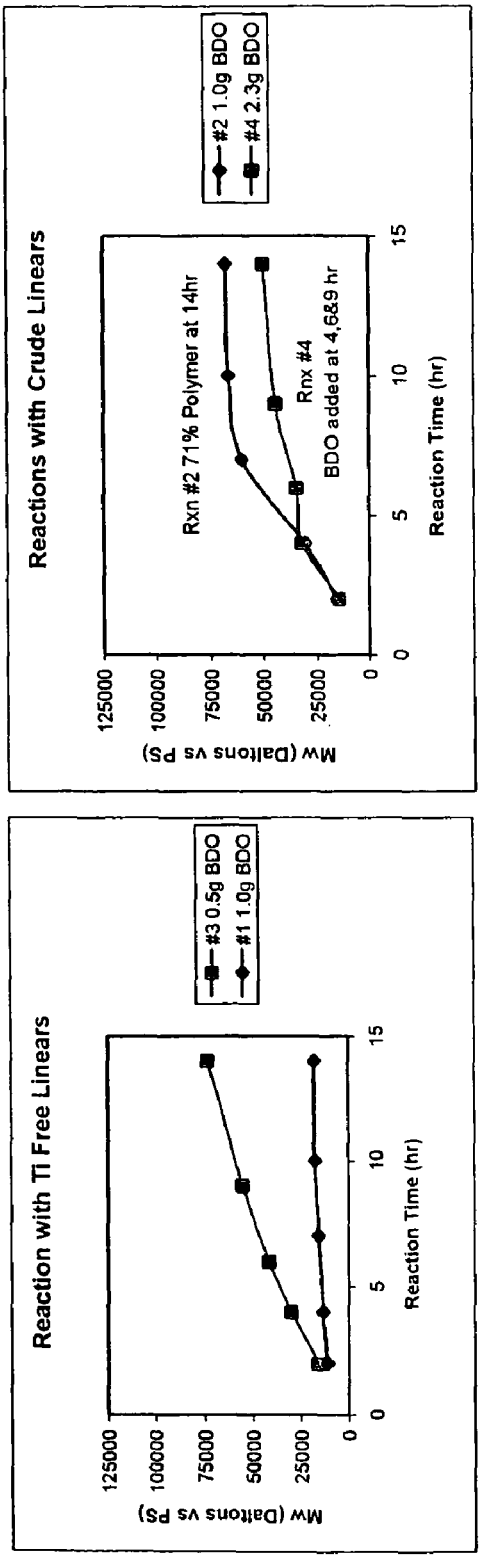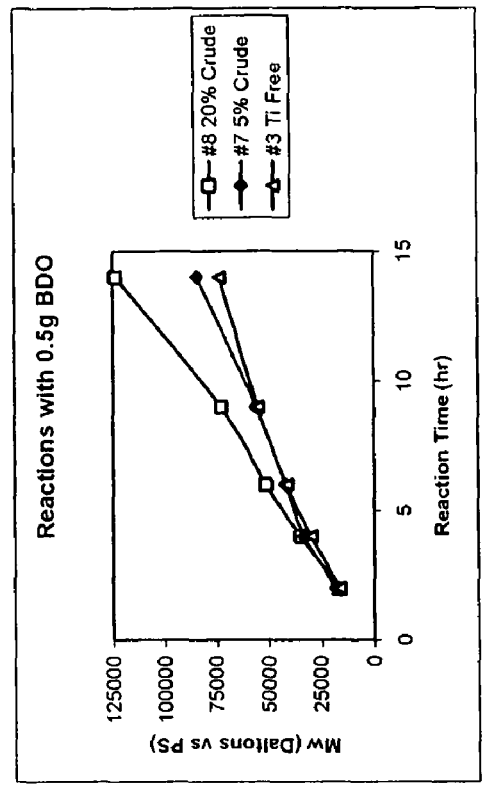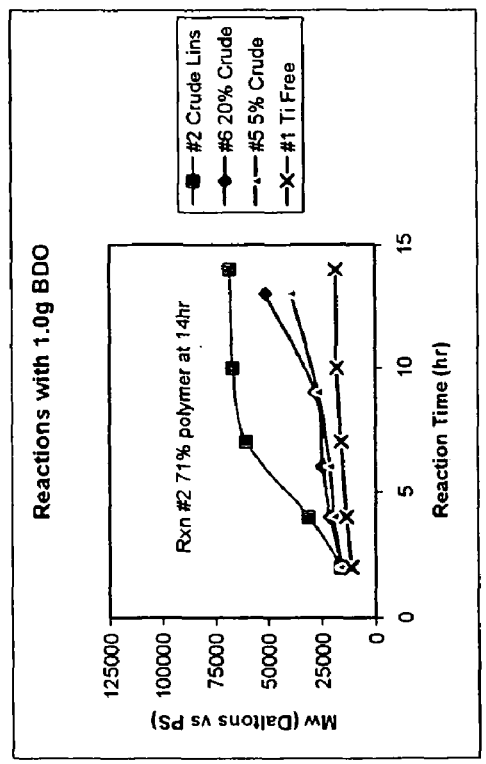
Figures 14A – 14D

PREPARATION OF LOW-ACID POLYALKYLENE TEREPHTHALATE AND PREPARATION OF MACROCYCLIC POLYESTER OLIGOMER THEREFROM

RELATED APPLICATIONS

The present application is a continuation-in-part of U.S. patent application Ser. No. 11/351,679, filed on Feb. 10, 2006, and issued as U.S. Pat. No. 7,309,756, which is a continuation of U.S. patent application Ser. No. 10/999,212, filed on Nov. 29, 2004, and issued as U.S. Pat. No. 7,022,806, which is a continuation of U.S. patent application Ser. No. 10/373,666, filed on Feb. 24, 2003, and issued as U.S. Pat. No. 6,855,798, which is a continuation of U.S. patent application Ser. No. 09/945,233, filed on Aug. 31, 2001, and issued as U.S. Pat. No. 6,525,164, which claims benefit of U.S. Provisional Patent Application No. 60/229,894, filed on Sep. 1, 2000. The present application also claims the benefit of U.S. Provisional Patent Application No. 60/665,648, filed on Mar. 25, 2005, the text of which is incorporated herein by reference in its entirety. The present application is also related to commonly-owned U.S. patent application Ser. No. 11/389,517, filed on Mar. 24, 2006, and U.S. patent application Ser. No. 11/389,516, filed on Mar. 24, 2006, both of which are incorporated herein by reference in their entirety.

FIELD OF THE INVENTION

This invention relates generally to methods for preparing polyesters. More particularly, in certain embodiments, the invention relates to methods for preparing low-acid polybutylene terephthalate, as well as methods for preparing macrocyclic polyester oligomer from low-acid polybutylene terephthalate.

BACKGROUND OF THE INVENTION

Polybutylene terephthalate (PBT) is a widely-used, high performance engineering resin that can be processed to make parts for automotive, electrical, and industrial applications. A commercial process for manufacturing PBT typically includes a series of reactors for performing transesterification and polycondensation reactions.

The transesterification step in the production of PBT generally involves reacting dimethyl terephthalate (DMT) with excess 1,4-butanediol (BDO) at high temperature (i.e., 190° C.) in the presence of a catalyst to form bishydroxylbutyl terephthalate (BDO ester), as well as other compounds, for example, as shown in Reaction 1 as follows:

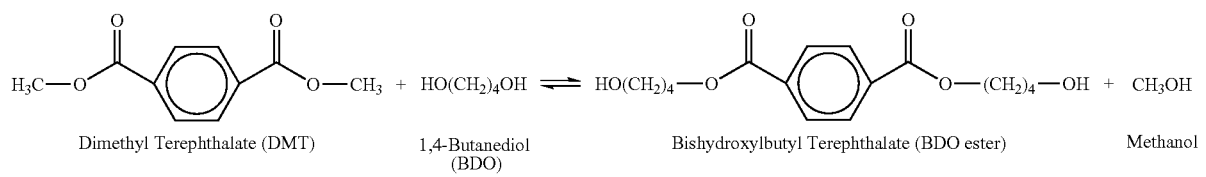

(1)

Reaction 1 is an equilibrium reaction and is driven forward by removal of the methanol produced.

The polycondensation step in the production of PBT involves the use of heat and vacuum to polymerize the transesterification reaction product. The transesterification product, for example, the BDO ester that is formed from Reaction 1, polymerizes in the presence of a catalyst and at high temperature (i.e. 240° C.) to form PBT, for example, as shown in Reaction 2 as follows:

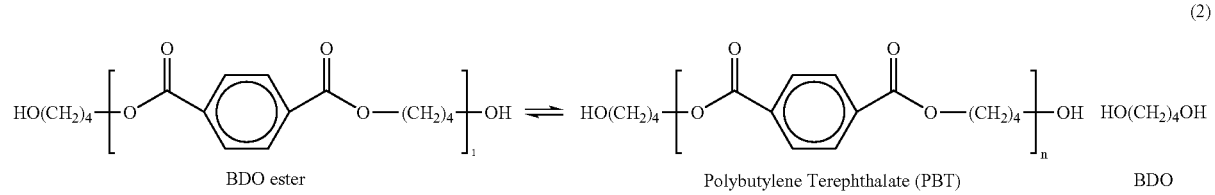

(2)

The polycondensation reaction is an equilibrium reaction and is driven forward by removal of the BDO produced.

Undesirable side reactions occur in the transesterification/polycondensation process for manufacturing PBT. Certain significant side reactions form tetrahydrofuran (THF), for example, as shown in exemplary Reactions 3 and 4 as follows:

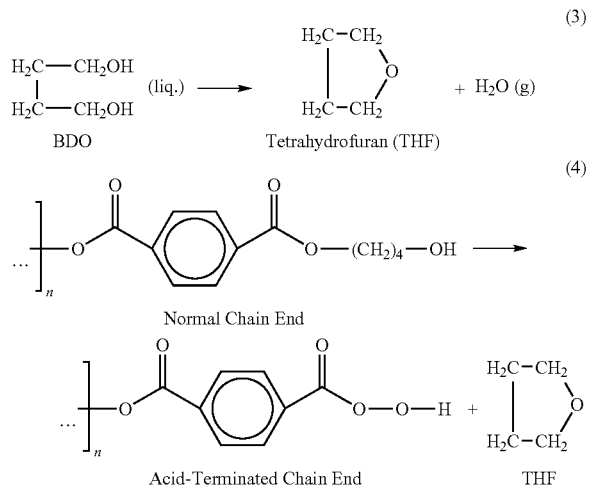

The formation of THF is undesirable because BDO reacts to form THF, as seen in Reaction 3, thereby reducing the amount of BDO that is converted to PBT. Reaction 3 occurs in the early stages of polymerization when the concentration of BDO is high. During the later stages of polymerization, high processing temperatures promote production of THF from BDO-terminated polymer end groups, leading to a higher concentration of acid-terminated PBT chain ends, as seen in Reaction 4. Reaction 4 also demonstrates a link between THF formation and the concentration of acid-terminated chain ends of the PBT produced, since an acid-terminated chain end is produced for each molecule of THF formed via this pathway.

Acid groups in the final PBT polymer are undesirable, because they may adversely affect polymer properties, for example, hydrolytic and melt stability. High acid content also leads to corrosion problems when the PBT comes into contact with metal during injection molding or other polymer processing. Further disadvantages are described herein below with respect to the depolymerization of high acid PBT to form macrocyclic polyester oligomer.

A typical industrial process for making PBT includes unit operations for handling raw materials and products, as well as a series of reactors for performing transesterification, prepolycondensation, polycondensation, and solid state polymerization. Transesterification may be performed in a single- or multi-stage reactor. DMT and BDO are mixed and heated as they are fed into the reactor. The reaction mixture boils as methanol and THF are produced. The methanol vapor is condensed and recovered in a condenser.

A prepolycondensation step is then typically performed using one or more reactors operating at high temperature and low pressure (i.e. vacuum). In a prepolycondensation step, BDO produced during polymerization (i.e. Reaction 2) is removed using heat and vacuum. The BDO and final traces of methanol are recovered using condensers. A pump forwards molten polymer through a mixer, where stabilizers and additives may be introduced.

Polycondensation is the final stage of melt polymerization. Polycondensation requires a special reactor, for example, a rotating disc reactor such as a Vickers-Zimmer reactor, in order to facilitate the removal of BDO that drives polymerization. The polycondensation reactor is designed to remove BDO by providing a large amount of continuously-renewed surface area. BDO typically is removed in order to build the molecular weight of the PBT product.

A solid state polymerization step may be performed after melt polymerization in order to increase the molecular weight of the PBT. Solid state polymerization involves pelletizing the polymer produced in the polycondensation step and heating the pellets in a fixed bed until crystallization occurs. The polymer is then maintained at high temperature (i.e., 200° C.) while a stream of inert gas passes through the fixed bed to carry away the BDO formed during polymerization. The solid state polymerization step may take up to 18 hours or more.

Processes for the commercial manufacture of PBT are expensive. Capital costs are high, due to the special reactors needed for transesterification, prepolycondensation, polycondensation, and solid state polymerization. For example, the transesterification reactors must be designed to minimize sublimation of reactant DMT, the prepolycondensation reactors must be designed to operate at high temperatures and high vacuum (low pressure), and the polycondensation reactors must be designed to provide continuously renewed surface area for BDO removal during polymerization. Processing costs are also high, due to various factors including the cost of maintaining the high temperatures and low pressures of the reactors, the cost of the catalyst required, and inefficient conversion of reactants due to the loss of BDO as THF, for example.

Methods have been proposed for reducing THF formation in the manufacture of PBT. For example, U.S. Pat. No. 5,516,879 by Yuo et al. and U.S. Pat. No. 5,519,108 by Yuo et al. describe the use of a multi-component catalyst system to accelerate polycondensation. These patents suggest that the use of an alkali metal phosphate as a co-catalyst along with tetrabutyl titanate or tetraisopropyl titanate reduces formation of THF in the preparation of PBT from DMT. Another method for reducing THF formation is described in the article entitled, "Effect of salts on the formation of THF in preparation of PBT by TPA process," by Chang and Tsai, *J. Appl. Polym. Sci.*, 45 (2), pp. 371-373 (1992). This article proposes the use of potassium and sodium salts to lower the amount of THF formed in PBT production. The article describes application of the technique in conjunction with the direct reaction of BDO and terephthalic acid (TPA) to produce PBT. Special equipment is necessary for commercial applications involving direct esterification with TPA because TPA sublimes and cannot be easily purified by distillation.

Despite industry improvements, a significant percentage (i.e. 3 wt. %) of reactant BDO is typically lost as THF in present commercial PBT manufacturing processes.

Furthermore, commercially manufactured PBT has a high acid content. Various methods have been proposed for reducing the acid concentration of PBT. For example, diepoxides have been used to reduce the acid content of PBT from 44 mmol/kg to 10 mmol/kg. See Gooijer et al., "Carboxylic acid end group modification of poly(butylene terephthalate) in supercritical fluids," *Polymer*, 44 (8), pp. 2201-2211 (2003). Another method for reducing the acid concentration of PBT is described in U.S. Pat. No. 5,854,377 by Braune. This patent describes the use of an alkali metal or alkaline earth metal compound to reduce the concentration of acid groups in PBT. Another proposed method of reducing acid groups in PBT is to add diol just before final polycondensation to directly react with the terminal carboxylic acid groups. However, the addition of a diol may decrease the polymerization reaction rate or even reverse the reaction, thereby producing lower molecular weight polymer.

Despite industry improvements, commercially manufactured PBT typically has an acid concentration greater than about 35 meq/kg, although some specially-manufactured PBT has an acid content as low as 7 meq/kg. Various high-grade PBT's that are commercially available include Valox® 315 manufactured by GE Plastics of Pittsfield, Mass. (38 meq acid/kg), Ultradur® B6550 manufactured by BASF Corporation of Wyandotte, Mich. (19 meq acid/kg), and Celanex® 2001 manufactured by Ticona Engineering Polymers of Shelby, N.C. (7 meq/kg). Valox® 315 and Ultradur® B6550 are melt-polymerized PBT's, while Celanex® 2001 is a solid state-polymerized PBT.

PBT may be depolymerized to form macrocyclic polyester oligomers (MPO's), including, for example, the cyclic form of poly(1,4-butylene terephthalate) (cPBT). MPO's have unique properties that make them attractive as matrix-forming resins for engineering thermoplastic composites. MPO's lend valuable characteristics to polymerized products, for example, high strength, high gloss, and solvent resistance. Furthermore, because certain MPO's melt and polymerize at temperatures well below the melting point of the resulting polymer, polymerization and crystallization can occur virtually isothermally upon melting of the MPO in the presence of an appropriate catalyst. The time and expense required to thermally cycle a tool is favorably reduced, because demolding can take place immediately following polymerization, without first cooling the mold.

Various methods for preparing MPO by depolymerizing polyesters have been described. See, e.g., co-owned U.S. Pat. No. 5,039,783 by Brunelle et al., U.S. Pat. No. 5,231,161 by Brunelle et al., U.S. Pat. No. 5,407,984 by Brunelle et al., U.S. Pat. No. 5,668,186 by Brunelle et al., U.S. Pat. No. 6,525,164, by Faler, and U.S. Pat. No. 6,787,632 by Phelps et al., the texts of which are all incorporated by reference herein in their entirety.

Depolymerization of commercially-available PBT into cPBT typically requires a high catalyst concentration. For example, the above-mentioned U.S. Pat. No. 5,668,186 by Brunelle et al. describes depolymerization of PBT using from about 1.0 to about 5.0 mole percent of a titanium catalyst based on total moles of polyester monomer units. The depolymerization reaction typically progresses relatively slowly and produces undesired byproducts, including hydroxybutylester linear oligomers, which are separated from the product stream. These byproducts are typically gellular in nature, and are physically difficult to remove.

Furthermore, residual acid typically is removed from the cPBT product stream, by, for example, costly treatment using alumina-packed columns. The more acid that is present, the more costly the treatment. Finally, commercially-available PBT suitable for depolymerization into cPBT is costly, due in part to the expense involved in its production.

Thus, for effective manufacture of cPBT, there is a need for less costly starting materials. There is also a need for PBT that has lower acid end group concentrations. Furthermore, there is a need for a faster, more efficient, less costly method for depolymerizing PBT into its cyclic form.

SUMMARY OF THE INVENTION

In one aspect, the invention relates to methods and systems for manufacturing low-acid polyalkylene terephthalate, for example, polybutylene terephthalate (PBT). Reaction of a diol with a dialkyl ester in an organic solvent produces a polymer having very low acid concentration.

The invention also relates to methods and systems for preparing macrocyclic polyester oligomer (MPO) from low-acid polyalkylene terephthalate. MPO of high quality can be efficiently produced by depolymerizing a polyalkylene terephthalate having low acid concentration. Depolymerization of low-acid polyalkylene terephthalate requires less catalyst and proceeds to equilibrium more quickly than depolymerization of higher-acid polyalkylene terephthalate.

Finally, the invention relates to methods and systems for preparing MPO via reaction of a diol and a dialkyl ester in an organic solvent to form a low-acid polyalkylene terephthalate, which undergoes depolymerization/cyclization to form MPO. The low-acid polyalkylene terephthalate does not have to be isolated before depolymerization to form MPO, thereby reducing equipment and processing costs and increasing process efficiency.

Low-acid PBT can be produced by reacting butanediol (BDO) and dimethylterephthalate (DMT) in an organic solvent—for example, ortho-dichlorobenzene (oDCB)—in the presence of a catalyst. The reaction does not require application of high heat or vacuum and can be conducted at about atmospheric pressure (or greater than atmospheric pressure) and at a temperature less than 240° C., preferably less than about 200° C., and preferably at about the boiling point of the solvent. One embodiment of the invention provides a PBT product having an acid concentration below 2 meq/kg. Furthermore, there is a broader range of effective catalyst concentrations that may be used via the solution polymerization method of the invention. In one embodiment, about the same level of catalyst is used in the solution polymerization to produce low-acid PBT as the level of catalyst that is used in commercial melt PBT production.

Production of PBT via reaction of BDO and DMT in an organic solvent at about atmospheric pressure (or greater) and at a temperature less than 240° C. results in a greatly improved BDO usage efficiency (improved conversion of BDO to PBT), due at least in part to inhibition of side reactions that produce tetrahydrofuran (THF). For example, according to one embodiment, less than 0.3 wt. % of BDO is lost as THF, versus 3 wt. % via conventional commercial methods.

Embodiments of the present invention may be used for performing one or both of a transesterification step and a polycondensation step, or a combined transesterification/polycondensation step, in a process for manufacturing low-acid polyalkylene terephthalate. For example, an embodiment of the invention includes reacting BDO and DMT in oDCB in the presence of a catalyst at atmospheric pressure and at a temperature less than about 200° C. in order to produce bishydroxybutyl terephthalate (BDO ester) via transesterification and/or to produce PBT via polycondensation. Various embodiments include one or more of the following steps: performing a solution transesterification step, performing a solution polycondensation step, performing polycondensation at atmospheric pressure (or above), or performing polycondensation at temperatures that do not exceed 240° C. In alternative embodiments, the invention method is supplemented by a conventional prepolycondensation step, polycondensation step, and/or solid state polymerization step that employ higher temperatures (i.e. greater than 240° C.) and/or vacuum. The transesterification step and/or the polycondensation step may occur in one or more stages, any of which can be performed at atmospheric pressure, above atmospheric pressure, or below atmospheric pressure. The transesterification step and/or the polycondensation step may take place, for example, at temperatures above about 100° C., above about 120° C., above about 140° C., above about 160° C., above about 180° C., above about 200° C., above about 220° C., above about 240° C., above about 260° C., above about 280° C., below about 300° C., below about 280° C., below about 260° C., below about 240° C., below about 220° C., below about 200° C., below about 180° C., or below about 160° C. The choice of temperature will depend, for example, on the types and amounts of the particular reactants, catalyst(s), and solvent(s) used.

Methods of the invention provide significant reductions in capital costs associated with a conventional PBT manufacturing process. For example, because the reaction is conducted at lower temperatures, a special reactor for minimizing sublimation of reactant DMT is not necessary. Furthermore, low-pressure reactors may be unnecessary, or, alternatively, one or more low-pressure reactors in an existing PBT manufacturing process may be eliminated, according to one embodiment of the invention, because the polycondensation step may be conducted, at least in part, at atmospheric pressure. Also, in one embodiment, transesterification and polycondensation steps in a PBT manufacturing process are performed using a single reaction vessel. In contrast, some commercial PBT manufacturing processes use a series of five or more reactors to perform transesterification and polycondensation steps. Furthermore, because reactions can take place at lower temperatures, the invention provides systems with reduced energy requirements.

The low-acid PBT produced by methods of the invention may exhibit improved properties and may result in reduced corrosion problems when used in injection molding or other process applications. Low-acid PBT produced by the solution polymerization methods of the invention can be stabilized using conventional methods to prevent generation of acids during extrusion, molding, or other polymer processing. Certain embodiments of the invention provide PBT with acid concentrations unattainable by other methods.

The low-acid PBT produced by methods of the invention can be depolymerized to make the cyclic form of PBT (cPBT). Depolymerization (cyclization) of the low-acid PBT requires less catalyst and reaches equilibrium faster (i.e. has faster initial rates of conversion of PBT to cPBT) than depolymerization of commercially-available PBT. It is believed that the acid content of commercially-available PBT interferes with the activity of the catalyst in the depolymerization reaction to form cPBT, necessitating the use of larger amounts of catalyst. The combined features regarding the production and use of low-acid PBT are synergistically exploited in a method for preparing cPBT, wherein BDO and DMT are reacted in solvent to make low-acid, non-isolated PBT, which is directly depolymerized to form cPBT.

Further advances involving the removal of catalyst residue and the use of a residual oligomer recyclate in a process for preparing cPBT (or other MPO) are described in the following commonly-owned applications: entitled, "METHODS FOR REMOVING CATALYST RESIDUE FROM A DEPOLYMERIZATION PROCESS STREAM," and entitled, "USE OF A RESIDUAL OLIGOMER RECYCLATE IN THE PRODUCTION OF MACROCYCLIC POLYESTER OLIGOMER," both of which are filed on even date herewith and are incorporated by reference herein in their entirety.

Embodiments of the invention offer the ability to use lower catalyst concentrations in the depolymerization of low-acid PBT to produce cPBT. The use of less catalyst offers a cost savings, as well as other benefits. The use of lower catalyst concentrations in the depolymerization (cyclization) step lowers the amount of residual oligomers (i.e. non-MPO, hydroxyl- and/or acid-capped linears) formed, thereby reducing separation and filtration processing costs. For instance, use of a lower catalyst level in the depolymerization (cyclization) step results in lower levels of diol-terminated linear oligomers (diol dimers, i.e., BDO ester) in the depolymerization product stream. This results in a lower level of residual acids in an MPO filtrate stream. For example, a column for filtration of a product stream having lower residual acid content does not need to be packed with as much alumina or ion exchange resin, and/or the period of time in which column packing becomes spent and needs to be replaced or recycled is longer. Furthermore, the residual oligomer filtrate is less gellular and easier to remove from a product stream when low catalyst concentrations are used, for example, in the cyclization of PBT to form cPBT. This reduces the required size and maintenance costs associated with commercial filtration equipment in a cPBT manufacturing process.

MPO's that are produced via methods of the invention demonstrate equal or better performance upon polymerization than macrocyclic oligomers produced via depolymerization (cyclization) of higher-acid polyester. For example, MPO's produced via depolymerization methods of the invention can be polymerized to the same molecular weight as MPO's produced via depolymerization of commercially-available polyester. Also, polymers made from MPO's that are produced via methods of the invention may exhibit lower levels of impurities and improved physical properties than polymers made from otherwise-produced MPO's.

Embodiments of the invention allow reduced capital costs in a system for producing MPO from polyester, because depolymerization (cyclization) of polyester can be conducted using a reaction vessel that is also used in the production of the polyester. In fact, in one embodiment, the polyester is a non-isolated intermediate in a process in which DMT and BDO are inputs and cPBT is an output. It is even possible to conduct both polymerization and depolymerization/cyclization reactions using a single reaction vessel. Furthermore, because both polycondensation and depolymerization/cyclization can be conducted at atmospheric pressure and/or at temperatures below 240° C. (for example, at about 200° C.), a reactor capable of maintaining high temperatures and/or low pressures is not needed.

Embodiments of the invention may be performed as part of a continuous, semi-continuous, or batch process. Reactors may be single-stage or multi-stage. It is contemplated that methods of the invention may be combined or supplemented with reactors, systems, or processes that are known in the art.

Methods for the conversion of terephthalic acid (PTA) to DMT are known. Therefore, embodiments of the invention that employ DMT may alternatively employ PTA (purified or non-purified forms), for example, where DMT is formed from PTA. This may be beneficial, for example, in the production of low-acid PBT where use of PTA to produce DMT as a non-isolated or isolated intermediate is less expensive than direct use of DMT. Furthermore, DMT that is used for producing low-acid PBT may not need to be highly purified, since residual methanol and/or acids could be converted later in the solution polymerization process. Similarly, the use of known chemical analogues and/or precursors of species described herein are considered to lie within the scope of the invention.

In one aspect, the invention relates to a method for preparing a low-acid polybutylene terephthalate product. The method may be a continuous process, a batch process, or a combination thereof. The method generally includes the step of exposing a mixture to a temperature no greater than about 240° C. at a pressure no less than about atmospheric pressure, wherein the mixture at least initially includes butanediol, dimethylterephthalate, an organic solvent, and a catalyst. In certain embodiments, at least one of transesterification and polycondensation takes place during the exposing step. In particular embodiments, polycondensation takes place during the exposing step. In some embodiments, the mixture may contain from about 30 wt. % polymer solids to about 50 wt. % polymer solids during the exposing step.

The exposing step is generally carried out at a temperature no greater than about 240° C. For example, the exposing step may be conducted at a temperature within a range from about 40° C. to about 240° C., more preferably from about 110° C. to about 240° C., and even more preferably from about 170° C. to about 200° C. In particular embodiments, the exposing step may be conducted at a temperature no greater than about 230° C., preferably no greater than about 220° C., and more preferably no greater than about 210° C. In other embodiments, the exposing step may be conducted at a temperature no greater than about 200° C., and more preferably no greater than about 190° C. In particular embodiments, the exposing step may be conducted at about the boiling point of the organic solvent. In terms of pressure, the exposing step is generally performed at a pressure no less than about atmospheric pressure. For example, the exposing step may be conducted at about atmospheric pressure. In certain embodiments, the exposing step may be conducted at a pressure greater than atmospheric pressure, in which case, it will be advantageous to remove methanol as it is formed by the reaction of at least two components of the mixture.

Various organic solvents may be used to practice the present invention. In some embodiments, the organic solvent may include at least one member selected from the group consisting of tetradecane, hexadecane, octadecane, toluene, xylene, trimethylbenzene, tetramethylbenzene, ethylbenzene, propylbenzene, naphthalene, methylnaphthalene, biphenyl, triphenyl, diphenyl ether (or a halogenated derivative thereof), anisol, methylene chloride, dimethyoxybenzene, chlorobenzene, dichlorobenzene, trichlorobenzene, chloronaphthalene, dichloronaphthalene, and/or a perfluorocarbon. In particular embodiments, the organic solvent may include ortho-xylene. In other embodiments, the organic solvent may include ortho-dichlorobenzene. In some embodiments, the organic solvent may include an alkane, such as tetradecane and hexadecane. In other embodiments, the organic solvent may include a perfluorocompound, such as perfluoro(tri-n-butylamine) and perfluoro(tri-n-pentylamine). The organic solvent used preferably has a boiling point no less than about 110° C.

Suitable catalysts that may be used to practice the present invention include, but are not limited to, various organotitanate and organotin compounds. In some embodiments, the catalyst may include at least one member selected from the group consisting of 2-ethylhexyl titanate, tetrakis-(2-ethylhexyl) titanate, tetrabutyl titanate, tetraisopropyl titanate, an alkoxy titanate, titanium methoxide, titanium ethoxide, diisopropoxide bis(2,4-pentanedionate), and butanediol titanate. In particular embodiments, the catalyst may include tetraisopropyl titanate. In other embodiments, the catalyst may include a mixture of reaction products of

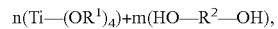

wherein each $R^1$ is independently a $C_1$-$C_{10}$ alkyl group, $R^2$ is a $C_2$-$C_6$ alkylene group, and each of m and n is greater than 0, with m/n being less than 2. Another suitable catalyst may include a mixture of reaction products of

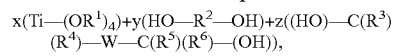

wherein each $R^1$ is independently a $C_1$-$C_{10}$ alkyl group, $R^2$ is a $C_2$-$C_6$ alkylene group, each of $R^3$, $R^4$, $R^5$ and $R^6$ is independently a hydrogen atom or a $C_1$-$C_4$ alkyl group, W is an oxygen atom, a sulfur atom, a nitrogen-containing group, a phosphorus-containing group, or a $C_1$-$C_4$ alkylene group, each of x and y is greater than 0, and y is greater than z. In other embodiments, the catalyst may include at least one member selected from the group consisting of a dialkyltin, a dialkyltin oxide, a dialkyltin alkoxide, a stannoxane, and a spiro tin compound.

In some embodiments, the catalyst is preferably of a type that is capable of use in both polycondensation as well as depolymerization/cyclization. In one embodiment, where the catalyst is used in a reaction to produce low-acid PBT (i.e. via polycondensation), which does not thereafter undergo depolymerization/cyclization, the catalyst may be any known polyester-forming catalyst, for example, a metal oxide such as antimony oxide; a transition metal salt such as zinc acetate and/or cobalt acetate; a salt of Hg, Pb, Cd, Mn, Cr, Mo, or W; a tin compound and/or a titanate compound; or any combination thereof.

In some embodiments, the catalyst may be present in the mixture at a concentration within a range from about 10 ppm to about 100 ppm. In other embodiments, the catalyst may be present in the mixture at a concentration within a range from about 0.01 mol Ti to about 0.03 mol Ti per 100 mol monomer repeat units. In some embodiments, the catalyst may include a metal Q chosen from the group consisting of Sn or Ti. In these embodiments, the catalyst may be present in the mixture at a concentration less than about 1.0 mol Q per 100 mol monomer repeat units, preferably less than about 0.5 mol Q per 100 mol monomer repeat units, and more preferably less than about 0.1 mol Q per 100 mol monomer repeat units. In particular embodiments, the catalyst may be present in the mixture at a concentration less than about 0.05 mol Q per 100 mol monomer repeat units, and more preferably less than about 0.01 mol Q per 100 mol monomer repeat units.

The foregoing methods help to significantly reduce side reactions. For example, less than 3 wt. % of the butanediol may react to form tetrahydrofuran in the exposing step. In preferred embodiments, less than 1 wt. % of the butanediol may react to form tetrahydrofuran in the exposing step. In the most preferred embodiments, less than 0.5 wt. % of the butanediol may react to form tetrahydrofuran in the exposing step.

In some embodiments, the method may further include the steps of transferring at least a portion of the mixture into a rotating disc reactor following the exposing step, and exposing the contents of the rotating disc reactor to a temperature of at least about 200° C. for polycondensation of the low-acid polybutylene terephthalate product. In particular embodiments, the second exposing step may include exposing the contents of the rotating disc reactor to a temperature of at least about 240° C. In some embodiments, the second exposing step may be conducted at a pressure less than atmospheric pressure. A suitable rotating disc reactor includes, but is not limited to, a Vickers-Zimmer reactor.

The polybutylene terephthalate product provided by the foregoing methods of the invention has an acid concentration that is at least as low as, and in some embodiments, much lower than previously obtained. In some embodiments, the polybutylene terephthalate product may have an acid concentration of less than about 10 meq/kg, less than about 7 meq/kg, less than about 5 meq/kg, less than about 2 meq/kg, less than about 1.5 meq/kg, depending on the particular conditions under which the polybutylene terephthalate product is prepared. In the most preferred embodiments, a polybutylene terephthalate product having an acid concentration of less than about 1 meq/kg may be obtained. At least one variable selected from the group consisting of a temperature, a concentration of the catalyst in the mixture, a concentration of polymer solids in the mixture, and a ratio of butanediol and dimethylterephthalate may be selected such that the polybutylene terephthalate product has an acid concentration no greater than about 2 meq/kg, more preferably, no greater than about 1.5 meq/kg, and most preferably, no greater than about 1.0 meq/kg. A polymer product formed by the foregoing methods is within the scope of the invention.

In another aspect, the invention relates to a method for preparing a macrocyclic polyester oligomer. The method may be a continuous process, a batch process, or a combination thereof. The method generally includes the step of exposing a mixture to heat, the mixture including a polybutylene terephthalate polymer having an acid concentration no greater than about 10 meq/kg, an organic solvent, and a depolymerization catalyst.

Typically, it is advantageous to include in the mixture a polybutylene terephthalate polymer having an acid concentration as low as possible. The polybutylene terephthalate polymer, for example, may have an acid concentration of less than about 7 meq/kg, less than about 5 meq/kg, less than about 2 meq/kg, and most preferably, less than about 1 meq/kg. In some embodiments, the mixture may contain from about 0.75 wt. % polymer solids to about 1.5 wt. % polymer solids. In particular embodiments, the polymer solids may include polybutylene terephthalate.

Various organic solvents may be included in the mixture. In some embodiments, the organic solvent may include at least one member selected from the group consisting of tetradecane, hexadecane, octadecane, toluene, xylene, trimethylbenzene, tetramethylbenzene, ethylbenzene, propylbenzene, naphthalene, methylnaphthalene, biphenyl, triphenyl, diphenyl ether (or a halogenated derivative thereof), anisol, methylene chloride, dimethyoxybenzene, chlorobenzene, dichlorobenzene, trichlorobenzene, chloronaphthalene, dichloronaphthalene, and/or a perfluorocarbon. In particular embodiments, the organic solvent may include ortho-xylene. In other embodiments, the organic solvent may include ortho-dichlorobenzene. In some embodiments, the organic solvent may include an alkane, such as tetradecane and hexadecane. In other embodiments, the organic solvent may include a perfluorocompound, such as perfluoro(tri-n-butylamine) and perfluoro(tri-n-pentylamine).

Suitable depolymerization catalysts that may be used to practice the present invention include, but are not limited to, various organotitanate compounds. In some embodiments, the depolymerization catalyst may include tetraisopropyl titanate. In other embodiments, the depolymerization catalyst may include titanium, and the concentration of the depolymerization catalyst in the mixture may be less than about 2 mol Ti per 100 mol monomer repeat units, less than about 1.5 mol Ti per 100 mol monomer repeat units, less than about 0.75 mol Ti per 100 mol monomer repeat units, less than about 1.8 mM, or less than about 0.88 mM. In particular embodiments, the concentration of the depolymerization catalyst in the mixture may be within a range from about 0.25 mol Ti to about 1.25 mol Ti per 100 mol monomer repeat units or within a range from about 0.22 mM to about 0.88 mM. In other embodiments, the depolymerization catalyst may include metal Q chosen from the group consisting of Sn and Ti, wherein the depolymerization catalyst may be present in the mixture at a concentration less than about 3 mol Q per 100 mol monomer repeat units.

One advantage of the foregoing methods is the small amount of depolymerization catalyst that is required to convert the polybutylene terephthalate polymer into macrocyclic polyester oligomer. In some embodiments, the depolymerization catalyst used may include titanium, and using a catalyst concentration less than about 2 mol Ti per 100 mol monomer repeat units, at least about 70 wt. % of the polybutylene terephthalate polymer can be converted to macrocyclic polyester oligomer. Typically, a catalyst concentration within a range from about 0.25 mol Ti to about 1.25 mol Ti per 100 mol monomer repeat units is sufficient to convert at least about 70 wt. % of the polybutylene terephthalate polymer to macrocyclic polyester oligomer. It was observed that despite the small amount of catalyst used, the rate of depolymerization was not significantly compromised. In some embodiments, the initial rate of depolymerization may be greater than 13.5 g/L/hr. In other embodiments, the initial rate of depolymerization may be even greater than 15 g/L/hr. A macrocyclic polyester oligomer formed by the foregoing methods is within the scope of the invention.

In yet another aspect, the invention is related to a method for preparing macrocyclic polyester oligomer. The method generally includes the steps of (a) exposing a mixture to a temperature no greater than about 240° C. at a pressure no less than about atmospheric pressure to form a mixture including polymer solids, wherein the mixture at least initially includes a diol; at least one member selected from the group consisting of an acid, an ester, a diacid, a diester, a dicarboxylic acid, and a dialkyl ester; an organic solvent; and a catalyst; (b) maintaining a concentration of polymer solids in the mixture within a first range; (c) reducing the concentration of polymer solids following step (b); and (d) maintaining the concentration of polymer solids in the mixture within a second range in the presence of heat, to produce a macrocyclic polyester oligomer.

In some embodiments, steps (a), (b), (c), and (d) may be performed in a common vessel. Step (a) may be conducted at a temperature no greater than about 230° C., more preferably, no greater than about 210° C., and even more preferably, no greater than about 190° C.

In some embodiments, the diol at least initially present in the mixture in step (a) may include butanediol, for example, 1,4-butanediol. In particular embodiments, the mixture may include dimethylterephthalate. The organic solvent may include at least one member selected from the group consisting of an alkane, including but not limited to tetradecane and hexadecane; a perfluorocompound, including but not limited to, perfluoro(tri-n-butylamine) and perfluoro(tri-n-pentylamine); xylene, including but not limited to, ortho-xylene; chlorobenzene, including but not limited to, dichlorobenzene, ortho-dichlorobenzene; methylene chloride; naphthalene; toluene; tetramethylbenzene; and methylnaphthalene.

Suitable catalysts that may be used to practice the present invention include, but are not limited to, various organotitanate and organotin compounds. In some embodiments, the catalyst may include at least one member selected from the group consisting of 2-ethylhexyl titanate, tetrakis-(2-ethylhexyl) titanate, tetrabutyl titanate, tetraisopropyl titanate, an alkoxy titanate, titanium methoxide, titanium ethoxide, diisopropoxide bis(2,4-pentanedionate), and butanediol titanate. In other embodiments, the catalyst may include a mixture of reaction products of

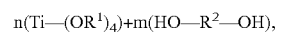

wherein each $R^1$ is independently a $C_1$-$C_{10}$ alkyl group, $R^2$ is a $C_2$-$C_6$ alkylene group, and each of m and n is greater than 0, with m/n being less than 2. Another suitable catalyst may include a mixture of reaction products of

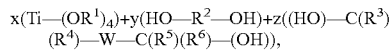

wherein each $R^1$ is independently a $C_1$-$C_{10}$ alkyl group, $R^2$ is a $C_2$-$C_6$ alkylene group, each of $R^3$, $R^4$, $R^5$ and $R^6$ is independently a hydrogen atom or a $C_1$-$C_4$ alkyl group, W is an oxygen atom, a sulfur atom, a nitrogen-containing group, a phosphorus-containing group, or a $C_1$-$C_4$ alkylene group, each of x and y is greater than 0, and y is greater than z. In other embodiments, the catalyst may include at least one member selected from the group consisting of a dialkyltin, a dialkyltin oxide, a dialkyltin alkoxide, a stannoxane, and a spiro tin compound.

In some embodiments, the catalyst may include a metal Q chosen from the group consisting of Sn and Ti, and the catalyst may be present in the mixture in step (a) at a concentration less than about 1.0 mol Q per 100 mol monomer repeat units, preferably less than about 0.5 mol Q per 100 mol monomer repeat units, more preferably less than about 0.1 mol Q per 100 mol monomer repeat units, even more preferably less than about 0.05 mol Q per 100 mol monomer repeat units, and in the most preferred embodiments, within a range from about 0.01 mol Q to about 0.03 mol Q per 100 mol monomer repeat units. In other embodiments, the catalyst may include titanium, and may be present in the mixture of step (a) at a concentration within a range from about 0.01 mol Ti to about 0.03 mol Ti per 100 mol monomer repeat units. In some embodiments, step (d) may be conducted in the presence of the catalyst from step (a). The catalyst may include a metal Q chosen from the group consisting of Sn and Ti, and wherein the catalyst may be presenting step (d) at a concentration less than about 2.0 mol Q per 100 mol monomer repeat units, preferably, within a range from about 0.2 mol Q to about 0.7 mol Q per 100 mol monomer repeat units.

Step (b) may produce a polyester having an acid concentration no greater than about 10 meq/kg, preferably no greater than about 7 meq/kg, more preferably no greater than about 5 meq/kg, even more preferably no greater than about 2 meq/kg, and in the most preferred embodiments, no greater than about 1 meq/kg. The first range may be from about 30 wt. % polymer solids to about 50 wt. % polymer solids. Step (c) may include reducing the concentration of polymer solids by a factor of at least about 10. In step (d), the second range may be from about 0.75 wt. % polymer solids to about 1.5 wt. % polymer solids. The polymer solids may include polybutylene terephthalate. The mixture following step (d) may include substantially non-gellular precipitated linears. The method may further include the step of isolating the macrocyclic polyester oligomer and optionally, purifying the macrocyclic polyester oligomer.

In particular embodiments, step (b) may produce a linear polybutylene terephthalate. The organic solvent used may include ortho-dichlorobenzene, and the catalyst used may include an organotitanate. Step (a) may be conducted at about the boiling point of the organic solvent. At least some of the linear polybutylene terephthalate may be optionally isolated prior to step (d), although this is not necessary.

In yet another aspect, the invention relates to a method for preparing a low-acid polyester. The method generally includes the step of exposing a mixture to heat at a pressure no less than about atmospheric pressure to form a low-acid polyester product. The mixture at least initially includes a diol, a dialkyl ester, an organic solvent with a boiling point no greater than about 240° C., and a catalyst.

In some embodiments, the exposing step may be conducted at a temperature within a range from about 40° C. to about 240° C., more preferably from about 110° C. to about 240° C., and even more preferably from about 170° C. to about 200° C. In particular embodiments, the exposing step may be conducted at a temperature no greater than about 230° C., preferably no greater than about 210° C., and more preferably no greater than about 190° C.

Various organic solvents may be used to practice the present invention. In some embodiments, the organic solvent includes at least one member selected from the group consisting of tetradecane, hexadecane, octadecane, toluene, xylene, trimethylbenzene, tetramethylbenzene, ethylbenzene, propylbenzene, naphthalene, methylnaphthalene, biphenyl, triphenyl, diphyenyl ether (or a halogenated derivative thereof), anisol, methylene chloride, dimethyoxybenzene, chlorobenzene, dichlorobenzene, trichlorobenzene, chloronaphthalene, dichloronaphthalene, and/or a perfluorocarbon. In particular embodiments, the organic solvent may include ortho-xylene. In other embodiments, the organic solvent may include ortho-dichlorobenzene. In some embodiments, the organic solvent may include an alkane, such as tetradecane and hexadecane. In other embodiments, the organic solvent may include a perfluorocompound, such as perfluoro(tri-n-butylamine) and perfluoro(tri-n-pentylamine). Suitable catalysts may include, but are not limited to, various organotitanate compounds, including tetraisopropyl titanate. The organotitanate catalyst may be present in the mixture at a concentration within a range from about 10 ppm to about 100 ppm. In other embodiments, the catalyst may include titanium, and may be present in the mixture at a concentration within a range from about 0.01 mol Ti to about 0.03 mol Ti per 100 mol monomer repeat units. In some embodiments, the catalyst may include a metal Q chosen from the group consisting of Sn and Ti, and the catalyst may be present in the mixture at a concentration less than about 1.0 mol Q per 100 mol monomer repeat units, preferably less than about 0.5 mol Q per 100 mol monomer repeat units, more preferably less than about 0.1 mol Q per 100 mol monomer repeat units, even more preferably less than about 0.05 mol Q per 100 mol monomer repeat units, and most preferably, within a range from about 0.01 mol Q to about 0.03 mol Q per 100 mol monomer repeat units.

The polybutylene terephthalate product provided by the foregoing methods of the invention has an acid concentration that is at least as low as, and in some embodiments, much lower than what is known in the art. In some embodiments, the polybutylene terephthalate product may have an acid concentration of less than about 10 meq/kg, less than about 7 meq/kg, less than about 5 meq/kg, less than about 2 meq/kg, and in preferred embodiments, less than about 1 meq/kg.

In yet another aspect, the present invention relates to a continuous process for preparing a macrocyclic polyester oligomer. The process generally includes a first unit operation having an output stream and a second unit operation having an input stream that includes at least a portion of the output stream of the first unit operation. The first unit operation is adapted to expose a mixture including 1,4-butanediol, dimethylterephthalate, an organic solvent, and a catalyst, to a temperature no greater than about 240° C. at a pressure no less than about atmospheric pressure to form polymer solids, while the second operation is adapted to expose the input stream to heat to produce a macrocyclic polyester oligomer.

In some embodiments, the organic solvent in the mixture may include one member selected from the group consisting of tetradecane, hexadecane, octadecane, toluene, xylene, trimethylbenzene, tetramethylbenzene, ethylbenzene, propylbenzene, naphthalene, methylnaphthalene, biphenyl, triphenyl, diphyenyl ether (or a halogenated derivative thereof), anisol, methylene chloride, dimethyoxybenzene, chlorobenzene, dichlorobenzene, trichlorobenzene, chloronaphthalene, dichloronaphthalene, and/or a perfluorocarbon. In particular embodiments, the organic solvent may include ortho-xylene. In other embodiments, the organic solvent may include ortho-dichlorobenzene. In some embodiments, the organic solvent may include an alkane, such as tetradecane and hexadecane. In other embodiments, the organic solvent may include a perfluorocompound, such as perfluoro(tri-n-butylamine) and perfluoro(tri-n-pentylamine). In certain embodiments, the catalyst may include an organotitanate, for example but without limitation, a member selected from the group consisting of 2-ethylhexyl titanate, tetrakis-(2-ethylhexyl) titanate, tetrabutyl titanate, tetraisopropyl titanate, an alkoxy titanate, titanium methoxide, titanium ethoxide, diisopropoxide bis(2,4-pentanedionate), and butanediol titanate. In other embodiments, the catalyst may include a mixture of reaction products of

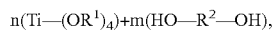

$$n(\text{Ti}-(\text{OR}^1)_4)+m(\text{HO}-\text{R}^2-\text{OH}),$$

wherein each $R^1$ is independently a $C_1$-$C_{10}$ alkyl group, $R^2$ is a $C_2$-$C_6$ alkylene group, and each of m and n is greater than 0, with n/n being less than 2. Another suitable catalyst may include a mixture of reaction products of

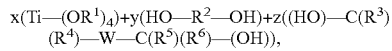

$$x(\text{Ti}-(\text{OR}^1)_4)+y(\text{HO}-\text{R}^2-\text{OH})+z((\text{HO})-\text{C}(\text{R}^3)(\text{R}^4)-\text{W}-\text{C}(\text{R}^5)(\text{R}^6)-(\text{OH})),$$

wherein each $R^1$ is independently a $C_1$-$C_{10}$ alkyl group, $R^2$ is a $C_2$-$C_6$ alkylene group, each of $R^3$, $R^4$, $R^5$ and $R^6$ is independently a hydrogen atom or a $C_1$-$C_4$ alkyl group, W is an oxygen atom, a sulfur atom, a nitrogen-containing group, a phosphorus-containing group, or a $C_1$-$C_4$ alkylene group, each of x and y is greater than 0, and y is greater than z. In other embodiments, the catalyst may include an organotin, for example but without limitation, at least one member selected from the group consisting of a dialkyltin, a dialkyltin oxide, a dialkyltin alkoxide, a stannoxane, and a spiro tin compound.

In some embodiments, the catalyst may include a metal Q chosen from the group consisting of Sn and Ti, and the catalyst may be present in the mixture in step (a) at a concentration less than about 1.0 mol Q per 100 mol monomer repeat units, preferably less than about 0.5 mol Q per 100 mol monomer repeat units, more preferably less than about 0.1 mol Q per 100 mol monomer repeat units, even more preferably less than about 0.05 mol Q per 100 mol monomer repeat units, and in the most preferred embodiments, within a range from about 0.01 mol Q to about 0.03 mol Q per 100 mol monomer repeat units.

In certain embodiments, the second unit operation may be conducted in the presence of the catalyst from the first unit operation. In particular embodiments, the second unit operation may be conducted in the presence of a catalyst including a metal Q chosen from the group consisting of Sn and Ti. The catalyst may be present at a concentration less than about 2.0 mol Q per 100 mol monomer repeat units, for example, at a concentration between about 0.2 mol Q to about 0.7 mol Q per 100 mol monomer repeat units.

In yet another aspect, embodiments of the present invention provide a polybutylene terephthalate polymer having an acid concentration less than 7 meq/kg. In preferred embodiments, the polybutylene terephthalate polymer may have an even lower acid concentration, for example, less than 5 meq/kg, less than 2 meq/kg, or less than 1 meq/kg.

In yet another aspect, the present invention relates to a method for preparing a low-acid polybutylene terephthalate product. The method generally includes the step of exposing a mixture to a temperature no greater than about 240° C. The mixture generally includes bishydroxylbutyl terephthalate, an organic solvent, and a catalyst.

The exposing step is generally carried out at a temperature no greater than about 240° C. For example, the exposing step may be conducted at a temperature no greater than about 230° C., preferably no greater than about 220° C., and more preferably no greater than about 210° C. In other embodiments, the exposing step may be conducted at a temperature no greater than about 200° C., and more preferably no greater than about 190° C. In terms of pressure, the exposing step is generally performed at a pressure no less than about atmospheric pressure. In particular embodiments, polycondensation takes place during the exposing step.

Various organic solvents may be used to practice the present invention. In some embodiments, the organic solvent may include at least one member selected from the group consisting of tetradecane, hexadecane, octadecane, toluene, xylene, trimethylbenzene, tetramethylbenzene, ethylbenzene, propylbenzene, naphthalene, methylnaphthalene, biphenyl, triphenyl, diphyenyl ether (or a halogenated derivative thereof), anisol, methylene chloride, dimethyoxybenzene, chlorobenzene, dichlorobenzene, trichlorobenzene, chloronaphthalene, dichloronaphthalene, and/or a perfluorocarbon. In particular embodiments, the organic solvent may include ortho-xylene. In other embodiments, the organic solvent may include ortho-dichlorobenzene. In some embodiments, the organic solvent may include an alkane, such as tetradecane and hexadecane. In other embodiments, the organic solvent may include a perfluorocompound, such as perfluoro(tri-n-butylamine) and perfluoro(tri-n-pentylamine). The organic solvent used preferably has a boiling point no greater than about 210° C.

Examples of suitable catalysts include those that have been listed hereinabove. In some embodiments, for example, the catalyst may include a metal Q chosen from the group consisting of Sn or Ti. In these embodiments, the catalyst may be present in the mixture at a concentration less than about 1.0 mol Q per 100 mol monomer repeat units, preferably less than about 0.5 mol Q per 100 mol monomer repeat units, and more preferably less than about 0.1 mol Q per 100 mol monomer repeat units. In particular embodiments, the catalyst may be present in the mixture at a concentration less than about 0.05 mol Q per 100 mol monomer repeat units, and more preferably less than about 0.01 mol Q per 100 mol monomer repeat units.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIGS. 13A, B, and C show three acid titration curves for a blank (A), a commercially-available PBT (Valox 315) (B), and a low-acid PBT produced by methods described herein, according to illustrative embodiments of the invention.

FIGS. 14A, B, C, and D show plots of molecular weight of polymer as a function of reaction time for polymerization reactions using various proportions of Ti-free linear oligomer and crude linear oligomer as reactants, thereby demonstrating the recyclability of linear oligomers produced in the depoly- merization of PBT to form cPBT, according to illustrative embodiments of the invention.

DESCRIPTION OF THE ILLUSTRATIVE EMBODIMENT

Figure 1:
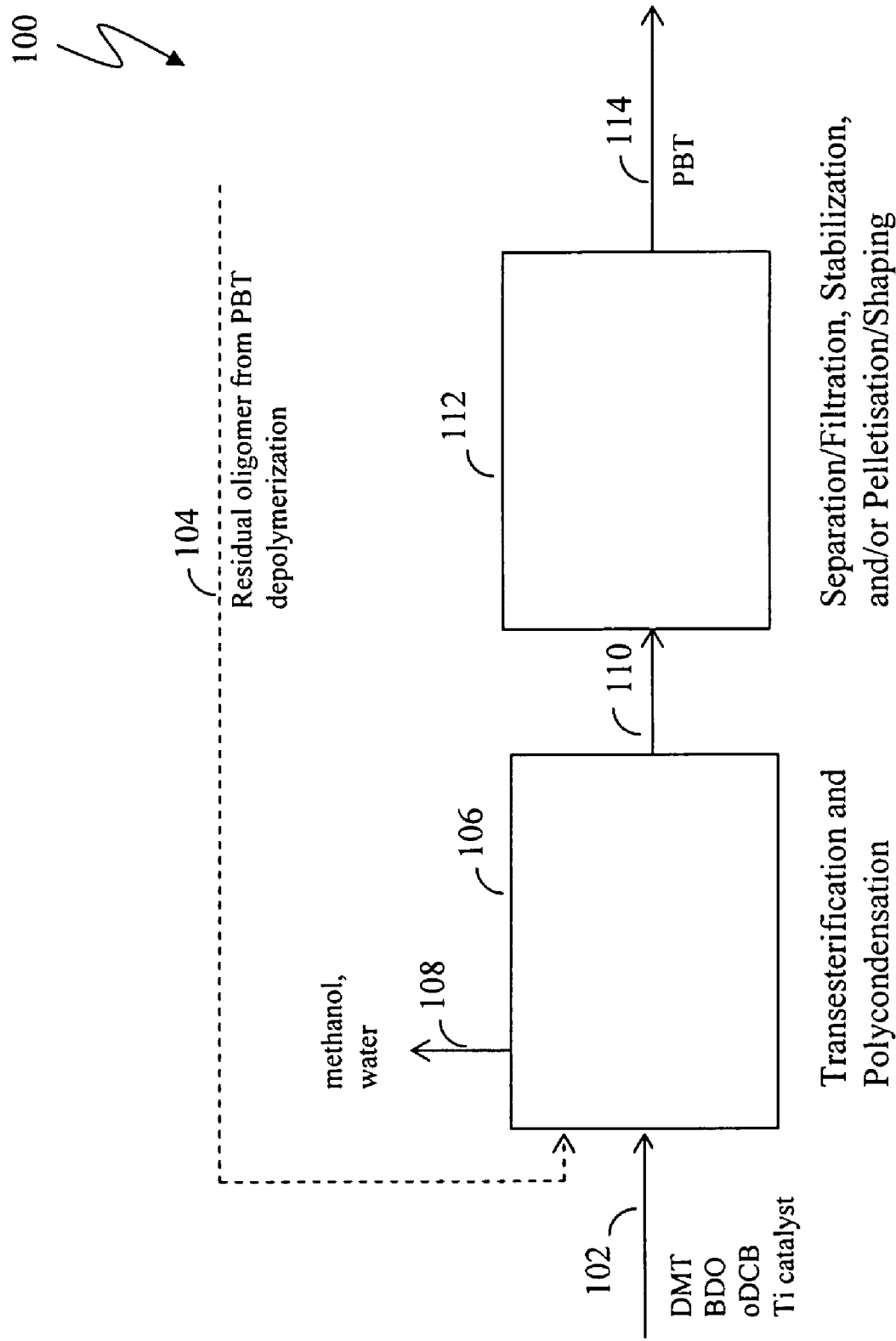
FIG. 1 is a process flow diagram depicting unit operations in a process for producing a low-acid polyalkylene terephthalate, according to an illustrative embodiment of the invention.

Embodiments of the invention provide methods and systems for manufacturing low-acid polyalkylene terephthalate, for example, polybutylene terephthalate (PBT), by reacting a diol and a dialkyl ester (and/or an oligomer recyclate) in an organic solvent and in the presence of a catalyst to form non-isolated, low-acid polyalkylene terephthalate. The invention also relates to methods and systems for preparing macrocyclic polyester oligomer (MPO) from low-acid polyalkylene terephthalate depolymerization in an organic solvent and in the presence of a catalyst. By combining these methods, the invention affords methods for preparing MPO via polymerization and subsequent depolymerization/cyclization of a low-acid polyalkylene terephthalate.

In this combined method, it has been found that overall conversion of reactants to MPO can be improved by recycling at least a portion of the residual oligomers formed as a byproduct in the depolymerization of polyalkylene terephthalate. Thus, the invention affords methods for using a residual oligomer byproduct as a recyclate in a process for producing macrocyclic polyester oligomer. The residual oligomer is a byproduct of the depolymerization of a polyester, for example, a low-acid polyalkylene terephthalate. A recycle stream containing oligomer residue from a depolymerization step is advantageously used as a raw material in the polymerization step to form low-acid polyalkylene terephthalate, which is subsequently depolymerized to form macrocyclic polyester oligomer.

It has been found that use of the above-referenced recyclate can be improved by removing metal-containing catalyst residue from the recyclate stream before it is used in the polymerization of a polyalkylene terephthalate. Accordingly, the invention relates to methods for removing catalyst residue from a process stream in which low-acid polyalkylene terephthalate has been depolymerized to produce macrocyclic polyester oligomer. In one embodiment, the invention relates to a method for precipitating a metal-containing compound from a mixture without addition of water. Thus, the invention facilitates the recycling of residual oligomer from a depolymerization process stream by allowing filtering of the stream without addition of water and without buildup of catalyst residue.

Throughout the description, where compositions, mixtures, blends, and composites are described as having, including, or comprising specific components, or where processes and methods are described as having, including, or comprising specific steps, it is contemplated that, additionally, there are compositions, mixtures, blends, and composites of the present invention that consist essentially of, or consist of, the recited components, and that there are processes and methods of the present invention that consist essentially of, or consist of, the recited processing steps.

It should be understood that the order of steps or order for performing certain actions is immaterial so long as the invention remains operable. Moreover, two or more steps or actions may be conducted simultaneously.

Macrocyclic polyester oligomers that may be employed in this invention include, but are not limited to, macrocyclic poly(alkylene dicarboxylate) oligomers having a structural repeat unit of the formula:

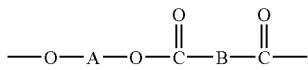

where A is an alkylene, or a cycloalkylene or a mono- or polyoxyalkylene group; and B is a divalent aromatic or alicyclic group.

Preferred macrocyclic polyester oligomers include macrocyclic poly(1,4-butylene terephthalate) (cPBT), macrocyclic poly(1,3-propylene terephthalate) (cPPT), macrocyclic poly(1,4-cyclohexylenedimethylene terephthalate) (cPCT), macrocyclic poly(ethylene terephthalate) (cPET), and macrocyclic poly(1,2-ethylene 2,6-naphthalenedicarboxylate) (cPEN) oligomers, and copolyester oligomers comprising two or more of the above monomer repeat units.

Methods of the invention may be used to produce macrocyclic homo- and co-polyester oligomers. In one embodiment, macrocyclic ester homo- and co-oligomers produced via methods of this invention include oligomers having a general structural repeat unit of the formula:

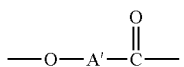

where A' is an alkylene, cycloalkylene, or mono- or polyoxyalkylene group, and where A' may be substituted, unsubstituted, branched, and/or linear. Example MPO's of this type include butyrolactone and caprolactone, where the degree of polymerization is one, and 2,5-dioxo-1,4-dioxane, and lactide, where degree of polymerization is two. The degree of polymerization may also be 3, 4, 5, or higher. Molecular structures of 2,5-dioxo-1,4-dioxane and lactide, respectively, appear below:

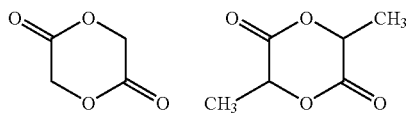

In general, a macrocyclic polyester oligomer (an MPO) produced via methods of the invention includes species of different degrees of polymerization. Here, a degree of polymerization (DP) with respect to the MPO means the number of identifiable structural repeat units in the oligomeric backbone. The structural repeat units may have the same or different molecular structure. For example, an MPO may include dimer, trimer, tetramer, pentamer, and/or other species.

It is contemplated that alternative embodiments of the invention include methods for preparing and/or depolymerizing/cyclizing low-acid poly(alkylene isophthalate), including poly(butylene isophthalate). Certain embodiments of the invention include methods for preparing low-acid poly(butylene terephthalate), poly(alkylene terephthalate), poly(propylene terephthalate), and/or copolymers thereof. Further, it is contemplated that alternative embodiments of the invention include methods for preparing and/or depolymerizing/cyclizing low-acid poly(alkylene dicarboxylates) other than poly (alkylene terephthalates). It is contemplated that alternative embodiments include methods for preparing and/or depolymerizing/cyclizing mixtures of two or more species, where the two or more species can be selected from any combination of one or more of the following categories: poly(alkylene isophthalates), poly(alkylene terephthalates), and other poly (alkylene dicarboxylates).

Where methods of the invention refer to the use of a dialkyl terephthalate, such as DMT, those methods are also contemplated to include variations of the method in which terephthalic acid is used instead of at least a portion of the dialkyl terephthalate. For example, it is contemplated that a method of the invention in which a transesterification is performed using a dialkyl terephthalate and a diol inherently includes an adaptation in which terephthalic acid is used instead of the dialkyl terephthalate and a direct esterification is performed instead of a transesterification.

It is contemplated that methods, systems, and processes of the claimed invention encompass scale-ups, variations, and adaptations developed using information from the embodiments described herein. For example, the invention includes pilot plant and plant-scale manufacturing processes whose feasibility is demonstrated by the laboratory-scale experiments described herein. The chemical reactions described herein may be performed using reactor equipment that is known to those of ordinary skill in the field of polymer manufacturing and processing, including, without limitation, for example, batch reactors, plug-flow reactors, continuously-stirred tank reactors, packed-bed reactors, slurry reactors, and fluidized bed reactors. Chemical reactions described herein may be conducted in batch, semi-continuous, and/or continuous operation.

Scale-up of systems from laboratory to plant scale may be performed by those of ordinary skill in the field of polymer manufacturing and processing. For example, those of ordinary skill in this field may select reactor types, design experiments for obtaining kinetic data, develop and apply models for reactor design, develop economically optimum reactor design, and/or validate reactor designs via pilot plant and/or full scale reactor experiments. General information regarding reactors and the design of reactor systems for manufacture of products may be found, for example, in "Kinetics and Reaction Engineering," John L. Falconer, editor, in *The Engineering Handbook*, Section X, Richard C. Dorf, editor-in-chief, CRC Press, Inc., ISBN 0-8493-8344-7, pp. 785-829 (1995).

Any suitable techniques for material separation, isolation, and purification may be adapted for application in manufacturing processes encompassed by various embodiments of the invention, for example, techniques for distillation, extraction, reactive extraction, adsorption, absorption, stripping, crystallization, evaporation, sublimation, diffusional separation, adsorptive bubble separation, membrane separation, and/or fluid-particle separation. General information regarding separation processes and their design may be found, for example, in "Separation Processes," Klaus Timmerhaus, editor, in *The Engineering Handbook*, Section VIII, Richard C. Dorf, editor-in-chief, CRC Press, Inc., ISBN 0-8493-8344-7, pp. 579-657 (1995).

It is also contemplated that methods, systems, and processes of the claimed invention may include pumps, heat exchangers, and gas-, liquid-, and/or solid-phase material handling equipment known to those of ordinary skill in the field of polymer manufacturing and processing.

Embodiments of the invention may be performed as part of a continuous, semi-continuous, or batch process. Reactors may be single-stage or multi-stage. It is contemplated that methods of the invention may be combined or supplemented with reactors, systems, or processes that are known in the art.

The mention herein of any publication, for example, in the Background section, is not an admission that the publication serves as prior art with respect to any of the claims presented herein. The Background section is presented for purposes of clarity and is not meant as a description of prior art with respect to any claim.

The following general definitions may be helpful in understanding the various terms and expressions used in this specification.

Definitions

As used herein, "macrocyclic" is understood to mean a cyclic molecule having at least one ring within its molecular structure that contains 5 or more atoms covalently connected to form the ring.

As used herein, an "oligomer" is understood to mean a molecule that contains one or more identifiable structural repeat units of the same or different formula.

As used herein, a "macrocyclic polyester oligomer" (MPO) is understood to mean a macrocyclic oligomer containing structural repeat units having an ester functionality. A macrocyclic polyester oligomer typically refers to multiple molecules of one specific repeat unit formula. However, a macrocyclic polyester oligomer also may include multiple molecules of different or mixed formulae having varying numbers of the same or different structural repeat units. Thus, the terms "macrocyclic polyester oligomer" and "macrocyclic polyester oligomers" (plural form) may be used interchangeably. Also, the terms "macrocyclic polyester oligomer" and "macrocyclic oligoester" are used interchangeably herein. A macrocyclic polyester oligomer may be a co-polyester or multi-component polyester oligomer, i.e., an oligomer having two or more different structural repeat units having ester functionality within one cyclic molecule.

As used herein, "substantially homo- or co-polyester oligomer" is understood to mean a polyester oligomer wherein the structural repeat units are substantially identical or substantially composed of two or more different structural repeat units, respectively. Unless otherwise noted, the polyester oligomers described herein include substantially homo-polyester oligomers as well as substantially co-polyester oligomers.

As used herein, an "alkylene group" is understood to mean $—C_nH_{2n}—$, where $n \geq 2$.

As used herein, a "cycloalkylene group" is understood to mean a cyclic alkylene group, $—C_nH_{2n-x}—$, where x represents the number of H's replaced by cyclization(s).

As used herein, a "mono- or polyoxyalkylene group" is understood to mean $[—(CH_2)_m—O—]_n—(CH_2)_m—$, wherein m is an integer greater than 1 and n is an integer greater than 0.

As used herein, a "divalent aromatic group" is understood to mean an aromatic group with links to other parts of the macrocyclic molecule. For example, a divalent aromatic group may include a meta- or para-linked monocyclic aromatic group (e.g., benzene).

As used herein, an "alicyclic group" is understood to mean a non-aromatic hydrocarbon group containing a cyclic structure within.

As used herein, a "$C_{1-4}$ primary alkyl group" is understood to mean an alkyl group having 1 to 4 carbon atoms connected via a primary carbon atom.

As used herein, a "$C_{1-10}$ alkyl group" is understood to mean an alkyl group having 1 to 10 carbon atoms, including straight chain or branched radicals.

As used herein, a "methylene group" is understood to mean $—CH_2—$.

As used herein, an "ethylene group" is understood to mean $—CH_2—CH_2—$.

As used herein, a "$C_{2-3}$ alkylene group" is understood to mean $—C_nH_{2n}—$, where n is 2 or 3.

As used herein, a "$C_{2-6}$ alkylene group" is understood to mean $—C_nH_{2n}—$, where n is 2-6.

As used herein, "substitute phenyl group" is understood to mean a phenyl group having one or more substituents. A substituted phenyl group may have substitution pattern that is recognized in the art. For example, a single substituent may be in the ortho, meta or para positions. For multiple substituents, typical substitution patterns include, for example, 2,6-, 2,4,6-, and, 3,5-substitution patterns.

As used herein, a "filler" is understood to mean a material other than a macrocyclic polyester oligomer or a polymerization catalyst that may be included in a blend material comprising a macrocyclic polyester oligomer. One or more fillers may be introduced at any point before, during, or after the processes described herein. A filler may be used to achieve a desired purpose or property, and may be present or transformed into known and/or unknown substances in the resulting polyester polymer. For example, the purpose of the filler may be to provide stability, such as chemical, thermal, or light stability, to the blend material or the polymer composition; to increase the strength of the polymer composition/product; and/or to increase electrical and/or thermal conductivity of the blend material and/or the polymer composition. A filler also may provide or reduce color, provide weight or bulk to achieve a particular density, provide reduced gas and vapor permeability, provide flame or smoking resistance (i.e., be a flame retardant), be a substitute for a more expensive material, facilitate processing, and/or provide other desirable properties. Illustrative examples of fillers are, among others, graphite, exfoliated graphite, carbon nanotubes, carbon black, carbon fibers, buckminsterfullerene, diamond, anhydrous magnesium silicate (anhydrous talc), fumed silica, titanium dioxide, calcium carbonate, wollastonite, chopped fibers, fly ash, glass, glass fiber, milled glass fiber, glass microspheres, micro-balloons, crushed stone, nanoclay, linear polymers, monomers, branched polymers, engineering resin, impact modifiers, organoclays, and pigments. Multiple fillers may be included in MPO blends, for example, to achieve a balance of properties. For example, an impact modifier may be added to an MPO blend containing exfoliated graphite so that the resulting blend and/or polymer composition exhibits high impact resistance as well as high electrical conductivity.

Various organic solvents may be used to practice the present invention. In some embodiments, the organic solvent may include at least one member selected from the group consisting of tetradecane, hexadecane, octadecane, toluene, xylene, trimethylbenzene, tetramethylbenzene, ethylbenzene, propylbenzene, naphthalene, methylnaphthalene, biphenyl, triphenyl, diphyenyl ether (or a halogenated derivative thereof), anisol, methylene chloride, dimethyoxybenzene, chlorobenzene, dichlorobenzene, trichlorobenzene, chloronaphthalene, dichloronaphthalene, and/or a perfluorocarbon. In particular embodiments, the organic solvent may include ortho-xylene. In other embodiments, the organic solvent may include ortho-dichlorobenzene. In some embodiments, the organic solvent may include an alkane, such as tetradecane and hexadecane. In other embodiments, the organic solvent may include a perfluorocompound, such as perfluoro(tri-n-butylamine) and perfluoro(tri-n-pentylamine).

FIG. 1 is a flow diagram 100 depicting a process for producing a low-acid polyalkylene terephthalate, according to one embodiment of the invention. In the example depicted in FIG. 1, dimethyl terephthalate (DMT) and butanediol (BDO) are reacted to produce low-acid polybutylene terephthalate (PBT). One or more input streams 102 provide reactants, including DMT, BDO, and, optionally, a residual oligomer byproduct from the depolymerization of PBT 104. The one or more input streams 102 also provide solvent (i.e., ortho-dichlorobenzene, oDCB), and a titanium catalyst. The process includes one or more unit operations 106 for producing a low-acid polyalkylene terephthalate, in which transesterification and polycondensation reactions occur. Methanol and water that are evolved as gas 108 during the reactions may be captured and condensed to liquid form. The following are examples of reactions that are believed to occur during transesterification and polycondensation:

Side reactions forming tetrahydrofuran (THF) may occur in the transesterification and/or polycondensation steps, for example, as shown in exemplary Reactions 3 and 4 as follows:

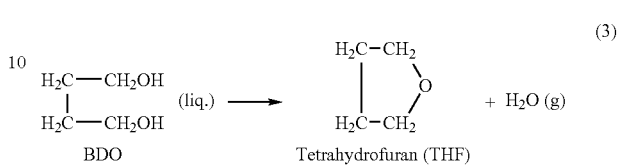

(3)

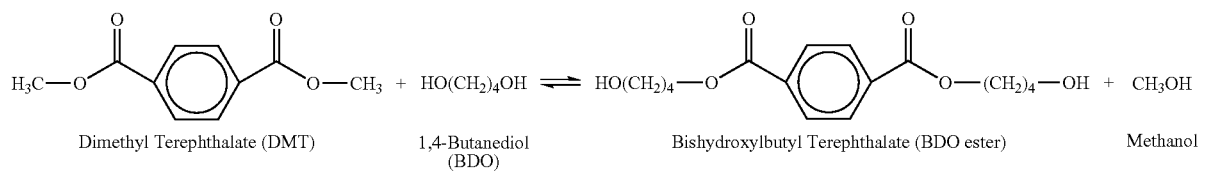

(1)

Reaction 1 is an equilibrium reaction and is driven forward by removal of the methanol produced.

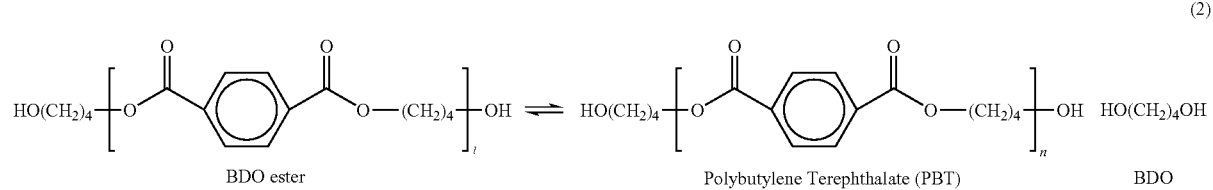

(2)

The polycondensation illustrated in Reaction 2 is an equilibrium reaction and is driven forward by removal of the BDO produced.

The reactions can be performed with, but do not require, application of high heat and/or application of a vacuum and/or can be conducted at about atmospheric pressure (or greater than atmospheric pressure) and at temperatures around the boiling point of the solvent. It is possible to use very low concentrations of catalyst, for example, it is possible to use less than about 0.03 mol % Ti (0.03 mole Ti per 100 moles monomer repeat units). The one or more unit operations 106 include one or more reactors for performing the transesterification and polycondensation reactions. The reactor(s) may be single-stage or multi-stage reactors, and the process 100 may be a continuous, semi-continuous, or batch process. Because the reactions may be conducted at lower temperatures than standard PBT production methods, a special reactor for minimizing sublimation of reactant DMT may not be necessary. Furthermore, the number of reactors needed may be reduced because the polycondensation reaction may be conducted, at least in part, in the same reaction vessel in which transesterification is conducted.

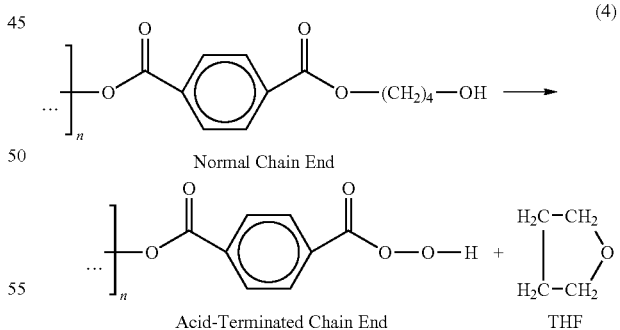

(4)

It has been found that these side reactions can be reduced in implementations where low temperature and low catalyst concentrations are used in the transesterification and/or polycondensation steps.

The process 100 depicted in FIG. 1 may optionally include an input stream 104 that provides a residual oligomer as a reactant in the production of low-acid PBT. For example, the process stream 104 may include residual linear oligomer from the depolymerization of PBT, such as a carboxylic acid-terminated linear oligomer species shown below:

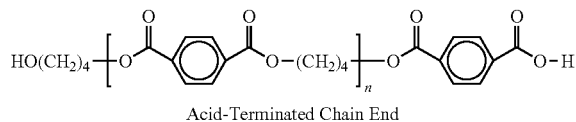

Acid-Terminated Chain End where n is an integer, generally from 1 to about 5, but where higher molecular weight species are possible as well. The use of carboxylic acid-terminated linear oligomer species as reactant in the polymerization of low-acid PBT results in the formation of water due to the condensation of acids with BDO, for example, as illustrated in Reaction 5 as follows:

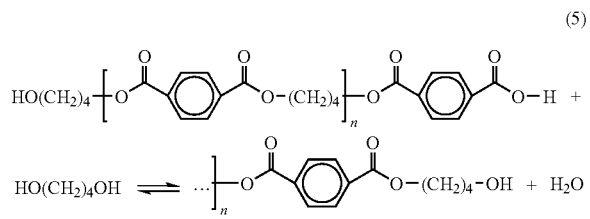

(5)

The amount of BDO that is required to convert linear oligomers to high molecular weight PBT can be determined by measuring the acid level of the linear oligomers used as reactant. It has been found that slight molar excesses of BDO relative to the acids present in the linears (for example, from about 10% to about 50%) are generally adequate to convert the linears to high molecular weight polymer with low residual acid in the resulting PBT.

The output stream 110 of the polymerization may then be filtered for removal of non-PBT species, and stabilized in order to prevent formation of acid species. The low-acid PBT may be pelletized, shaped, or otherwise processed 112 so that the resulting PBT product 114 is in a form that is convenient for transport.

The ability to use less catalyst in the production of cPBT provides advantages in addition to the cost savings from the use of less catalyst. For example, use of less catalyst results in a lower level of diol-terminated linears in the dilute depolymerization reaction, and consequently lowers the level of residual acids in cPBT filtrate streams. Also, the presence of less acid and less titanium catalyst improves the filterability of the linear byproduct, reducing associated processing and capital equipment costs.

In certain embodiments, the solution polymerization process for producing low-acid PBT offers improvement over traditional melt or solid state processes. For example, the solution polymerization process for production of low-acid PBT requires less capital equipment than traditional higher-acid PBT production processes because it is possible to conduct polymerization at atmospheric pressure, and further, in certain embodiments, the solution polymerization process does not require a separate step for isolating the PBT.

Figure 2:
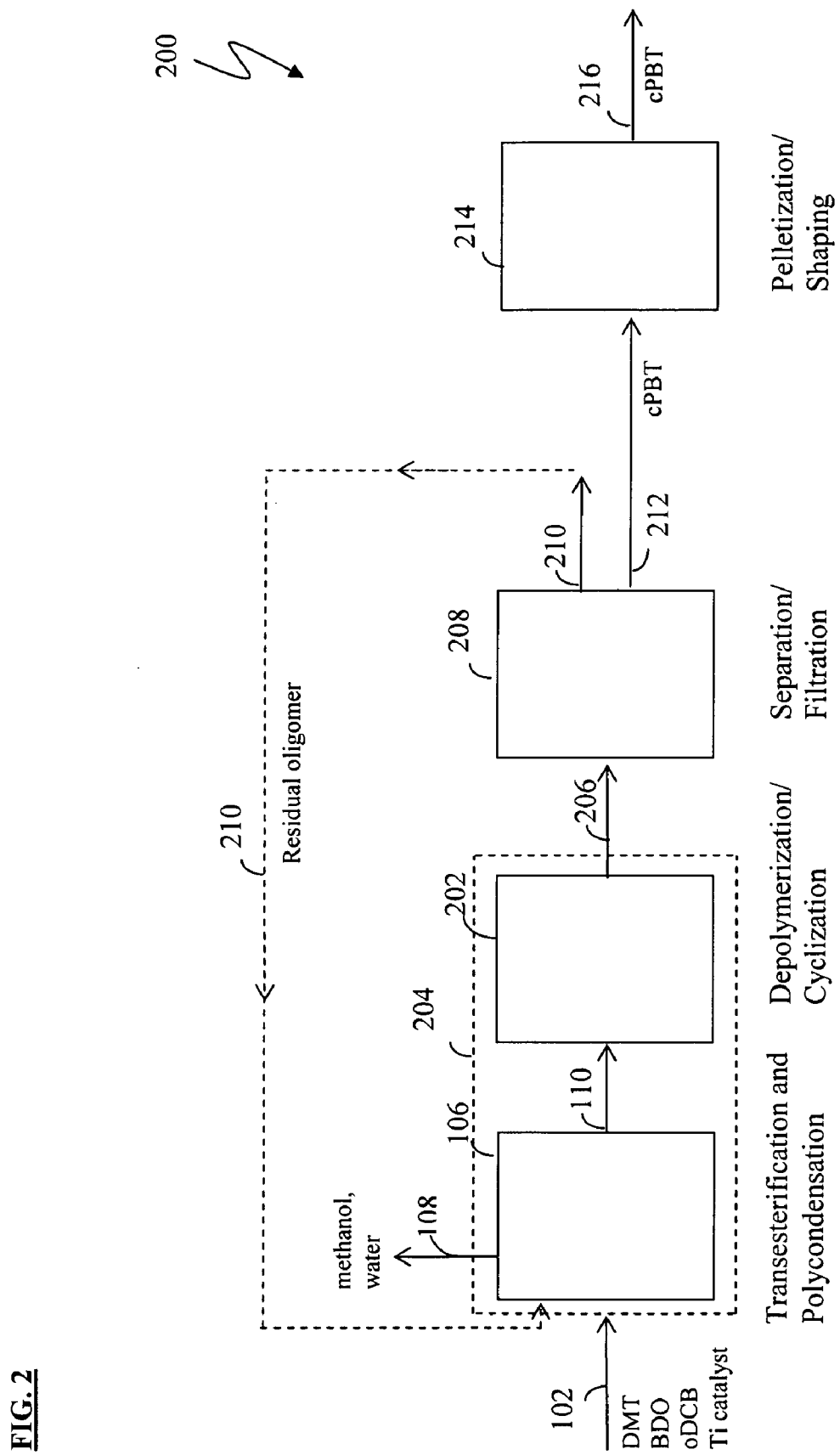
FIG. 2 is a process flow diagram depicting unit operations in a process for producing a macrocyclic polyester oligomer by polymerizing and subsequently depolymerizing/cyclizing a low-acid polyalkylene terephthalate, according to an illustrative embodiment of the invention.

FIG. 2 is a flow diagram 200 depicting a process for producing a macrocyclic polyester oligomer by polymerizing and subsequently depolymerizing/cyclizing a low-acid polyalkylene terephthalate. In the example depicted in FIG. 2, DMT and BDO react to produce low-acid PBT 110, which is depolymerized (cyclized) to form cPBT. The output stream 110 of the polymerization step 106 contains low-acid PBT and is used as input in a depolymerization (cyclization) step 202. It may not be necessary to transfer the polymerization output 110 from one vessel to another, because depolymerization may be conducted using one or more of the reaction vessel(s) used in the polymerization step. In one embodiment, a single unit operation 204 includes both the polymerization and depolymerization steps. In certain embodiments, the low-acid PBT is, essentially, an intermediate in the production of cPBT. The low-acid PBT produced thusly may be allowed to build to a molecular weight determined to provide improved overall cPBT production rate and/or properties. For example, in certain embodiments, the average molecular weight of the intermediate low-acid PBT may be allowed to build to greater than about 1000 Da, greater than about 5000 Da, greater than about 10,000 Da, greater than about 15,000 Da, greater than about 25,000 Da, greater than about 40,000 Da, greater than about 60,000 Da, greater than about 75,000 Da, greater than about 100,000 Da, or greater than about 125,000 Da. In certain embodiments, the average molecular weight of the intermediate low-acid PBT may be kept from building too high; for example, the molecular weight of the intermediate low-acid PBT may be kept lower than about 125,000 Da, lower than about 100,000 Da, lower than about 75,000 Da, lower than about 60,000 Da, lower than about 40,000 Da, lower than about 25,000 Da, lower than about 15,000 Da, lower than about 10,000 Da, or lower than about 5000 Da. In certain embodiments, the average molecular weight of the intermediate low-acid PBT may be kept within a range, for example, from about 1000 Da to about 125,000 Da, from about 5,000 Da to about 75,000 Da, from about 15,000 Da to about 60,000 Da, from about 25,000 Da to about 40,000 Da, or from about 40,000 Da to about 100,000 Da.

The unit operations depicted in the figures may include input and output streams in addition to those shown. For example, in FIG. 2, solvent may be added to dilute the product of the polymerization step 106 to levels required for the depolymerization step 202. The process streams shown may contain components other than those listed. The representative contents of process streams are provided for convenience.

In the process of FIG. 2, an output stream 206 of the depolymerization reaction may contain cPBT product in oDCB solvent, as well as byproducts including, for example, residual oligomer, catalyst residue, THF complexes, non-MPO macrocyclic material, and other compounds. The depolymerization output stream 206 undergoes filtration and/or other separation processing so that cPBT product 212 and/or residual oligomers 210 may be extracted. The cPBT product 212 can undergo pelletization and/or shaping 214 for conversion into an easily-transportable form. Pelletization and shaping methods that may be used in this step are described, for example, in co-owned U.S. Patent Application Publication No. US 2004/0254281, entitled, "Isolation, Formulation, and Shaping of Macrocyclic Oligoesters," by Thompson et al., the text of which is incorporated by reference herein in its entirety.

A recycle stream 210 rich in residual oligomer including, for example, the above-referenced carboxylic acid-terminated linear oligomer species, may be separated from the depolymerization output stream 206. The residual oligomer-rich stream 210 can then be used as input in the polymerization step (106 or 204), thereby increasing overall conversion of monomers to cPBT.

It is generally preferable, but not required, to remove catalyst residue before using oligomer byproduct as recyclate in the polymerization step (106 or 204 of FIGS. 1 and 2), as this yields the desired low-acid polyester while requiring less BDO for the reaction to build to a sufficiently high molecular weight. Re-polymerization of the residual oligomer to PBT that is suitable for use in cPBT production is demonstrated using titanium-free or crude residual oligomers and with residual oligomers that are combined with monomers (i.e. BDO and DMT).

A catalyst, for example, a titanium catalyst that is added to a dilute PBT-depolymerization reaction mixture containing oDCB solvent will transition from a soluble, homogeneous form into an insoluble form with exposure to a sufficiently high temperature for a sufficient period of time. The precipitated catalyst residue can be separated from depolymerization reaction products—for example, cPBT and low molecular weight, acid-terminated linear oligomers—by any suitable separation technique, such as filtration, centrifugation, or decantation techniques. The ability to remove the titanium from the product and byproducts of the depolymerization reaction, without a water quench step, allows recycling of the residual oligomers to form PBT, and subsequently cPBT, without q build-up of titanium in the overall integrated process.

Figure 3:
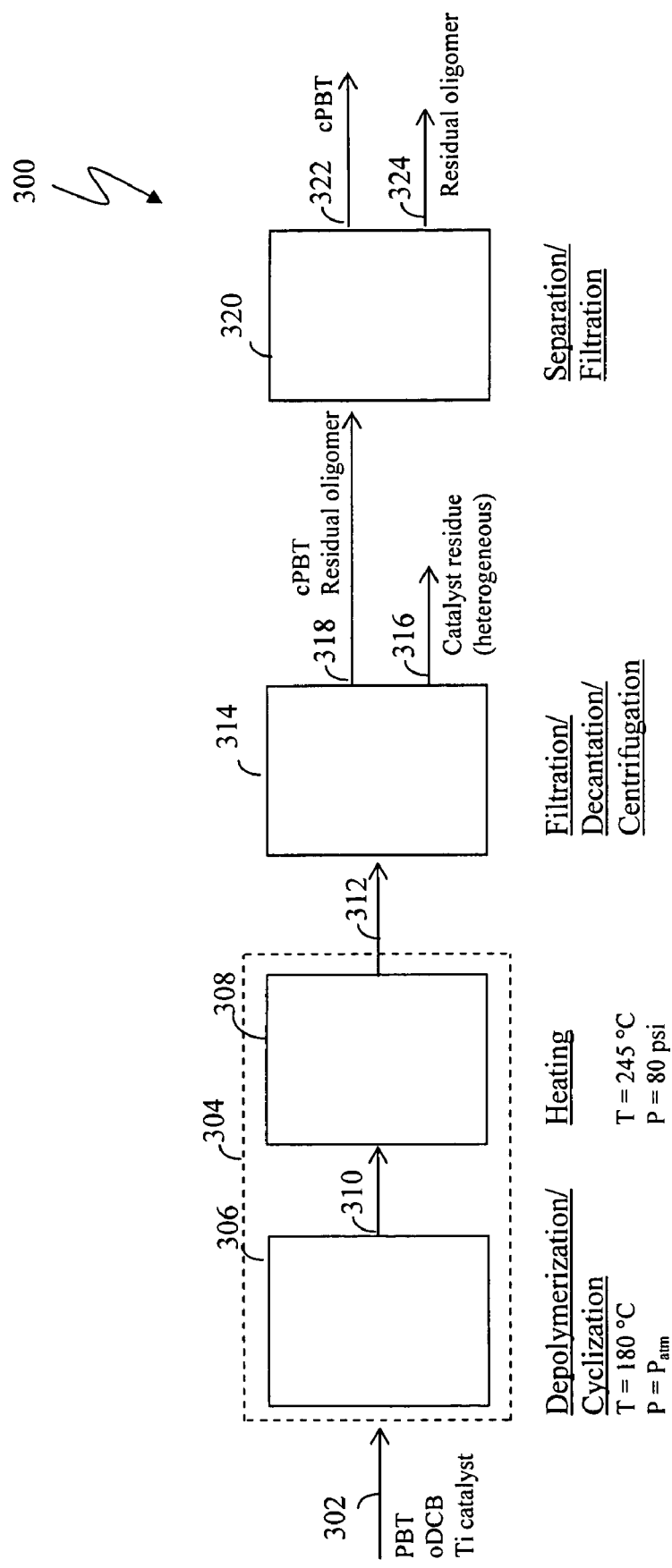
FIG. 3 is a process flow diagram depicting unit operations in a process for removing catalyst residue from a depolymerization process stream and separating out byproduct residual oligomer for use as a recyclate, wherein the catalyst residue removal step includes heating a depolymerization product stream so that homogeneous catalyst material therein becomes inhomogeneous and precipitates out of solution, according to an illustrative embodiment of the invention.

FIG. 3 is a process flow diagram depicting unit operations in an embodiment of a process for removing catalyst residue from a depolymerization process stream, according to an embodiment of the invention. In some embodiments, catalyst residue removal involves heating the depolymerization product stream at a sufficiently high temperature for a sufficiently long period of time so that homogeneous, Ti-containing catalyst material therein becomes inhomogeneous and precipitates out of solution. For example, PBT dissolved in organic solvent such as oDCB (as might be provided, for example, by stream 110 of FIG. 2 but could also be provided by other means) undergoes depolymerization/cyclization 306 in the presence of a Ti-containing catalyst to produce an output stream 310 containing cPBT, dissolved catalyst residue, residual oligomer, and other byproducts. In one embodiment, the depolymerization and cyclization takes place at a lower temperature, for example, at 180° C. In certain embodiment, for example, the depolymerization/cyclization takes place at a temperature below about 245° C., at a temperature below about 225° C., at a temperature below about 200° C., and at a temperature below about 190° C. The depolymerization step 306 in FIG. 3 thus could be analogous to the depolymerization step 202 in FIG. 2. In step 308 of FIG. 3, the depolymerization reaction products 310 are heated to a temperature of at least about 200° C., preferably at least about 225° C., and more preferably at least about 245° C. The heating step 308 may be conducted under pressure—for example, from about 50 psi to about 100 psi, and preferably at about 80 psi, where the temperature is about 245° C.—in order to avoid vaporization of solvent. After a sufficient period of time—for example, from about 10 minutes to about 30 minutes where the temperature is about 245° C.—the Ti catalyst transitions from soluble to insoluble form and precipitates out of solution. The catalyst in the output stream 312 from the heating step 308 then can be simply filtered or otherwise removed 314 to produce a solid filter cake rich in catalyst residue 316, as well as a filtrate stream 318 containing dissolved cPBT and residual oligomer. The filtrate 318 may be further processed in one or more additional separation/filtration steps 320 to isolate product cPBT and to isolate residual oligomer 324, which can be used as a reactant in a polymerization, for example, analogous to 210 used in unit operation 106 in FIG. 2.

Figure 4:
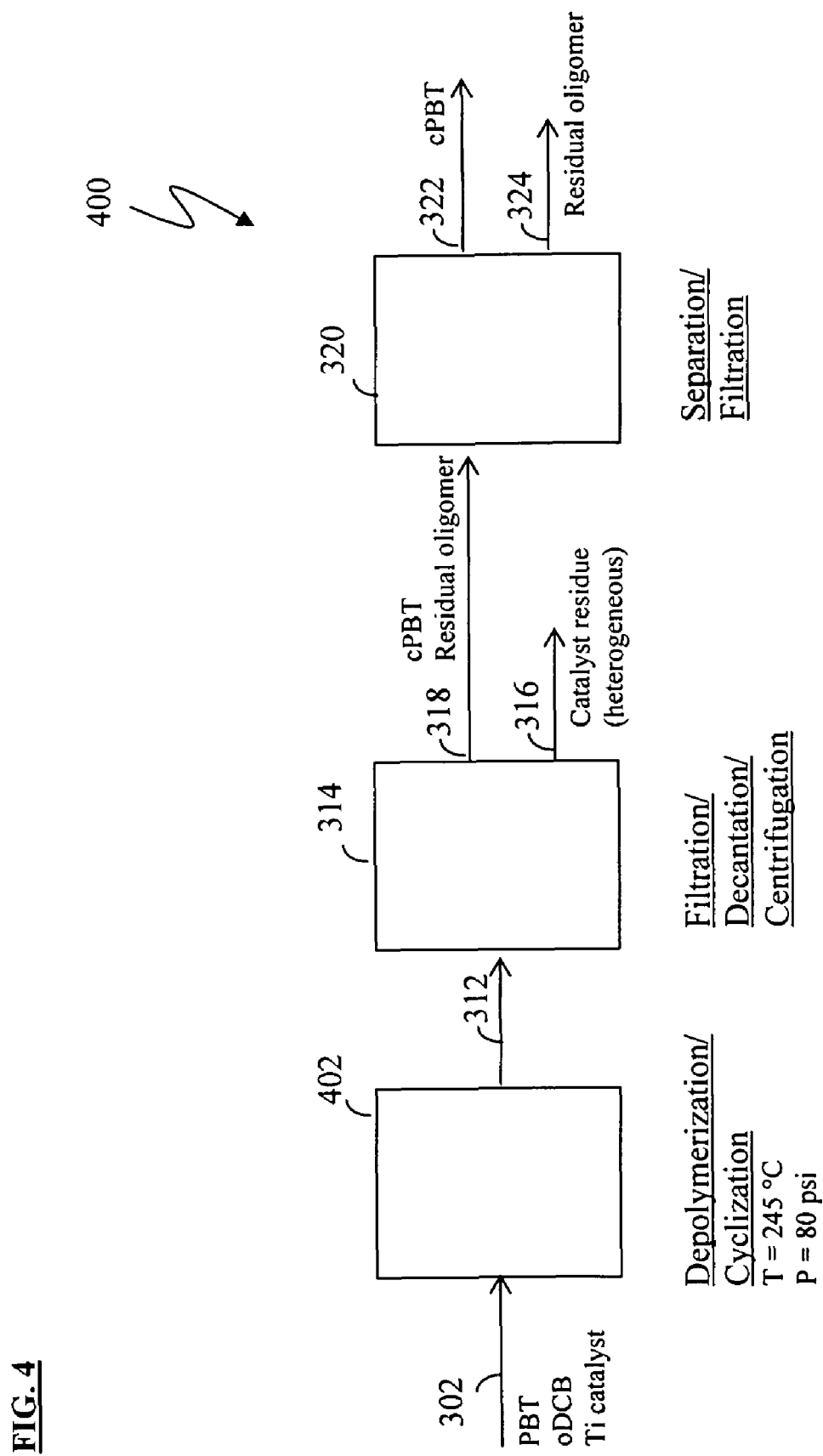
FIG. 4 is a variation of the process flow diagram of FIG. 3, wherein the depolymerization/cyclization is performed at a temperature high enough to allow conversion of metal-containing catalyst residue to precipitates from solution during depolymerization, thereby eliminating the need for the separate heating unit operation of FIG. 3, according to an illustrative embodiment of the invention.

The depolymerization/cyclization step 306 and the heating step 308 to remove residual catalyst may be performed in the same vessel, or as part of the same unit operation 304. In one embodiment, depolymerization and precipitation of catalyst residue overlaps or occurs simultaneously. For example, FIG. 4 is a process flow diagram 400 depicting a variation of the process 300 in FIG. 3, wherein the depolymerization/cyclization 402 is performed at a temperature high enough (and for a residence time long enough) to allow conversion of metal-containing catalyst residue to precipitate from solution during polymerization. For example, in certain embodiments, the depolymerization/cyclization 402 is performed at a temperature of at least about 245° C. for a residence time of at least about 10 minutes; at a temperature of at least about 200° C. for a residence time of at least about 30 minutes; at a temperature of at least about 225° C. for a residence time of at least about 20 minutes; at a temperature of at least about 245° C. for a residence time of at least about 15 minutes; at a temperature of at least about 245° C. for a residence time of at least about 20 minutes; and at a temperature of at least about 260° C. for a residence time of at least about 5 minutes. In the process 400 of FIG. 4, there is no need for a separate heating step to remove catalyst residue, rather the output stream from cyclization 312 is subjected to filtration, decantation, centrifugation, and/or other separation 314 to produce a catalyst residue 316 and cPBT residual oligomer 318, as in the step 314 of FIG. 3.

Polymerization catalysts and depolymerization/cyclization catalyst that may be used in methods of the invention include known organotin and organotitanate compounds, although other catalysts may be used. In an embodiment of the invention in which a polymerization is conducted to form a polyester, which is subsequently depolymerized to form an MPO, it is possible to use either the same or different catalysts in the polymerization and depolymerization steps.

Illustrative organotin compounds that may be used as polymerization and/or depolymerization/cyclization catalysts include 1,1,6,6-tetra-n-butyl-1,6-distanna-2,5,7,10-tetraoxacyclodecane; n-butyltin(IV) chloride dihydroxide; dialkyltin(IV)oxides, such as di-n-butyltin(IV)oxide and di-n-octyltin oxide, and acyclic and cyclic monoalkyltin (IV) derivatives such as n-butyltin tri-n-butoxide; dialkyltin(IV) dialkoxides such as di-n-butyltin(IV) di-n-butoxide and 2,2-di-n-butyl-2-stanna-1,3-dioxacycloheptane; and trialkyltin alkoxides such as tributyltin ethoxide. See, e.g., U.S. Pat. No. 5,348,985 to Pearce et al.

Also, trisstannoxanes having the general formula (I) shown below can be used as a polymerization and/or depolymerization/cyclization catalyst:

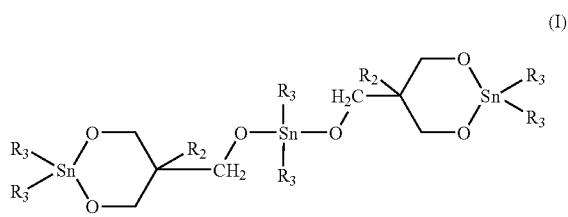

(I)

where $R_2$ is a $C_{1-4}$ primary alkyl group and $R_3$ is a $C_{1-10}$ alkyl group.

Additionally, organotin compounds with the general formula (II) shown below can be used as polymerization and/or depolymerization/cyclization catalysts:

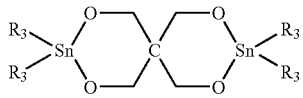

(II)

where $R_3$ is defined as above.

Illustrative titanate compounds that may be used as polymerization and/or depolymerization/cyclization catalysts include tetra(2-ethylhexyl) titanate, tetraisopropyl titanate, tetrabutyl titanate, and titanate compounds with the general formula (III) shown as follows:

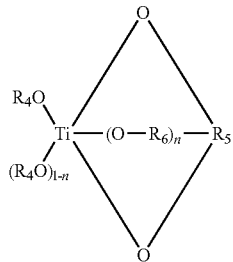

(III)

wherein: each $R_4$ is independently an alkyl group, or the two $R_4$ groups taken together form a divalent aliphatic hydrocarbon group; $R_5$ is a $C_{2-10}$ divalent or trivalent aliphatic hydrocarbon group; $R_6$ is a methylene or ethylene group; and n is 0 or 1.

Examples of titanate compounds with the above general formula are shown in Table 1.

TABLE 1

Examples of Titanate Compounds Having Formula (III)

Di-1-butyl 2,2-dimethylpropane-1,3-dioxytitanate

Di-1-butyl 2(1-propyl)-2 methylpropane-1,3-dioxytitanate

Di(2-ethyl-1-hexyl) 2,2-dimethylpropane-1,3-dioxytitanate

Di(2-ethyl-1-hexyl) 2-(1-propyl)-2-methylpropane-1,3-dioxytitanate

TABLE 1-continued

Examples of Titanate Compounds Having Formula (III)

Di(2-ethyl-1-hexyl) 2-(1-butyl)-2-ethylpropane-1,3-dioxytitanate

Di-1-butyl 2,2-dimethylpropane-1,3-dioxytitanate

Di-1-butyl 2-ethylhexane-1,3-dioxytitanate

Di(2-ethyl-1-hexyl) 2,2-dimethylpropane-1,3-dioxytitanate

Di(2-ethyl-1-hexyl) 2-ethylhexane-1,3-dioxytitanate

Titanate ester compounds having at least one moiety of the following general formulas may also be used as catalysts:

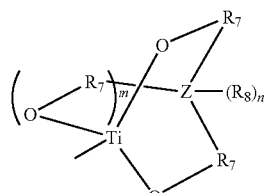

(IV)

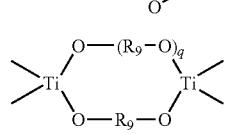

(V)

wherein: each $R_7$ is independently a $C_{2-3}$ alkylene group; $R_8$ is a $C_{1-6}$ alkyl group or unsubstituted or substituted phenyl group; Z is O or N; provided when Z is O, m=n=0, and when Z is N, m=0 or 1 and m+n=1; each $R_9$ is independently a $C_2$-6 alkylene group; and q is 0 or 1.

Examples of such titanate compounds are shown below as formula (VI) and formula (VII):

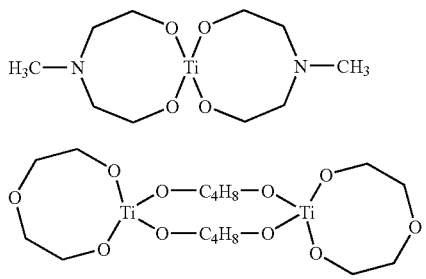

Other catalysts which may be used in embodiments of the invention include aryl titanates, described, for example, in co-owned U.S. Pat. No. 6,906,147, the text of which is incorporated by reference herein in its entirety. Also, polymer-containing organo-metal catalysts may be used in methods of the invention. These include the polymer-containing catalysts described in co-owned U.S. Pat. No. 6,831,138 by Wang, the text of which is incorporated by reference herein in its entirety.

In some embodiments, the catalyst is preferably of a type that is capable of use in both polycondensation as well as depolymerization/cyclization. In one embodiment, where the catalyst is used in a reaction to produce low-acid PBT (i.e. via polycondensation), which does not thereafter undergo depolymerization/cyclization, the catalyst may be any known polyester-forming catalyst, for example, a metal oxide such as antimony oxide; a transition metal salt such as zinc acetate and/or cobalt acetate; a salt of Hg, Pb, Cd, Mn, Cr, Mo, or W; a tin compound and/or a titanate compound; or any combination thereof.

It is within the scope of various embodiments to employ two or more different catalysts. For example, two or more catalysts may be used to vary the rate of polymerization and/or depolymerization/cyclization. Also, a catalyst that has little or no activity may be used in conjunction with a promoter. Reaction may be triggered and/or accelerated on demand by addition of the promoter to a mixture of reactants in the presence of the catalyst(s). Various catalyst/promoter systems are described, for example, in co-owned U.S. patent application Ser. No. 11/329,454, filed on Jan. 10, 2006, the text of which is incorporated herein by reference in its entirety.

Certain catalysts may be reaction products themselves, which are then used to catalyze polymerization and/or depolymerization/cyclization reactions. For example, U.S. Pat. No. 6,787,632 by Phelps et al. (the '632 patent), the text of which is incorporated by reference herein in its entirety, describes a mixture of reaction products of

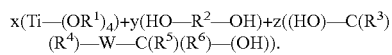

The mixture of reaction products is preferably substantially free from di-functional diols other than HO—$R^2$—OH. That is, the mixture is preferably substantially free from (HO)—$C(R^3)(R^4)$—W—$C(R^5)(R^6)$—(OH). "Substantially free" in this context means that the mixture of reaction products is at least 90%, and preferably 95%, free of all di-functional diols other than HO—$R^2$—OH, which is determined by the amount of diols originally present.

Referring to the above formula, each $R^1$ is independently a $C_1$-$C_{10}$ alkyl group, such as a methyl group, an ethyl group, a propyl group, an isopropyl group, a butyl group, a pentyl group, or a hexyl group. $R^2$ is a $C_2$-$C_6$ alkylene group, such as an ethylene group, a propylene group, or a butylene group. Each of $R^3$, $R^4$, $R^5$, and $R^6$ is independently a hydrogen atom or a $C_1$-$C_4$ alkyl group, such as a methyl group, an ethyl group, a propyl group, an isopropyl group, a butyl group. However, at least one of $R^3$ and $R^4$ and at least one of $R^5$ and $R^6$ is a $C_1$-$C_4$ alkyl group. Thus, (HO)—$C(R^3)(R^4)$—W—$C(R^5)(R^6)$—(OH) is a secondary or a tertiary alcohol. W is an oxygen atom, a sulfur atom, a nitrogen-containing group (e.g., a —$N(R^7)$— group, wherein $R^7$ is a hydrogen atom or a $C_1$-$C_8$ alkyl group), a phosphorus-containing group (e.g., a —$P(R^8)$— group, wherein $R^8$ is a hydrogen atom or a $C_1$-$C_8$ alkyl group), or preferably a $C_1$-$C_4$ alkylene group such as a methylene group, an ethylene group, a propylene group, or a butylene group. Each of x and y is greater than 0, and y is greater than z. Thus, there is more HO—$R^2$—OH than (HO)—$C(R^3)(R^4)$—W—$C(R^5)(R^6)$—(OH).

The reaction of the titanate and the diol(s) may be conducted in an organic solvent or neat. Any organic solvent may be used as long as it does not interfere with the desired reaction and the properties of the mixture of reaction products. Illustrative organic solvents that may be used include, but are not limited to, chlorohydrocarbons such as chloroaromatic hydrocarbons (e.g., o-dichlorobenzene). Preferably, no proton donating compounds such as water or acids are present during the reaction.

The mixture of reaction products may be prepared via a metathesis reaction. The reaction may be conducted at any temperature and pressure as long as it yields the desired mixture of reaction products. For example, the reaction of the titanate and the diol(s) may be carried out at a temperature within a range from about 25° C. to about 190° C., from about 120° C. to about 180° C., or from about 140° C. to about 170° C. The reaction may be carried out in an inert environment, such as a nitrogen environment, but such conditions are not required. The reaction is not limited to any particular apparatus or specific processing steps. The reaction may be conducted in a reaction vessel that has stirring/agitation, heating, and distilling/refluxing capabilities.

The mixture of reaction products may be used as a polymerization and/or depolymerization/cyclization catalyst in various embodiments of the present invention. The mixture of reaction products may have a solvent added to it after its formation or the mixture may contain a solvent that was present during the reaction to form the mixture. Additionally, the reaction products may be recovered by precipitation from solution with cooling or addition of an anti-solvent, followed by filtration. In addition, volatile components, which may include solvent, may be removed under vacuum, with or without heating.

In one example, each of x, y, and z is greater than zero and y=2x-z. In this example, the molar sum of the starting diols, HO—$R^2$—OH and (HO)—$C(R^3)(R^4)$—W—$C(R^5)(R^6)$—(OH), is twice the molar amount of the titanate, Ti—$(OR^1)_4$.

In another example, z is zero and the ratio of y to x (i.e., the molar ratio of HO—$R^2$—OH to Ti—$(OR^1)_4$) is greater than 2, thereby providing excess diol in the reaction starting materials. In this example, (HO)—$C(R^3)(R^4)$—W—$C(R^5)(R^6)$—(OH) is not present. In other examples, the ratio of y to x is greater than 3, greater than 4, or greater than 5.

In certain examples, W preferably is a $C_1$-$C_4$ alkylene group, such as a methylene group, an ethylene group, a propylene group, or a butylene group. In other examples, $R^1$ is an isopropyl group; $R^2$ is a butylene group; each of $R^3$, $R^4$, and $R^5$ is a methyl group; and $R^6$ is a hydrogen atom. In this example, the titanate is tetraisopropyl titanate, and the diols are 1,4-butanediol and 2-methyl-2,4-pentanediol.

The '632 patent also describes a mixture of reaction products of

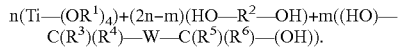

This mixture of reaction products may be used as a polymerization and/or depolymerization/cyclization catalyst in various embodiments of the present invention. The mixture of reaction products is substantially free from di-functional diols, such as HO—$R^2$—OH and (HO)—C($R^3$)($R^4$)—W—C($R^5$)($R^6$)—(OH). Each $R^1$ is independently a $C_1$-$C_{10}$ alkyl group, such as a methyl group, an ethyl group, a propyl group, an isopropyl group, a butyl group, a pentyl group, or a hexyl group. $R^2$ is a $C_2$-$C_6$ alkylene group, such as an ethylene group, a propylene group, or a butylene group. Each of $R^3$, $R^4$, $R^5$, and $R^6$ is independently a hydrogen atom or a $C_1$-$C_4$ alkyl group, such as a methyl group, an ethyl group, a propyl group, an isopropyl group, a butyl group, except that at least one of $R^3$ and $R^4$ and at least one of $R^5$ and $R^6$, is a $C_1$-$C_4$ alkyl group. W is an oxygen atom, a sulfur atom, a nitrogen-containing group (e.g., a —N($R^7$)— group, wherein $R^7$ is a hydrogen atom or a $C_1$-$C_8$ alkyl group), a phosphorus-containing group (e.g., a —P($R^8$)— group, wherein $R^8$ is a hydrogen atom or a $C_1$-$C_8$ alkyl group), or a $C_1$-$C_4$ alkylene group (e.g., a methylene group, an ethylene group, a propylene group, or a butylene group). Each of m and n is greater than 0.

The molar sum of the diols, HO—$R^2$—OH and (HO)—C($R^3$)($R^4$)—W—C($R^5$)($R^6$)—(OH), is twice the molar amount of the titanate, Ti—(O$R^1$)$_4$. In certain examples, W is a $C_1$-$C_4$ alkylene group, such as a methylene group, an ethylene group, a propylene group, or a butylene group. In certain examples, $R^1$ is an isopropyl group; thus, the titanate is tetraisopropyl titanate. In other examples, $R^2$ is a butylene group; thus, one of the diols is 1,4-butanediol.

In another example, $R^1$ is an isopropyl group; $R^2$ is a butylene group; each of $R^3$, $R^4$, and $R^5$ is a methyl group; and $R^6$ is a hydrogen atom. In this example, the titanate oxide is tetraisopropyl titanate, and the diols are 1,4-butanediol and 2-methyl-2,4-pentanediol.

In certain examples, the ratio of m to 2n, which is the molar ratio of starting diol (HO)—C($R^3$)($R^4$)—W—C($R^5$)($R^6$)—(OH) to all starting diols (HO—$R^2$—OH and (HO)—C($R^3$)($R^4$)—W—C($R^5$)($R^6$)—(OH)), is within a range from about 0.1 to about 0.5, from about 0.15 to about 0.45, from about 0.15 to about 0.35, or from about 0.15 to about 0.25.

The mixture of reaction products may further include an organic solvent, which may be added after the reaction. In certain examples, the reaction of the titanate and the diols is conducted in an organic solvent. Any organic solvent may be used as long as it does not interfere with the desired properties of the mixture of reaction products. Illustrative organic solvents that may be used include, but are not limited to, chlorohydrocarbons such as chloroaromatic hydrocarbons (e.g., o-dichlorobenzene).

Thus, the mixture of reaction products can be prepared by adding a pre-determined amount of each of Ti—(O$R^1$)$_4$, HO—$R^2$—OH, (HO)—C($R^3$)($R^4$)—W—C($R^5$)($R^6$)—(OH), and a solvent if used into a reaction vessel and mixing these reagents at a pre-selected temperature and pressure. Distillation is conducted to remove $R^2$—OH. The reaction may be followed by the amount of $R^1$—OH (e.g., isopropyl alcohol) liberated from the reaction. Thus, when the reaction is heated to the boiling point of $R^1$—OH, the reaction is complete when no more $R^1$—OH can be distilled off. Alternatively, the reaction may be monitored using NMR on samples periodically taken from the reaction. Depending on factors including the starting titanate, the starting diols, the ratio of diols and their ratio to the titanate, what solvent is employed, and the reaction temperature and pressure, the mixture of reaction products may take different forms, for example, as a solution, as a solid (i.e., a precipitate from the solution), or as a liquid.

The '632 patent also describes a mixture of reaction products of

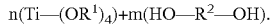

This mixture of reaction products may be used as a polymerization and/or depolymerization/cyclization catalyst in various embodiments of the present invention. Each $R^1$ is independently a $C_1$-$C_{10}$ alkyl group, such as a methyl group, an ethyl group, a propyl group, an isopropyl group, a butyl group, a pentyl group, or a hexyl group. $R^2$ is a $C_2$-$C_6$ alkylene group, such as an ethylene group, a propylene group, or a butylene group. Each of m and n is greater than 0. The ratio of m to n (i.e., the molar ratio of (HO—$R^2$—OH) to Ti—(O$R^1$)$_4$) is greater than 2.

In one example, $R^1$ is an isopropyl group; thus, the titanate is tetraisopropyl titanate. In another example, $R^2$ is a butylene group; thus, the diol is 1,4-butanediol. In yet another detailed example, $R^1$ is an isopropyl group and $R^2$ is a butylene group.

In certain examples, the ratio of m to n, which is the molar ratio of Ti—(O$R^1$)$_4$ to HO—$R^2$—OH, is within a range from about 2 to about 6. In other examples, the ratio is within a range from about 2.5 to about 5.5, from about 3 to about 5, or from about 3.5 to about 4.5.

Excess HO—$R^2$—OH may be removed after the reaction, and substantially all of the residual HO—$R^2$—OH is separated from the rest of the mixture of reaction products. Removal may be effected by conventional techniques such as precipitation, filtration, distillation, and/or vacuum evaporation.

The reaction between the titanate (i.e., Ti—(O$R^1$)$_4$) and the diol (i.e., HO—$R^2$—OH) may be conducted without a solvent, i.e., neat; thus, the mixture of reaction products does not include any solvent. However, a solvent may be added to the mixture of reaction products.

In one example, the mixture of reaction products can be prepared by adding a pre-determined amount of each of Ti—(O$R^1$)$_4$ and HO—$R^2$—OH into a reaction vessel and mixing these reagents at a pre-selected temperature and pressure. Distillation is conducted to remove $R^2$—OH. The reaction may be followed by the amount of $R^1$—OH (e.g., isopropyl alcohol) liberated from the reaction. Thus, when the reaction is heated to the boiling point of $R^1$—OH, the reaction is complete when no more $R^1$—OH can be distilled off. Alternatively, the reaction may be monitored using NMR on samples periodically taken from the reaction. Depending on factors including the starting titanate, the starting diol, the ratio of diol to the titanate, and the reaction temperature and pressure employed, the mixture of reaction products take different forms, for example, as a solid or a liquid.

The '632 patent provides specific examples of methods for producing reaction products which can be used as catalysts for polymerization and/or depolymerization/cyclization, described as follows.

Ti-(Butanediol: Diethylene Glycol)

A 100 mL flask equipped with a magnetic stir bar and fitted with a septum is flame dried under vacuum then filled with an inert gas. Tetraisopropyl titanate (15 mmol) is added followed by a mixture of diols (30 mmole total) then dry o-dichlorobenzene (25 mL). After the addition of all reagents the flask is fitted with a short path distillation head and heated in an oil bath to 140° C. for about 1 hour. Isopropyl alcohol liberated from the reaction of tetraisopropyl titanate and the diols is collected and then the solution is heated in 200° C. oil to strip off 15 ml of the o-dichlorobenzene to ensure that all isopropyl alcohol has been removed. Upon cooling the resulting solution is about 1 M in titanium. The catalyst is herein referred to by the abbreviation "Ti(BD:DEG)(3:1)" where the above referenced mixture of diols contains 3 molar parts butanediol and 1 molar part diethylene glycol per molar part of tetraisopropyl titanate. The catalyst is herein referred to by the abbreviation "Ti(BD:DEG)(1:1)" where the above referenced mixture of diols contains 1 molar part butanediol and 1 molar part diethylene glycol per molar part of tetraisopropyl titanate.

Ti-(Butanediol: 2-methyl-2,4-pentandiol)

A 100 mL flask equipped with a magnetic stir bar and fitted with a septum is flame dried under vacuum then filled with an inert gas. Tetraisopropyl titanate (15 mmol) is added followed by a mixture of diols (30 mmole total) then dry o-dichlorobenzene (25 mL). After the addition of all reagents the flask is fitted with a short path distillation head and heated in an oil bath to 140° C. for about 1 hour. Isopropyl alcohol liberated from the reaction of tetraisopropyl titanate and the diols is collected and then the solution is heated in 200° C. oil to strip off 15 ml of the o-dichlorobenzene to ensure that all isopropyl alcohol has been removed. Upon cooling the resulting solution is about 1 M in titanium. The catalyst is herein referred to by the abbreviation "Ti(BD:HG)(4:1)" where the above referenced mixture of diols contains 4 mole parts butanediol and 1 mole part 2-methyl-2,4-pentandiol (hexylene glycol) per molar part of tetraisopropyl titanate.

EXPERIMENTAL EXAMPLES

Experiments were conducted to demonstrate the solution polymerization of low-acid PBT and subsequent depolymerization/cyclization to form cPBT. More particularly, Example 1 illustrates a method of producing low-acid PBT via polymerization in organic solvent ("solution polymerization"); Example 2 illustrates a method of forming cPBT via depolymerization of the low-acid PBT; and Example 3 illustrates methods for preparing, purifying, isolating, and repolymerizing cPBT produced from low-acid PBT.

Experiments were also conducted to demonstrate the removal of titanium catalyst residue from a reaction mixture following PBT depolymerization. Example 4 illustrates a method of removing titanium residue from a solution of isolated filter cake; Example 5 illustrates a method of removing titanium residue from a depolymerization reaction mixture; and Example 6 illustrates a method for characterizing titanium precipitation and settling behavior in depolymerization reaction mixtures.

The last set of experiments demonstrates the recycling of residual oligomer byproducts formed in the depolymerization/cyclization of PBT to produce cPBT. Example 7 illustrates a method of recycling linear oligomer byproducts to produce PBT; Example 8 demonstrates polymerization to form PBT using a combination of residual linear oligomers with monomers, as well as using monomers without residual oligomers; Example 9 illustrates depolymerization of polymerized residual linear oligomers in glassware; and Example 10 illustrates the depolymerization of polymerized residual linear oligomers in plug flow coils at high temperature and under pressure.

The experiments employed the use of 1,4-butanediol ("BDO") from Avocado Research Chemicals, Ltd. of Morecambe, United Kingdom. The BDO was dried over a molecular sieve so that it contained no more than about 50 ppm water prior to use. Tetraisopropyl titanate catalyst ("TPT") was obtained from Gelest, Inc. of Morrisville, Pa. The TPT was purified through distillation, and then stored under nitrogen. Dimethyl terephthalate ("DMT") (99+%) was obtained from Aldrich Chemical Co. of St. Louis, Mo., and was used without further purification. The anhydrous ortho-dichlorobenzene solvent ("oDCB") was obtained from EM Science of Gibbstown, N.J., and it too was used without further purification. The HPLC-grade acetonitrile, reagent grade tetrahydrofuran ("THF"), and pure phenanthrene were also obtained from Aldrich, and all were used as received. Chlorosel 801 from Porocel Corporation of Houston, Tex. was used as the basic alumina. The titanium catalyst indicated as Ti(BD:HG) (4:1) in Example 5 is a mixture of reaction products of tetraisopropyl titanate, 1,4-butanediol, and 2-methyl-2,4-pentandiol, and was obtained using the procedure described herein above. Commercial sources of polybutylene terephthalate (PBT) used in the experiments include Valox® 315 manufactured by GE Plastics of Pittsfield, Mass., Ultradur® B6550 and B2550 manufactured by BASF Corporation of Wyandotte, Mich., and Celanex® 2001 manufactured by Ticona Engineering Polymers of Shelby, N.C. Valox® 315 and Ultradur® B6550 are melt-polymerized PBT's, while Celanex® 2001 is a solid state-polymerized PBT.

The titanium-free linear oligomers of Example 7 were prepared using crude filter cake retained from Cyclics Corporation of Schenectady, N.Y. The filter cake was retained from the toll production of cPBT at Pressure Chemical Corp. of Leland, N.C. The linear oligomers were isolated through filtration at 10° C. so that most of the tetramers, hexamers, and heptamers present in the equilibrium mixture from depolymerization precipitated from solution prior to filtration, and were collected with the filter cake. The filter cake was then dissolved in an equal amount of oDCB and filtered at 180° C. through 5 μm filter pads to remove the insoluble titanium complexes. The linear oligomers were then allowed to precipitate from the filtrate through cooling at 50° C., and collected by Buchner funnel and dried. Crude linear oligomers were prepared by drying the crude filter cake.

Example 1

Low Acid PBT by Solution Polymerization

Ten experiments were conducted with charges of BDO (approximately 0.250 mmol), DMT (approximately 0.98 to 1.02 molar equivalents of BDO), and anhydrous oDCB (enough to result in a solution containing about 30% reactant solids). Each charge was added to a 250 ml three-necked round-bottom flask equipped with a mechanical stirrer, a short path distillation head with a receiver flask, and an inert gas inlet. The weights of the charges for the ten experiments are listed in Table 2.

TABLE 2

Summary of Solution Polymerization Data of Example 1

| Reaction | BDO (g) | DMT (g) | oDCB (g) | TPT (mg) | Adjusted Monomer (% vs. BDO) | Catalyst Level (mol % Ti) |
|---|---|---|---|---|---|---|
| 1 | 14.30 | 30.58 | 89.80 | 61.6 | 0.07 | 0.136 |
| 2 | 16.82 | 36.05 | 78.41 | 233.3 | −0.57 | 0.440 |
| 3 | 16.16 | 34.65 | 86.24 | 25.3 | 0.03 | 0.050 |
| 4 | 15.34 | 33.00 | 57.60 | 7.7 | −0.731 | 0.161 |
| 5 | 15.50 | 32.75 | 55.08 | 24.7 | −2.037 | 0.053 |
| 6 | 25.32 | 54.15 | 67.22 | 12.6 | 0.369 | 0.016 |
| 7 | 18.22 | 39.39 | 107.50 | 15.8 | −1.048 | 0.028 |
| 8 | 21.84 | 46.37 | 87.90 | 17.2 | 1.196 | 0.025 |
| 9 | 18.99 | 40.02 | 116.60 | 14.6 | 1.217 | 0.025 |
| 10 | 22.85 | 48.62 | 74.64 | 11.4 | 0.894 | 0.016 |

The reactants were then heated in a temperature-controlled oil bath. The initial temperature was set at 160° C. The overhead space of the flask was swept with a stream of dry nitrogen at a flow rate of approximately 50 to 100 ml/min throughout the polymerization. Approximately 10-150 mg of TPT was added to the subsurface of the solution by microliter syringe after the overhead space had been swept with nitrogen for about 15 minutes. The receiver flask was cooled in a bath of −40° C. methanol throughout the polymerization to trap the overhead volatile material. The solution in the reaction flask was sampled throughout the polymerization in order to monitor the molecular weight of the polymer by gel permeation chromatography ("GPC") (See Appendix A). The distillate was likewise sampled to determine its composition using gas chromatography ("GC") and potentiometric titration (See Appendices B and C respectively). The results of the solution and distillate analyses are summarized in Table 3 below. Table 3 includes the final molecular weight of the polymer at a final reaction time, the amount of THF generated by the polymerization, and the residual acid present in the polymer.

TABLE 3

Summary of Solution Polymerization Analysis

| Reaction | Molecular Weight of Polymer (Daltons), Hour | Amount of THF Generated (mol %) | Residual Acid (COOH) Concentration (meq/kg sample) |
|---|---|---|---|
| 1 | 81K, 8 hrs | 0.54 | 7.52 |
| 2 | 41K, 6 hrs | 0.88 | 17.8 |
| 3 | 60K, 8 hrs | 0.248 | 3.3 |
| 4 | 47K, 8 hrs | 0.283 | 18.32* |
| 5 | 25K, 8 hrs | 0.171 | 6.37 |
| 6 | 41K, 6 hrs | 0.099 | 1.44 |
| 7 | 37K, 8 hrs | 0.113 | 1 |
| 8 | 45K, 8 hrs | 0.167 | 1.6 |
| 9 | 51K, 9 hrs | 0.25 | 1.5 |
| 10 | 67K, 12 hrs | 0.235 | 0.9 |

*1% BDO added to the reaction after two hours of polymerization.

Example 2

Cyclic Poly(Butylene Terephthalate) ("cPBT") Formation from Depolymerization of Low Acid PBT A charge of about 7 mmol PBT and anhydrous oDCB were added to a flame-dried three-necked 250 ml round-bottom flask equipped with a mechanical stirrer, a short path distillation head and condenser, and an inert gas inlet (the charge amounts are listed in Table 4 below). The flask was then submerged into a 220° C. oil bath. After the PBT dissolved and several milliliters of solvent had distilled overhead (to ensure dryness of the reaction), an organo titanate catalyst solution of freshly prepared Ti(BD:HG) (4:1) in oDCB at a concentration of 0.220 mmol/g was added to the flask using a syringe. The reaction was then maintained under a positive pressure of dry nitrogen, and the solution was periodically sampled to determine the extent of cPBT formation using the High Pressure Liquid Chromatography ("HPLC") procedure described in Appendix D. The cPBT rates of formation for the reactions are listed in Table 4 below. The reactions were carried out at approximately the atmospheric boiling point of oDCB (182° C.).

Table 5 summarizes the results of additional depolymerization experiments performed as described above. Table 5 includes information regarding the concentration of cPBT after four hours of depolymerization.

TABLE 4

Summary of cPBT Formation from Depolymerization Experiments

| PBT (g) | PBT Source | oDCB (g) | Catalyst ("CAT") (g) | Distillate (g) | [PBT] (mmol/L) | [CAT] (mmol/L) | % CAT (mol %) | Initial cPBT Rate (g/L/hr) |
|---|---|---|---|---|---|---|---|---|
| 1.3230 | Celanex 2001[a] | 121.3 | 0.202 | 4.55 | 66.40 | 0.4907 | 0.7390 | 8.01 |
| 1.5566 | Celanex 2001[a] | 142.7 | 0.4177 | 6.35 | 66.80 | 0.8676 | 1.299 | 15.35 |
| 1.8298 | Celanex 2001[a] | 165.1 | 0.6538 | 7.79 | 67.98 | 1.176 | 1.729 | 20.79 |
| 1.5881 | Celanex 2001[a] | 143.8 | 0.7399 | 6.38 | 67.46 | 1.521 | 2.255 | 22.83 |
| 1.5016 | BASF 6550[b] | 136.7 | 0.3747 | 11.232 | 70.00 | 0.8454 | 1.208 | 13.54 |
| 1.8926 | BASF 6550[b] | 169.97 | 0.6954 | 7.563 | 68.09 | 1.211 | 1.778 | 20.68 |

TABLE 4-continued

Summary of cPBT Formation from Depolymerization Experiments

| PBT (g) | PBT Source | oDCB (g) | Catalyst ("CAT") (g) | Distillate (g) | [PBT] (mmol/L) | [CAT] (mmol/L) | % CAT (mol %) | Initial cPBT Rate (g/L/hr) |
|---|---|---|---|---|---|---|---|---|
| 1.9167 | BASF 6550[b] | 172.28 | 0.8567 | 13.226 | 70.31 | 1.521 | 2.163 | 24.31 |
| 2.101 | Valox 315[c] | 188.36 | 0.7158 | 10.1266 | 68.89 | 1.136 | 1.649 | 13.89 |
| 1.5841 | Valox 315[c] | 144.02 | 0.7385 | 11.788 | 69.89 | 1.577 | 2.256 | 18.65 |
| 1.6361 | Valox 315[c] | 148.46 | 0.9209 | 10.1758 | 68.96 | 1.879 | 2.724 | 23.49 |
| 1.97 | Reaction 10 from Example 1 | 186 | 0.2992 | 6.923 | 64.49 | 0.474 | 0.7351 | 16.29 |

[a]Celanex 2001 (7 meq/kg acid)
[b]BASF 6550 (18 meq/kg acid)
[c]Valox 315 (38 meq/kg acid)

TABLE 5

Summary of cPBT Formation from Depolymerization Experiments

| PBT Source | % Catalyst (mol %) | Initial cPBT Rate (g/L/hr) | [cPBT] at 4 hours (g/L) |
|---|---|---|---|
| Celanex 2001[a] | 3 | 26.8 | 9.7 |
| BASF 6550[b] | 3 | 25.2 | 9.8 |
| BASF 2550 | 3 | 25.2 | 9.3 |
| Valox 315[c] | 3 | 16 | 9.9 |
| BASF 6550[b] | 1 | 12.4 | 3.7 |
| Valox 315[c] | 1 | 2.4 | 3.7 |
| Reaction 10 from Example 1 | 0.74 | 16.3 | 9.6 |
| Celanex 2001[a] | 0.75 | 8.01 | 8.5 |
| BASF 2550 | 0.77 | 9.2 | 3.7 |
| Reaction 10 from Example 1 | 0.5 | 17.6 | 9.6 |
| Celanex 2001[a] | 0.45 | 6.8 | 4.8 |
| BASF 2550 | 0.45 | 2.4 | 3.3 |
| Reaction 6 from Example 1 | 0.19 | 10 | 9.3 |
| Celanex 2001[a] | 0.25 | 3.2 | 4.3 |
| BASF 6550[b] | 0.25 | 1.3 | 1.9 |

[a]Celanex 2001 (7 meq/kg acid)
[b]BASF 6550 (18 meq/kg acid)
[c]Valox 315 (38 meq/kg acid)

Example 3

Preparation, Purification/Isolation, and Repolymerization of cPBT Prepared from PBT Produced in Reaction 10 of Example 1

This experiment used a solution of PBT produced via the polymerization in Reaction 1 of Example 1. The resulting 0.065M PBT was then reacted with a 0.73 mol % organo titanate catalyst solution of freshly prepared Ti(BD:HG) (4:1) in oDCB. The solution was allowed to reflux for about 20 hours at which time all of the bishydroxy butylesters had decomposed into acids and the concentration of cPBT had reached a full equilibrium value of 10.6 g/L as determined by the HPLC method described in Appendix D. The solution was cooled to 95° C., treated with 0.15 ml of water to quench the catalyst, reheated to reflux, and then stripped to a concentration of 30 g/L of cPBT. The solution was then allowed to cool for 30 minutes to 50° C., and filtered through a 2 cm Buchner funnel.

A sample of the filtrate was titrated for determination of acid content using a Dye titration test. The filtrate was found to have an acid concentration of 0.09 mM. The filtrate was then slurried with about 0.5 g of basic alumina. The cPBT was then isolated by filtering the alumina and evaporating the oDCB solvent.

The isolated cPBT was mixed in a 1:19 ratio with a 6% XB3 catalyst and allowed to polymerize at 190° C. for 30 minutes. The resulting polymer had a molecular weight of about 178,000 Daltons as determined by a method as described in Appendix A.

Example 4

Removal of Titanium Catalyst Residue by Filtration of Solution of Isolated Filter Cake Filter cake containing cPBT, residual linear oligomer, and titanium catalyst residue was first collected from the filtration of a depolymerization reaction mixture. Equal parts of the filter cake and oDCB were mixed and heated to 180° C. Most of the filter cake dissolved into solution, but a suspension of insoluble material remained. The resulting slurry was filtered using an ErtelAlsop model 4-T 250 cc pressure filter manufactured by ErtelAlsop of Kingston, N.Y. The filter was equipped with a 5 micron filter pad (ErtelAlsop micro-media M40 cellulose/perilite), to produce a filtrate substantially free of titanium and a filter cake enriched in titanium. The filtrate was cooled to 70° C. to precipitate the residual linear oligomers.

The filter cake enriched in titanium solid was mixed with oDCB to dissolve the remaining cPBT or linear oligomers. The slurry was then dried at 100° C. in vacuum to remove the oDCB, the dissolved cPBT, and the linear oligomers. The resulting titanium solid was characterized by thermo-gravimetric analysis. It was determined that upon heating the titanium solid to above 425° C. in oxygen, 26.46% by weight of titanium dioxide remained. This indicates that the titanium solid contained approximately 18% by weight of titanium.

Figure 5:
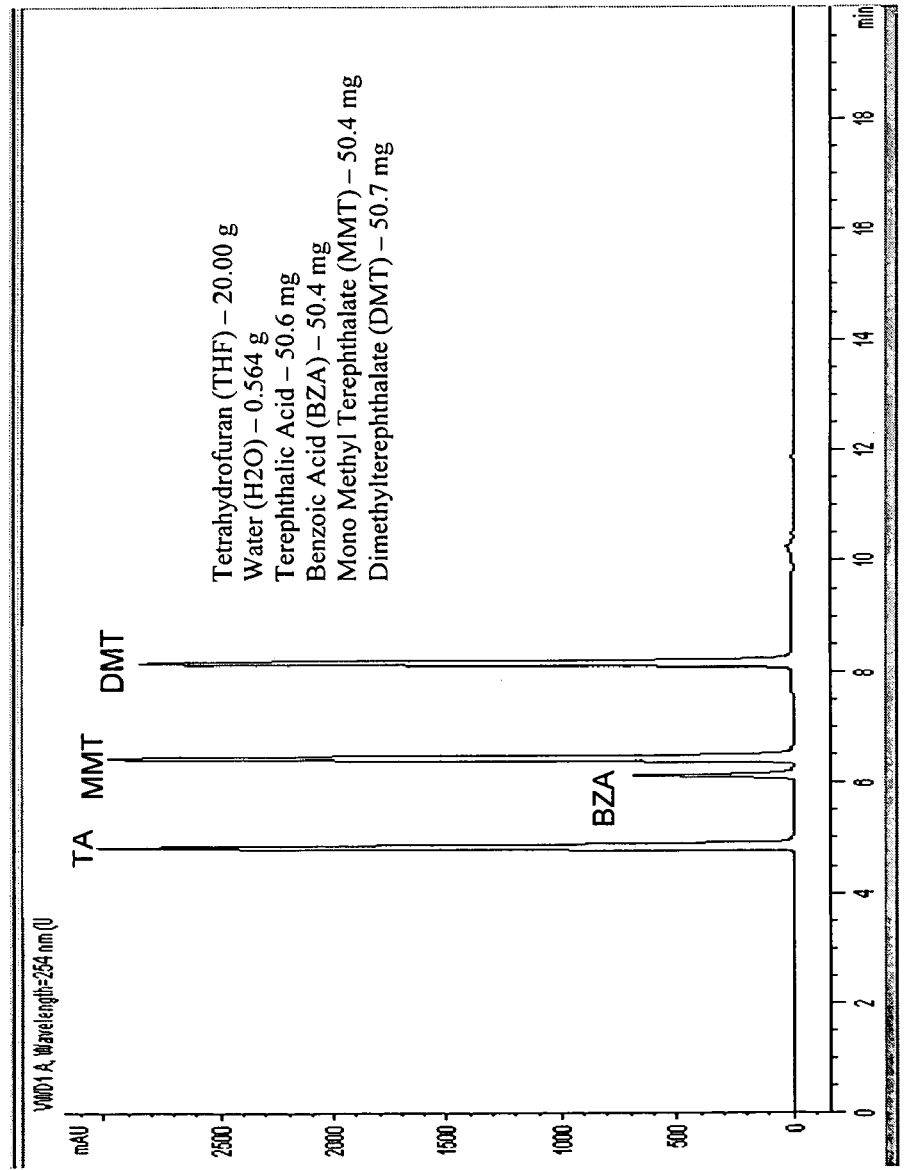
FIG. 5 shows a chromatogram from the HPLC analysis of a solution in an experiment demonstrating removal of catalyst residue from a depolymerization process stream, according to an illustrative embodiment of the invention.

The titanium solid was also dissolved in THF containing 4% water at 70° C. for 1 hour, and was then analyzed by HPLC using the method described in Appendix D. A Hewlett Packard 1050 series HPLC system, manufactured by Hewlett Packard of Palo Alto, Calif., was used, but in this example, it was equipped with an AquaSep Column C8, 5.0 u, 150×4.6 mm. The sample was injected using the following gradient: 20% (0.08%) $H_3PO_4$ in water/80% MeCN to 100% MeCN over 10 min. FIG. 5 is a chromatogram 500 showing the separation of terephthalic acid, benzoic acid, mono methyl terephthalate and dimethylterephthalate from the solution.

Figure 6:
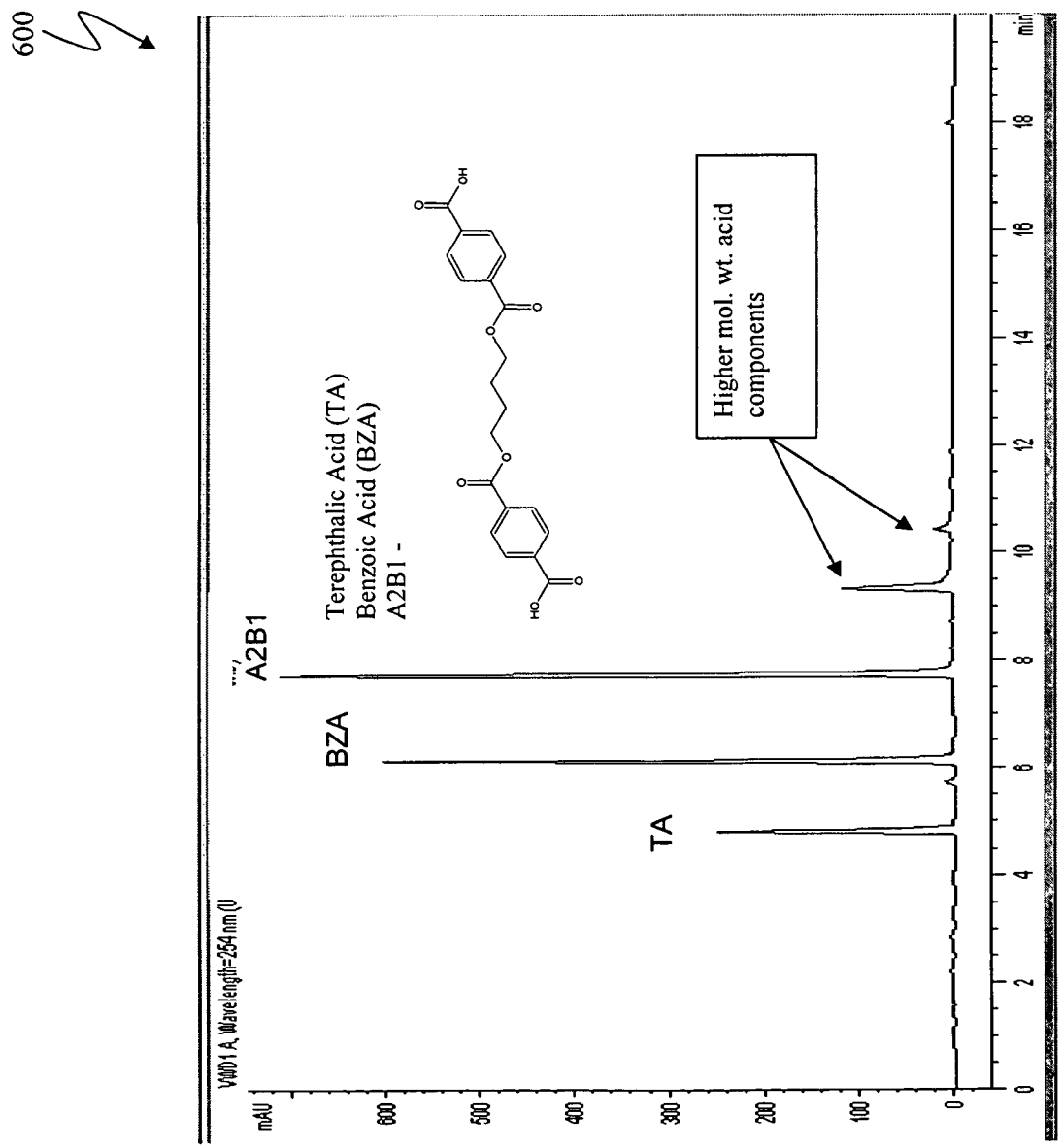
FIG. 6 shows a chromatogram from the HPLC analysis of a solution in an experiment demonstrating removal of catalyst residue from a depolymerization process stream, according to an illustrative embodiment of the invention.

The titanium solid was also dissolved in TFA containing about 2% water at 70° C. for 1 hour, and then, analyzed again by HPLC. FIG. 6 is a chromatogram 600 showing the separation of various acidic species including terephthalic acid, benzoic acid, and A2B1 species (see molecular structure in FIG. 6) from the solution.

Example 5

Titanium Removal by Filtration of Depolymerization Reaction Mixture

About 165 g of PBT was dissolved in 13.8 kg of dry oDCB at 180° C. to yield a 0.07M solution of PBT. The solution was allowed to cool to 20° C. The solution was then treated with 3 mol % titanium in the form of a 1M solution of Ti (BD:HG) (4:1) catalyst in oDCB. The resulting slurry was pumped through a 20' carbon steel plug flow coil reactor at a rate of 4 reactor volumes per hour (i.e., 15 min residence time) at a temperature of 225° C. The resulting 14 kg of depolymerization reaction mixture containing cPBT was then filtered at 70° C. The titanium remained soluble, indicating that it continued to exist as a homogenous catalyst after exposure to the depolymerization reaction conditions.

This depolymerization reaction mixture was then added in 2 kg portions to a 2 L Parr reactor, heated to 245° C. for 15 minutes, cooled to 180° C., and then, filtered through the pressure filter described in Example 4.

Figure 7:
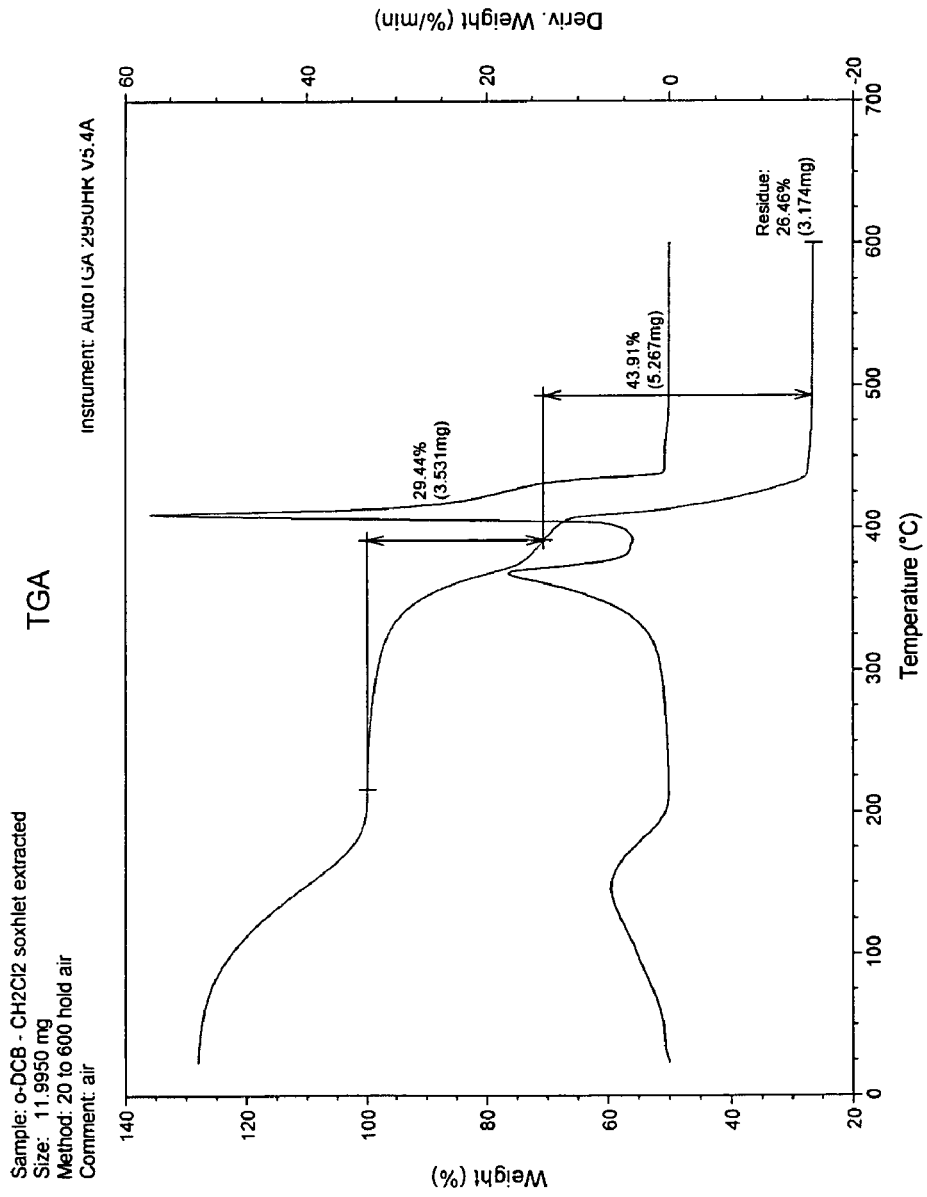
FIG. 7 shows a graph of data from the thermogravimetric analysis (TGA) of a solution in an experiment demonstrating removal of catalyst residue from a depolymerization process stream, according to an illustrative embodiment of the invention.
Figure 8:
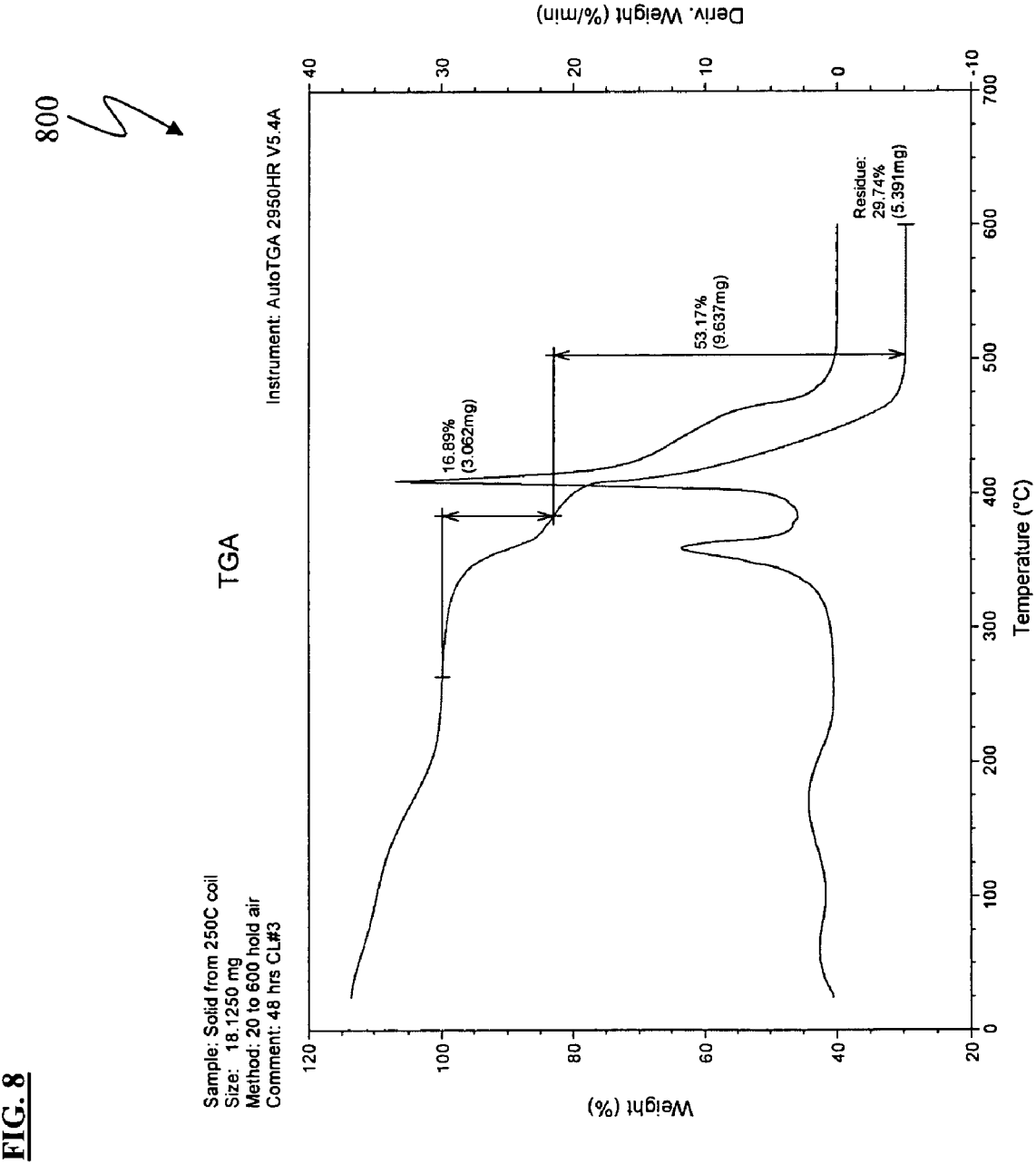
FIG. 8 shows a graph of data from the thermogravimetric analysis (TGA) of a solution in an experiment demonstrating removal of catalyst residue from a depolymerization process stream, according to an illustrative embodiment of the invention.

The peroxide test was used to analyze the collected filtrate. Approximately 1 g of the filtrate was treated with 1M sulfuric acid in methanol and with approximately 0.1 ml of 30% hydrogen peroxide. The resulting mixture was then heated and then visually analyzed for the presence of a yellow tint in the top methanol layer (visual detection of as low as 1 ppm titanium is possible). Visual analysis indicated that the solution was substantially titanium-free (less than about 1 ppm Ti). The titanium solid was also analyzed by TGA and HPLC. The HPLC results were essentially identical to those of Example 4. The TGA result is shown in FIG. 8. Table 6 summarizes the TGA results of Examples 4 and 5 (FIGS. 7 and 8 respectively).

TABLE 6

Comparison of TGA of Titanium Solids Resulting from Filtration of Depolymerization Reaction Mixtures

| Sample | Dry basis $TiO_2$ residue (wt. %) |
|---|---|
| Titanium Solid from Example 4 | 26.46 |
| Titanium Solid from Example 5 | 29.74 |

Example 6

Titanium Precipitation and Settling Behavior in Reaction Mixtures

Approximately 10 ml of a PBT depolymerization reaction mixture (0.07M PBT in oDCB containing 3 mol % of Ti catalyst) at 180° C. was added to a 20 ml glass pressure tube. The tube was heated in a 250° C. salt bath and observed over time. After 25 minutes of heating, a fine precipitate formed in the clear solution. After 30 minutes, the precipitate began to coagulate into larger particles, which then began to settle to the bottom of the tube. After 35 minutes, all of the precipitate had settled from solution. The tube was cooled to 180° C., and the supernatant was analyzed using the peroxide test described in Example 5. Titanium was not detected in the supernatant, indicating that most of it had been transformed from the homogeneous soluble form to a heterogeneous insoluble form after heating at 250° C. for 30-35 minutes.

Example 7

Solution Polymerization of the Residual Linear Oligomers Produced in the Depolymerization of PBT Approximately 40 g of linear oligomers and 50 ml of oDCB were charged to a 250 ml three-necked flask with a mechanical stirrer and a 15×1 cm packed column fitted with a short path still head and receiver (the linear oligomers used in the Example are described in Table 7). The flask was heated in a 215° C. oil bath to reflux the solvent into the column so that the lower boiling materials such as water and THF were released overhead and the higher boiling materials such as oDCB were returned to the flask. 0.5 to 2 g of BDO and approximately 0.015 ml of TPT were then added to the flask.

The solution was sampled over time and analyzed by GPC to monitor the molecular weight of the polymer, as was similarly done in the Example described in Appendix A. The samples were also titrated using the method described in Appendix C to determine the amount of residual acid in the solution. The makeup of the linear oligomers, the amounts of BDO added, the polymerization reaction times, and the residual acid levels of the experiments are summarized in Table 8 below. The molecular weight of the polymer as a function of reaction time for Reactions LP1 to LP8 are shown in the plots of FIGS. 14A-14D.

The final polymer solution was allowed to cool and solidify, and then dried in vacuum to a powder for depolymerization evaluation.

TABLE 7

Characterization of Linear Oligomers Used in Example

|  | Titanium-Free Linear Oligomers | Crude Linear Oligomers |
|---|---|---|
| Mw vs. PS (Daltons) | 3,023 | 3,023 |
| Acid content (meq/kg) | 237 | 383 |
| % cPBT Oligomers | 28.6 | 37.8 |

TABLE 8

Linear Oligomer Recovery Experiments and Acid Level of Final Polymers

| Reaction | Titanium-Free Linear Oligomers (g) | Crude Linear Oligomers (g) | Rxn Time (hr) | BDO (g) | Acid (mmol/kg) |
|---|---|---|---|---|---|
| LP 1 | 40 | 0 | 14 | 1 | 1.6 |
| LP 2 | 0 | 40 | 14 | 1 | 84.0 |
| LP 3 | 40 | 0 | 14 | 0.5 | 1.2 |
| LP 4 | 0 | 40 | 14 | 2 | 22.7 |

TABLE 8-continued

Linear Oligomer Recovery Experiments and Acid Level of Final Polymers

| Reaction | Titanium-Free Linear Oligomers (g) | Crude Linear Oligomers (g) | Rxn Time (hr) | BDO (g) | Acid (mmol/kg) |
|---|---|---|---|---|---|
| LP 5 | 38 | 2 | 14 | 1 | 1.2 |
| LP 6 | 32 | 8 | 14 | 1 | 1.1 |
| LP 7 | 38 | 2 | 14 | 0.5 | 1.5 |
| LP 8 | 32 | 8 | 14 | 0.5 | 1.8 |
| LP 9 | 40 | 0 | 4 | 0.5 | 16.3 |
| LP10 | 36 | 4 | 4 | 0.5 | 3.8 |
| LP 11 | 40 | 0 | 7 | 0.5 | 1.3 |
| LP 12 | 36 | 4 | 7 | 0.5 | 2.9 |
| LP 13 | 40 | 0 | 10 | 0.5 | 1.8 |
| LP 14 | 36 | 4 | 10 | 0.5 | 3.6 |

Example 8

Comparison of Solution Polymerization of a Mixture of Linear Oligomers with Monomers with a Solution Polymerization of a Mixture of Monomers Only To demonstrate polymerization of a mixture of monomers only, a charge of about 253.55 mmol of BDO, about 240.08 mmol of DMT, and anhydrous oDCB (enough to result in a solution containing about 30% reactant solids) were added to a 250 ml three-necked round-bottom flask equipped with a mechanical stirrer, a short path distillation head with a receiver flask, and an inert gas inlet. The reactants were then heated in a temperature-controlled oil bath. The initial temperature was set at 160° C. The overhead space of the flask was swept with a stream of dry nitrogen at a flow rate of approximately 50 to 100 ml/min throughout the polymerization. Approximately 0.04 mmol of TPT was added to the subsurface of the solution by microliter syringe after the space had been swept with nitrogen for 15 minutes. The solution in the reaction flask was sampled throughout the polymerization in order to monitor the molecular weight of the polymer by gel permeation chromatography ("GPC") (See Appendix A). The results of the GPC analysis are summarized in Table 9 below and FIG. 9.

TABLE 9

Solution Polymerization of Mixture of Monomers Only

| Time (hr) | Molecular Weight (Daltons)/1000 |
|---|---|
| 3 | 7.96 |
| 4 | 19.51 |
| 5 | 26.06 |
| 6 | 30.54 |
| 7 | 38.28 |
| 8 | 45.00 |
| 9 | 48.30 |
| 10 | 55.12 |
| 11 | 60.02 |
| 12 | 66.78 |

To produce the mixture of linear oligomers and monomers, approximately 50 g of hot filter cake, about 187.53 mmol BDO, and about 183.04 mmol of DMT, and oDCB were charged to a 250 ml three-necked flask with a mechanical stirrer and a 15×1 cm packed column fitted with a short path still head and receiver. The flask was heated in a 215° C. oil bath to reflux the solvent into the column so that the lower boiling materials such as water and THF were released overhead and the higher boiling materials such as oDCB were returned to the flask. 0.052 mmol of TPT was then added to the flask.

The solution was sampled over time and analyzed by GPC to monitor the molecular weight of the polymer, as was similarly done in the Example described in Appendix A. The results of the GPC analysis are summarized in Table 10 below and FIG. 9.

TABLE 10

Solution Polymerization of Mixture of Linear Oligomers and Monomers

| Time (hr) | Molecular Weight (Daltons)/1000 |
|---|---|
| 3 | 12.53 |
| 4 | 21.29 |
| 5 | 29.37 |
| 7 | 45.35 |
| 8.5 | 57.51 |
| 10 | 66.86 |

Example 9

Depolymerization of Polymerized Linear Oligomers in Glassware at 180° C.

Approximately 1.54 g of 7 mmol PBT and 105 ml of oDCB were charged to a dried and inert 250 ml three-necked flask fitted with a mechanical stirrer and a short path distillation head and receiver. The flask was heated in a 215° C. oil bath to dissolve the polymer and to drive 5 ml of distillate overhead to ensure a dry environment. The temperature of the oil bath was then lowered to 200° C. and approximately 0.070 ml of a 1M organo titanate catalyst solution of freshly prepared Ti(B-D:HG) (4:1) in oDCB was added to the flask. The solution was sampled just prior to catalyst addition and at five, ten, and 15 minutes after catalyst addition for cPBT concentration determination by HPLC as described in Appendix D. After the final sample was taken, an additional 0.21 ml catalyst solution was added, and the flask heated at reflux for an additional three hours before obtaining a final sample.

The initial rate of cPBT formation was calculated by determining the slope of the line defined by plotting the concentration of cPBT in g/L versus reaction time. The initial rates and the concentration of cPBT after three hours of depolymerization are summarized in Table 11.

Figure 10:
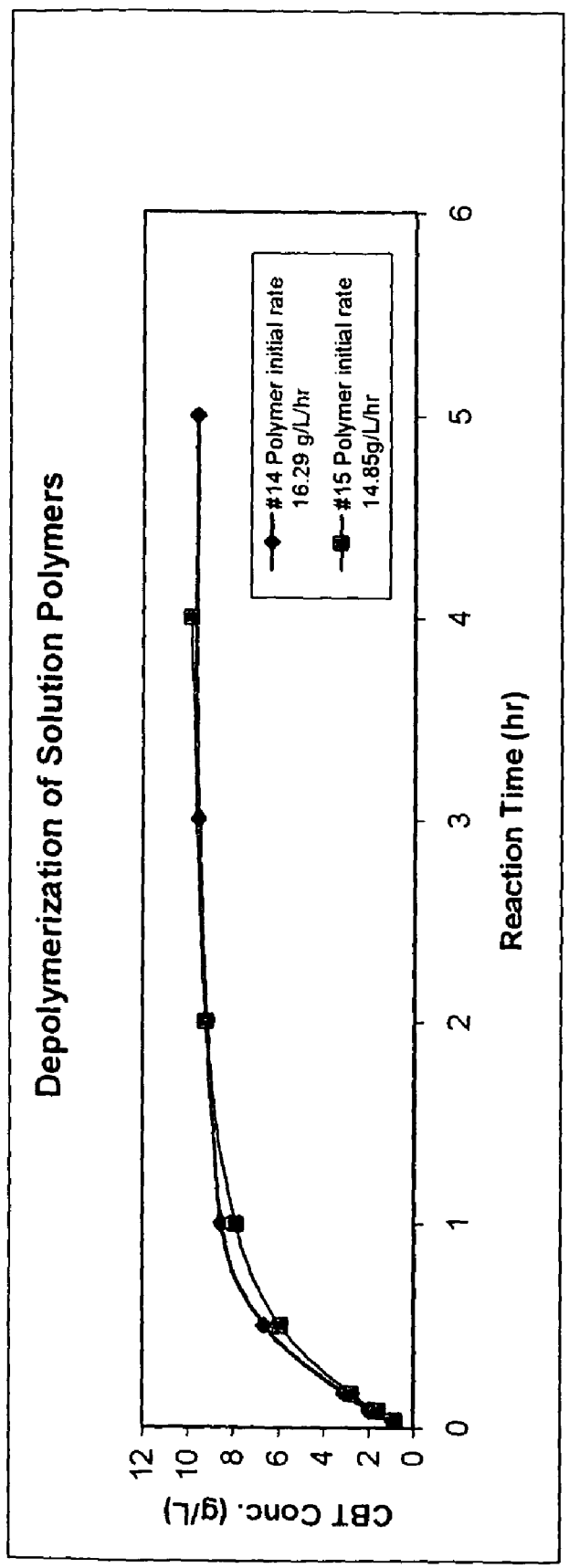
FIG. 10 shows a graph of the change in cPBT concentration in a depolymerization reaction mixture (obtained by HPLC analysis) as a function of time, thereby comparing depolymerization using low-acid PBT produced from pure monomers versus using low-acid PBT produced from a combination of pure monomers and a linear oligomer recyclate, according to an illustrative embodiment of the invention.
Figure 11:
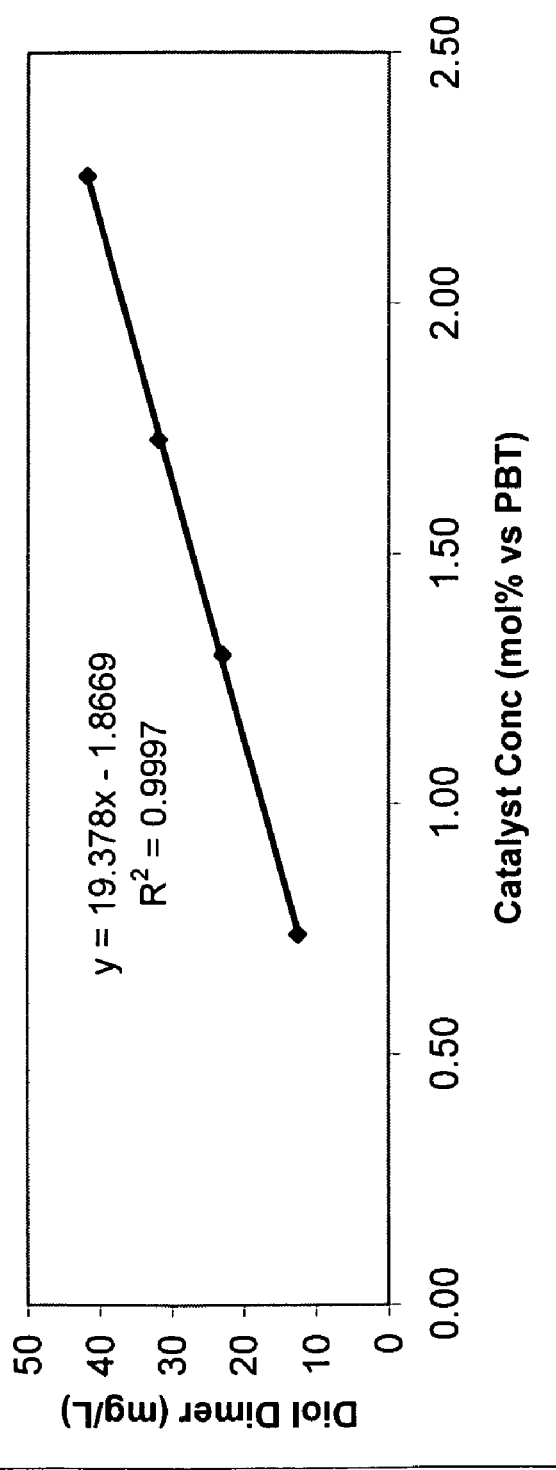
FIG. 11 shows a graph of the concentration of diol dimer, for example, bishydroxylbutyl terephthalate (BDO ester), in a depolymerization reaction mixture after 5 minutes of depolymerization at 180° C., plotted as a function of catalyst concentration, according to an illustrative embodiment of the invention.

Similar experiments were conducted to form mixtures with an initial rate of cPBT formation of about 16.29 g/L/hr and 14.85 g/L/hr. The concentration of cPBT in the mixtures throughout the course of the depolymerizations is summarized in Tables 12 and 13 below and in FIG. 10. FIG. 11 shows a graph of the concentration of diol dimer, for example, bishydroxylbutyl terephthalate (BDO ester), in a depolymerization reaction mixture after 5 minutes of depolymerization at 180° C., plotted as a function of catalyst concentration, according to an illustrative embodiment of the invention.

TABLE 11

Results of Depolymerization of Polymerized Linears

| Reaction | % Crude Linears | Mw (Daltons) | Initial Rate of cPBT Formation (g/L/hr) | [cPBT] after 3 hrs (g/L) |
|---|---|---|---|---|
| 1 | 0 | 18.1K @ 14 hr | 16.8 | 9.14 |
| 3 | 0 | 73.3K @ 14 hr | 14.7 | 9.64 |
| 9 | 0 | 36.6K @ 4 hr | 8.7 | 9.37 |
| 11 | 0 | 53.2K @ 7 hr | 14.4 | 9.57 |
| 13 | 0 | 53.2K @ 10 hr | 12.2 | 9.65 |
| 5 | 5 | 39.0K @ 14 hr | 10.7 | 9.46 |
| 7 | 5 | 84.3K @ 14 hr | 13.6 | 9.70 |
| 10 | 10 | 40.2K @ 4 hr | 12.9 | 9.93 |
| 12 | 10 | 50.7K @ 7 hr | 9.9 | 9.79 |
| 14 | 10 | 81.0K @ 10 hr | 11.0 | 10.0 |
| 6 | 20 | 51.2K @ 14 hr | 10.6 | 10.0 |
| 8 | 20 | 123.6K @ 14 hr | 10.6 | 10.0 |
| 2 | 100 | 67.8K @ 14 hr | 0.25 | 7.53 |
| 4 | 100 | 50.0K @ 14 hr | 3.24 | 9.31 |

TABLE 12

Depolymerization Initial Rate of 16.29 g/L/hr

| Time (hr) | [cPBT] (g/L) |
|---|---|
| 0.0333 | 0.887 |
| 0.08333 | 1.959 |
| 0.16667 | 3.068 |
| 0.5 | 6.637 |
| 1 | 8.518 |
| 3 | 9.54 |
| 5 | 9.63 |
| 22 | 10.52 |
| Filtrate | 30.65 |

TABLE 13

Depolymerization Initial Rate of 14.85 g/L/hr

| Time (hr) | [cPBT] (g/L) |
|---|---|
| 0.0333 | 0.815 |
| 0.08333 | 1.59 |
| 0.16667 | 2.8 |
| 0.5 | 5.91 |
| 1 | 7.90 |
| 2 | 9.21 |
| 4 | 9.89 |
| 20 | 10.50 |

Example 10

Depolymerization of Polymerized Linear Oligomers at Higher Temperatures in Plug Flow Coils PBT was dissolved in oDCB at 180° C. to yield a 0.07M solution, and approximately 20 ml of the 4 L polymer solution was removed as distillate to dry the system. The solution was then allowed to cool to 20° C., and an organo titanate catalyst solution of freshly prepared Ti(BD:HG) (4:1) in oDCB was added. The resulting slurry was pumped through 3/8"×20' coils, which were submerged in 245° C. oil baths. The coils were connected to a pressure can held at 80 psi to maintain adequate backpressure in the system to prevent the oDCB from vaporizing in the reactor coils. The flow rate of the slurry through the coils was controlled to give average residence times of approximately 10 to 12 minutes in each 20' coil.

Samples were taken at one-hour intervals from the outlet of each reactor coil to determine the cPBT yield in the continuous reaction system. (This was determined using a HPLC method similar to that described in Appendix D.) The polymers from experiments LP# 1, 3, 9, 11, and 13 of Example 7 (Table 8) were combined to evaluate the polymer formed from the titanium-free linear oligomers and the polymers from experiments LP#6, 7, 10, 12, and 14 of Example 7 (Table 8) were combined to evaluate the effect of having 10% crude linear oligomers mixed with titanium-free linear oligomers. Results from the analyses indicated that each polymer resulted in an average yield of 9.3 g/L of cPBT under these reaction conditions.

Further Discussion of Experimental Results

Part I: Low Acid PBT by Solution Polymerization. Polymerization reactions of BDO and DMT are carried out in a round bottom flask in oDCB solvent at temperatures no higher than the atmospheric boiling point of oDCB (182° C.) with a trace amount (10-100 ppm) of tetraisopropyl titanate (TPT) as a catalyst. The slurry of BDO, DMT and oDCB present after formulation at room temperature forms a solution once heated to about 100° C. and DMT does not sublime from this solution making it easy to work with. DMT sublimation is often problematic in melt polymerization reactions of polyester resins, requiring special conditions and reactor designs to compensate. The methanol liberated in the condensation of monomers, along with any other volatile components which distill over head, are condensed in a chilled receiver and the composition of the collected distillate is monitored over time using gas chromatography. The reactions are maintained at about 30-50% PBT solids (higher concentrations become insoluble) for between 6 and 12 hrs, and the polymer molecular wt. is monitored over time by size exclusion chromatography (GPC). Monomer amounts are carefully formulated to the flask (via use of analytical balance), and the ratio of BDO to DMF is adjusted after completion of reaction by compensating the amount formulated for the amount of monomers distilled into receiver and the amount of BDO converted to THF. The polymer thus formed will crystallize upon cooling below 170° C. and can be formed into a powder wet cake for further analyses (acid titration and depolymerization evaluation). Detailed examples and experimental procedures that describe the techniques of solution polymerization, depolymerization to make cPBT, isolation and purification of cPBT thus prepared, and melt polymerization of cPBT thus isolated, as well as the procedures used to characterize the products and intermediates of these steps are presented herein.

Results from a series of ten solution depolymerization reactions carried out using the procedure described in the experimental section are displayed in the tables and figures. Table 2 presents the formulation variables (BDO, DMT, oDCB, and TPT catalyst) amounts used in each reaction and also presents the adjusted monomer ratio. Table 3 presents the final molecular weight of the polymer at a final reaction time (as indicated), the total amount to THF liberated from each reaction, and the level of residual acid present in each polymer as determined by potentiometric titration. Table 14 below demonstrates a relationship between the titanium catalyst concentration in the solution polymerization and both the amount of THF generated and the residual acid level.

TABLE 14

Relationship between Ti catalyst level, amount of THF generated, and residual acid level

| Example 1 Reaction # | Catalyst Level (mol % Ti) | THF Generated (mol % of BDO) | Residual Acid in polymer (Meq/kg) |
|---|---|---|---|
| 2 | 0.44 | 0.88 | 17.8 |
| 1 | 0.136 | 0.54 | 7.52 |
| 3 | 0.05 | 0.35 | 3.3 |
| 8 | 0.025 | 0.167 | 1.6 |
| 7 | 0.025 | 0.113 | 1 |
| 10 | 0.016 | 0.12 | 0.9 |

Table 15 shows the acid content of some commercially available PBT polymers for comparison with acid levels in solution polymers created in Example 1 (Table 3).

TABLE 15

Comparison of commercially-available PBTs with low-acid PBTs produced in Example 1

| Polymer | Method of producing polymer | Mw vs. PS standard (Daltons)/1000 | Residual Acid in polymer (Meq/kg) |
|---|---|---|---|
| GE Valox 315 | melt | 115 | 38 |
| GE Valox 195 | melt | 53 | 18 |
| BASF 6550 | melt | 95 | 19 |
| BASF 3550 | melt | 60 | 16 |
| Celanex 2001 | solid state | 125 | 7 |
| Reaction 10 (Example 1) | in solvent | 67 | <1 |

Figure 12:
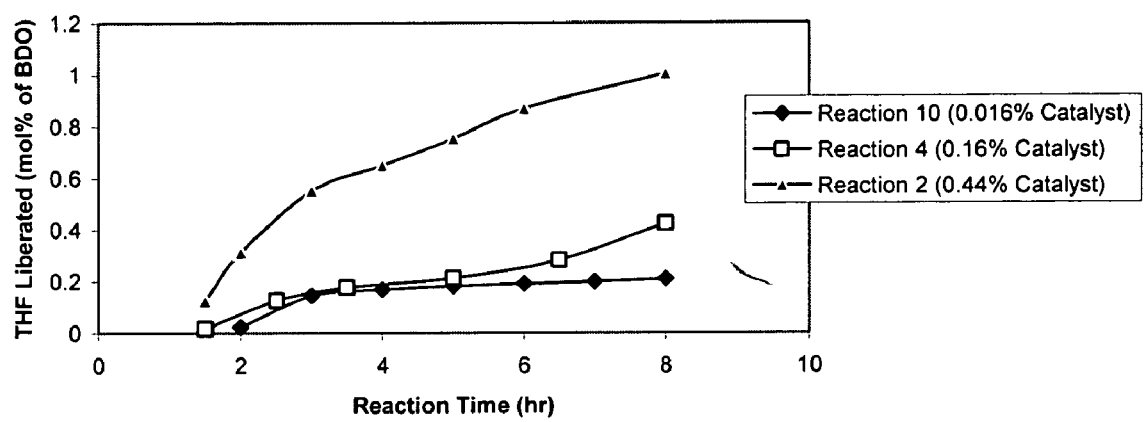
FIG. 12 is a graph showing tetrahydrofuran (THF) generated during the course of solution polymerization using three different catalyst levels, according to an illustrative embodiment of the invention.

FIG. 12 displays how THF is liberated over time in polymerizations of Example 1 with different catalyst levels. Since THF is liberated by its release from a hydroxyl butylester and the corresponding formation of an acid, the rate of THF liberation corresponds approximately proportionally to the rate of acid formation in the system. The fact that residual acid levels increase with increasing rates of THF formation suggests that esterification of acids thus formed is less impacted by raising catalyst concentration than THF formation. This may also predict how residual acid levels in solution PBT vary with the catalyst concentration. The range of levels of titanium catalyst that provide low acid PBT under these reaction conditions can be determined.

FIGS. 13A, B, and C show titration curves produced from acid analysis of a blank (A), a commercial polymer (GE Valox 315) (B), and a low acid polymer produced by the method of Example 1 (Reaction 10) (C). Because the titration volume required for the blank to reach the potentiometric endpoint (−60 mv) is about 0.17 ml, and because titration volumes for the low acid polymer are all below 0.5 ml, it follows that actual acid levels are at least about 30% less than the reported uncorrected levels. Thus, the acid level in solution PBTs made at 40% solids in oDCB at 182° C. with 0.015-0.03 mol % titanium as TPT (13-26 ppm wt/wt Ti) is consistently less than or equal to 1 Meq/Kg, which represents >85% reduction in acid as compared to the lowest acid PBT commercially available.

Results indicate THF formation and residual acid level in the polymer are strongly influenced by catalyst and that titanium in the 13-26 ppm range is not only useful for preparation of very low acid polymer, but the level of THF generated (expressed as mole % of the formulated BDO) is consistently below 0.3%. Thus, BDO lost as THF in solution polymerization is consistently in the range of 0.3 to 0.1%, which represents an increase in BDO usage efficiency of 97 to 90% as compared to a standard melt polymerization process.

Part II: cPBT Formation from Depolymerization of Ultra Low Acid PBT. Depolymerization reactions to form cPBT from dilute solutions of PBT are carried out in the same apparatus as the solution polymerizations, only at a polymer concentration in the range of 0.75 to 1.5% instead of 30-50%. The polymer is again taken to ring-chain equilibrium in the presence of an organo titanate catalyst in oDCB solvent. For ease of comparison, all reactions were carried out at atmospheric boiling point of oDCB (182° C.). The procedure (details in Example 2 above) involves dissolution of polymer at set concentration, heating to reflux, removal of small portion of the solvent overhead to insure dryness, then addition of catalyst as a solution in oDCB and following the formation of cPBT over time by a calibrated HPLC method. Equilibration is generally quite fast provided an effective level of catalyst is present, with reactions nearing completion in 1 to 1.5 hrs at 180° C. (much faster at higher temperatures as preliminary data indicate that rate approximately doubles every 12-15° C.). If reactions are sampled within the first 10-15 minutes after catalyst is added, then a plot of cPBT concentration versus time will be approximately linear and the slope of that line will be a measure of the initial rate of cPBT formation in g/L/hr. In an effective range of catalyst levels, a plot of initial rate of cPBT formation versus catalyst level will also be approximately linear, so that it is possible to experimentally ascertain the rate of cPBT formation as a function of catalyst level. The results shown in Tables 4 and 5 of Example 2 demonstrate the dramatic difference in both initial rate of cPBT formation and effective catalyst ranges exhibited by different PBTs as a function of their acid content. Additionally, the data show that as catalyst level is decreased, the level of hydroxyl butylester linear oligomers in the reaction is approximately proportionally decreased as well. Because these species are the major impurities in the cPBT process, and because they must be converted back to acids so they can be removed from the cPBT in a purification step, the ability to reduce catalyst concentration has the benefit reducing impurities in the production of cPBT.

Results from depolymerization reactions of several commercial PBTs and several PBTs prepared by solution polymerization appear in Tables 4 and 5 of Example 2. Tables 4 and 5 list initial rates of cPBT formation for various catalyst levels and for different commercially available PBTs (melt and solid state polymers) and low acid PBTs prepared by polymerization in solvent as described herein. Table 5 presents initial rates at different catalyst levels for different polymers that contain various levels of residual acid. FIG. 11 shows how residual bis hydroxyl butylester species vary as a direct function of catalyst used to prepare cPBT.

As shown by these experiments, there are advantages of using very low acid PBT (prepared by solution polymerization methods described herein) as raw material to prepare cPBT by the solution depolymerization process described herein. When compared to a low acid version of a melt PBT such as BASF 6550 grade resin, (with an effective catalyst concentration is about 0.85 mM) an 80% reduction of catalyst level is possible while maintaining an effective level to reach equilibrium (about 0.15 mM for solution PBT), and a higher initial rate (16.3 vs. 13.5 g/L/hr) is obtained using about one half the catalyst concentration (0.47 mM vs. 0.85 mM). When compared to a very low acid commercially-available polymer, Ticona's Celanex 2001 grade solid state resin, the initial rate is twice as high (16.3 vs. 8.0) at the low end of effective catalyst concentration for Celenex (0.47 mM) but the effective catalyst range for a solution PBT extends to about 0.15 mM or a 3× reduction. By virtue of its very low acid content, PBT prepared by the solution polymerization processes described herein offers a 2 to 4 times enhancement in cPBT formation rate enhancement, or a 60-80% catalyst reduction as compared to commercially available state of the art polymers prepared by prior methods.

Another advantage of using low catalyst to prepare cPBT is illustrated in FIG. 11. The level of bishydroxy butylesters (diol dimer) in the depolymerization reaction is approximately directly proportional to the catalyst level employed in the reaction. The ability to use lower catalyst levels has the added benefit of making cPBT with lower level of impurities, which in turn leads to a more cost efficient process.

Part III: Improved Process Example of Monomers=>Polymer=>cPBT=>Polymer. Solution polymerization Reaction #10 described in Example 1 was taken onto depolymerization in Example 2 (see Table 4, last entry), and then through isolation and purification of cPBT (see Example 3). Then, the isolated cPBT was melt polymerized back to PBT polymer with high molecular weight (see Example 3), similar to that of PBT polymer produced from the melt polymerization of cPBT that has been prepared by depolymerization of commercially-available PBT. This experiment demonstrates the cycle beginning with starting materials (BDO, DMT, and TPT), making low-acid PBT by solution polymerization of the starting materials, converting the PBT to cPBT, and polymerizing the cPBT into PBT polymer. cPBT produced by solution polymerization methods described herein is fully comparable to cPBT prepared from commercially available PBTs, as melt polymerization of such cPBT yielded PBT with similarly high molecular weight (178,000 Daltons, as shown in Example 3). This also demonstrates significant improvements to the basic cPBT process, some of which would not be possible without the very low acid PBT being available as the depolymerization feedstock.

The basic process currently used to prepare cPBT typically requires depolymerization with specialty organo titanate catalysts at high temperature (>240° C.). This provides cPBT along with some amount of acid terminated linears which must be "polished" from filtrate streams to afford pure cPBT. Some issues with this process include: 1) relatively high catalyst levels required (1-3 mol % of PBT or about $0.05-$0.15/lbs of cPBT); 2) High hydroxyl butylester levels from the catalyst and thus high acid levels in filtrate (typically 0.5-1.5 mol % acid in filtrate from this process); 3) high acid levels require large amount of basic alumina (about 1 lb of alumina for 10-30 lbs of cPBT treated or a cost of about $0.02-$0.06/lbs of cPBT) or use of another acid absorption technology (ion exchange); and 4) filtration of linear precipitates from this process is very difficult as the combination of high acid, high temperature and high titanium concentration lead to gellular solids.

Hydroxyl butylester slowly reacts to form THF and carboxylic acid at 182° C., and the linears which precipitate from depolymerization reaction solutions upon cooling are not gellular in nature. Thus, filtration operations are dramatically improved as compared with the current high temperature/high acid/high catalyst process. In addition, the level of residual acids in the filtrate from the improved process is reduced by 80-90%, which in turn cuts purification costs in roughly direct proportion.

The conversion of monomers to PBT and that PBT, in turn, to cPBT reduces the required capital equipment and material usage in the PBT production stage. Furthermore, by virtue of the unique composition of the PBT so produced (i.e. low acid), the capital equipment and material usage is also reduced in the cPBT production stage.

Table 16 below is a comparison of results from processing commercial PBT by a standard depolymerization process and processing solution PBT (reaction #14) by the process described herein (Reaction 10, Example 1 polymerization, then follow-on depolymerization in Example 2).

TABLE 16

Improvements of Depolymerization with Low Temperature/ Low Catalyst/Low Acid PBT

| Area of Comparison | cPBT process using Melt PBT | cPBT process w/ solution PBT |
|---|---|---|
| Acid in Polymers (Meq/Kg) | 7-40 melt vs. solid state | 1 or <1 |
| Catalyst Required (mol %) | 1-3% vs. PBT | 0.2-0.7% vs. PBT |
| Filter Flux (Kg/m$^2$/hr) cPBT | 10-30 | 200-1000 |
| Acid in Filtrate (mol % vs. cPBT) | 0.5-1.5% | 0.1% |
| Alumina Required(lbs/lbs cPBT) | 0.03-0.1 | <0.005 |

Certain examples herein pertain to synthesis and use of PBT in solution as, essentially, an intermediate in a cPBT production process. In these examples, the PBT has been shown to contain significantly reduced residual acid levels and better processing behavior as compared to any other PBT made by conventional means. The low acid PBT, once prepared in solution, can be isolated and used as an engineering thermoplastic resin. Without stabilization of some sort, extrusion and molding operations may lead to in-situ generation of acids by known decomposition pathways, but with common methods of stabilization used during these operations, isolated PBT can be produced with acid levels unattainable in any other way. Correspondingly, there may be improvements in polymer properties, like hydrolytic and thermal stability, that are known to be affected by acid levels.

Part IV: Demonstrating recyclability of linears. To demonstrate a range of conditions suitable for the recovery of linears back to polymer, experiments of Example 7 were designed to utilize combinations of titanium free linears and crude linears in a range of 0-100%. To investigate the reaction time required, polymerization times were varied from 4-14 hrs, and experiments were conducted (i) using 100% Ti-free linears and (ii) using linears which contained 10% crude linears. In total, 14 linear polymerizations were conducted following the procedure of Example 7 and reaction variables (reaction times, linear compositions and amounts of BDO added) are contained in Table 8. FIGS. 14A-14D show plots of molecular weight of the polymer as a function of reaction time for Reactions LP1 to LP8. FIG. 14A compares two reactions both with Ti-free linears, but using different amounts of BDO; FIG. 14B compares two reactions both with 100% crude linears, but using different amounts of BDO; FIG. 14C compares four reactions each with 1.0 g BDO, but using different proportions of crude linears/Ti-free linears; and FIG. 14D compares three reactions each with 0.5 g BDO, but using different proportions of crude linears/Ti-free linears. The composition of the linears used (acid content, Mw and % cPBT) is contained in Table 7. For the Ti-free linears which contained 237 mmol/Kg of acid by titration analysis, the equivalent amount of diol required for 40 g would be 4.74 mmol or 0.427 g. Thus, using 0.5 g (5.55 mmol) of BDO represents an 18% excess of diol to acid and 1 g of BDO (11.1 mmol) represents a 134% excess of diol. Considering that 40 g of polymer is produced (181.8 mmol based on monomer repeat units), then the excess of BDO to polymer is 0.45% at 0.5 g BDO and 3.5% when 1 g of BDO is used. This represents a very similar range of excess BDO levels that have been shown to be effective in solution polymerization from pure monomers (without linear oligomers) as shown in the experimental reactions of Example 1.

In reactions in Table 8 which used 100% crude linears, the level of titanium in the polymerization reaction is very high compared to when Ti-free linears are used. Considering that 3 mol % titanium was used in the de-polymerization reaction (which, upon filtration, gave a 70% yield of cPBT) and considering that all the titanium remained with the 30% linears fraction, the amount of titanium in the crude linears is around 9 mol %. This is much higher than the amount of titanium in the reactions with Ti-free oligomers—only 0.015% (the Ti from the 15 mg of TPT). The high Ti levels in the crude linears affect the amount of BDO which decomposes to THF during the polymerization. For instance, in Reaction LP2 in Table 8 in which only crude linear oligomers was used, 1 g of added BDO was insufficient to fully react with all the acids (only 71% conversion of linears to polymer). However, in Reaction LP1 in Table 8 in which only Ti-free linear oligomers were used, 1 g of BDO gave the expected result of low Mw PBT (18K), since very little of the BDO decomposed. In reaction LP4 in Table 8 in which 2.3 g of BDO was added to the crude linears, full conversion of linears was achieved, although residual acid was high at 22.7 mmol/Kg in the polymer. With the Ti free linears used in reaction LP3 in Table 8, 0.5 g BDO allowed the polymer to build to high Mw (73K) and the final polymer was low in acid at 1.2 mmol/Kg. Therefore, at least in one embodiment, it is preferable to re-polymerize Ti-free linears, since they require less BDO and give lower acid polymer. However, re-polymerization of crude linears can be achieved to give polymer suitable for use in making cPBT.

The effect of lower levels of crude linears (5-20%) is less severe. In all cases in which reactants included 5-20% crude linear oligomers, (reactions LP 7 to LP 14), 0.5 g BDO was adequate to produce low acid polymer of high Mw. In fact, having higher levels of Ti in the system from the crude linears speeds up the condensation polymerization as is evident by examining the rates of Mw builds with time for these reactions compared to reactions with Ti free linears, as seen in FIGS. 14C and 14D. Note that in reaction LP 9 (Ti free linears, 0.5 g BDO 4 hrs), the residual acid in the polymer is 16.3 mmol/Kg, while in reaction LP 10 which used 10% crude linears, the residual acid at 4 hrs was much less—3.8 mmol/Kg. The data show that a 7 hr reaction time is generally adequate to produce low acid PBT when Ti free linears are used. In general, linears containing 0-20% crude linears require 4-7 hrs to produce low acid PBTs when about 0.5 g/40 g of BDO/(linear oligomer recyclate) is used in the re-polymerization.

The experiments described in Example 9 (Tables 11, 12, and 13) show that polymer prepared by polymerizing linears to high molecular weight polymer is capable of being used to prepare cPBT. The yield of cPBT was very similar for all experiments—the yield generally ranged from 9-10 g/L where de-polymerizations were conducted with 3% Ti catalyst. Commercial PBT (BASF 6550, for example) typically yields 9.6-10 g/L cPBT under identical de-polymerization conditions.

Figure 9:
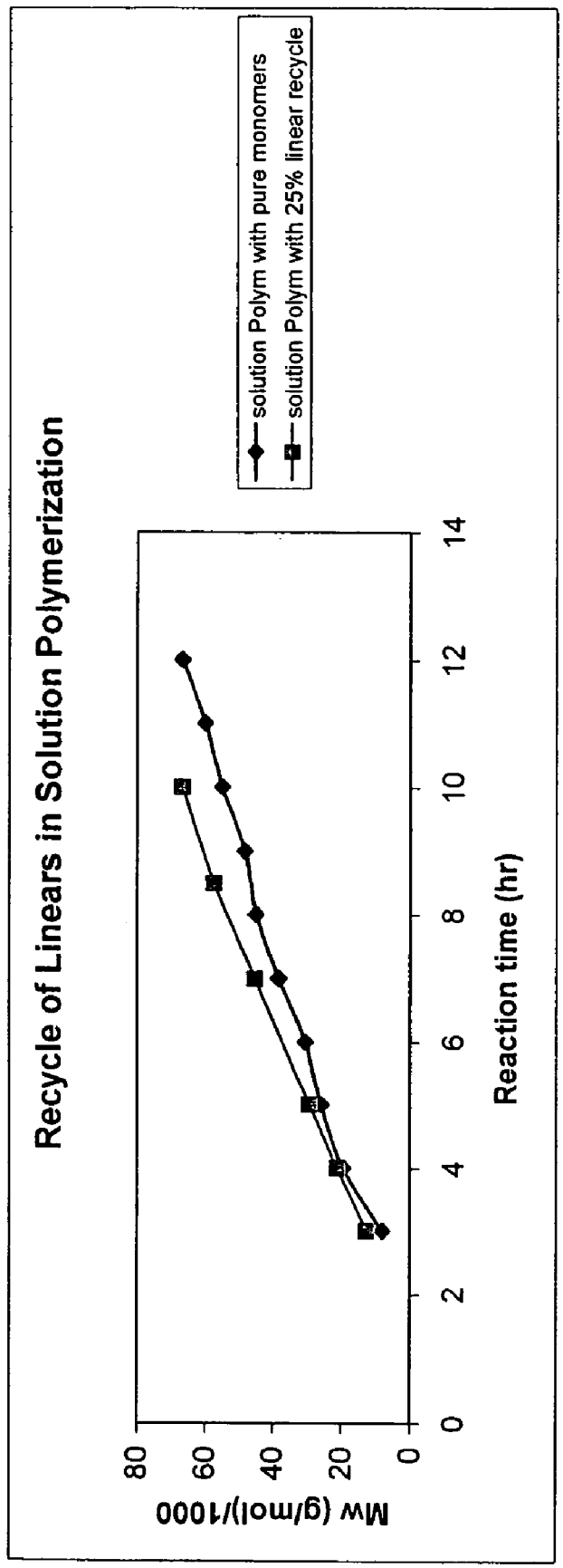
FIG. 9 shows a graph of molecular weight of PBT (obtained by gel permeation chromatography) as a function of reaction time, thereby comparing polymerization using pure monomers as reactants versus using a combination of pure monomers and a linear oligomer recyclate, according to an illustrative embodiment of the invention.

FIG. 9 shows the results of experiments described in Example 8. Here, solution polymerizations were performed (i) using pure monomers (monomers without linear oligomer recylate) and (ii) using monomers with 25 wt % Ti-free linear oligomer recyclate. These examples demonstrate that linear recovery can be done either in a separate process (experiments LP1-LP14) or in a process combined with monomer polymerization. The effective range of conditions that are capable of producing low-acid PBT that is effective for use as a depolymerization feedstock includes essentially any composition of Ti-free or crude linears and any proportion of linears and monomers.

Finally, Example 10 describes depolymerization reactions performed at elevated temperatures to mimic operation conditions of a commercial process. These experiments were performed with polymer prepared from Ti-free linears and polymer from 10% crude linears. No issues with de-polymerization chemistry were noticed. Thus, polymers from recycled linears can be used to prepare cPBT over the full range of practical depolymerization conditions. Polymers made from re-polymerization of linears are substantially indistinguishable from polymers prepared from monomers in the solution polymerization method described herein.

APPENDICES

Appendix A: GPC Method to Determine the Molecular Weight of PBT Polymers

The solution from Example 1 was allowed to cool into a powder wetcake. A roughly 20 to 50 mg sample of the wetcake was then charged into a 5 ml vial containing a small magnetic stir bar. Approximately 1 ml of a 25/75 v/v hexafluoroisopropanol ("HFIP")-methylene chloride solution was added to the vial. The sample was stirred with slight warming until the wetcake completely dissolved. About 4 ml of chloroform was then added to the vial, and the resulting solution filtered through a 0.45 μm syringe filter into an autosampler vial.

An Agilent 1100 HPLC system manufactured by Agilent Technologies, Inc. of Palo Alto, Calif., was used for the analysis and included the following components: solvent degasser, pump, autosampler, column oven, ChemStation software, GPC add-on module to perform molecular weight calculations, chloroform recycling system, and Phenomenex Phenogel 5 μm linear columns (2 in series; 300×7.8 mm (L×diameter), P/N 00H-3259-KO). The system was set for a 1 ml/min chloroform flow rate through the columns, a pump pressure of around 20 to 30 bar, a 1 μL sample injection size, a 40° C. column oven temperature, and a 254 nm wavelength. The system was calibrated using polystyrene standards of known molecular weights.

The GPC software calculates several values, including the number average molecular weight (Mn), the weight average molecular weight (Mw), and the peak molecular weight (Mp).

Appendix B: GC Analysis of the Distillate

Approximately 1 g of a solution of n-dodecane ("DoD") in oDCB (6.383 mg DoD/g of oDCB) was added to a sample of distillate collected in the receiver flask of Example 1. The resulting sample was then injected into an Agilent Technologies 6890N Network gas chromatograph system, manufactured by Agilent Technologies, Inc. of Palo Alto, Calif., that was equipped with a Chem. Station analysis software package. The column used with the GC was an Agilent HP-5 30M column with a 0.32 mm inner diameter and 0.25 mm film thickness. The injection volume was 0.2 ml with a split ratio of 100:1 and a split flow of 206 ml/min. The oven temperature was held at 60° C. for two minutes, increased at a rate of 10° C./minute to 90° C., and then, increased at a rate of 40° C./min to 240° C. Calibration standards were synthetically prepared to determine the retention times and response factors of all of the compounds of interest. (See Table A.) The response factor is defined as the $(mg/area)_{compound}/(mg/area)_{DoD}$.

TABLE A

Analysis of Calibration Standards

| Compound of Interest | Retention Time (min) | Response Factor vs. DoD |
|---|---|---|
| Methanol | 1.59 | 3.185 |
| Isopropyl alcohol | 1.68 | 1.957 |
| Tetrahydrofuran | 2.071 | 1.580 |
| 1,4 butanediol | 4.95 | 2.071 |
| Dodecane | 7.12 | 1 |
| 1,3 dichlorobenzene | 5.79 | 1.681 |
| 1,4 dichlorobenzene | 5.89 | 1.681 |
| 1,2 dichlorobenzene | 6.14 | 1.681 |
| 1,4 dimethyl terephthalate | 8.47 | 1.804 |

Appendix C: Potentiometric Titration Method to Determine Residual Acid in PBT

Approximately 1 g of distillate was charged into a 125 ml Erlenmeyer flask containing a magnetic stir bar. 25 ml of o-cresol solution (75 vol. % o-cresol in methylene chloride ($CH_2Cl_2$)) was then added to the flask, and the resulting solution warmed and stirred until the distillate completely dissolved. The solution was allowed to cool to room temperature, and then, transferred to a 100 ml plastic beaker for autotitration.

A Mettler Toledo DL50 autotitrator system manufactured by Mettler Toledo of Columbus, Ohio was used to analyze the distillate. The system included a Mettler Toledo DG113-SC glass electrode (stored in a 1 M LiCl in ethanol solution) and a computer running LabX software for titrator remote control. Tetrabutylammonium hydroxide ("TBAOH") was used as the titrant (2.50 ml of 1.0 N TBAOH solution in water was diluted to 250 ml with 2,2,2-trifluoroethanol ("TFE")). The TBAOH titrant normality was standardized using 5.0 mg of monomethyl hydroxyterephthalate ("MHT") (0.050±0.001 g (0.278 mmol) MHT was placed in a 100 mL volumetric flask and diluted to 100 mL with MeOH).

Appendix D: HPLC Method to Determine cPBT Concentration in Depolymerization Reaction Approximately 1 g of a solution of n-dodecane ("DoD") in oDCB (6.383 mg DoD/g of oDCB) was added to a sample of solution collected in Example 5. The resulting sample was then injected into a Hewlett Packard 1050 series HPLC system, manufactured by Hewlett Packard of Palo Alto, Calif., that was equipped with a HPLC reverse phase column (Zorbax Eclipse XDB-C8 4.6 mm×15 cm). The system is calibrated using pure cPBT dimers dissolved in solutions of phenanthrene in THF. A sample containing about 10 to 20 mg of cPBT was charged to a vial. Using a 5 ml volumetric pipette, 5.00 ml of an approximately 15.8 mg/L solution of phenanthrene in THF was added to the vial to dissolve the cPBT. The sample was then filtered through a 0.2 μm filter into a HPLC vial. A 3 to 5 μL sample was injected using an acetonitrile:water gradient which ramped from 50:50 to 100:0 over 18 minutes, and then, held at 100% MeCN for 4 minutes before being returned to initial conditions over the next 2 minutes.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

The invention claimed is:

1. A method for preparing a low-acid polybutylene terephthalate product, the method comprising the step of reacting butanediol with dimethylterephthalate in an organic solvent in the presence of a catalyst at a temperature no greater than about 240° C. and at a pressure no less than about atmospheric pressure.

2. The method of claim 1, wherein at least one of transesterification and polycondensation takes place during the reacting step.

3. The method of claim 1, wherein polycondensation takes place during the reacting step.

4. The method of claim 1, wherein both transesterification and polycondensation take place during the reacting step.

5. The method of claim 1, wherein the organic solvent comprises ortho-dichlorobenzene.

6. The method of claim 1, wherein the reacting step is conducted at a temperature no greater than about 210° C.

7. The method of claim 1, wherein the reacting step is conducted at a temperature no greater than about 190° C.

8. The method of claim 1, wherein the reacting step is conducted at about atmospheric pressure.

9. The method of claim 1, wherein the catalyst comprises an organotitanate.

10. The method of claim 9, wherein the catalyst is present in the mixture at a concentration within a range from about 0.01 mol Ti to about 0.03 mol Ti per 100 mol monomer repeat units.

11. The method of claim 1, wherein the polybutylene terephthalate product has an acid concentration of less than about 7 meq/kg.

12. The method of claim 1, wherein the polybutylene terephthalate product has an acid concentration of less than about 5 meq/kg.

13. The method of claim 1, wherein the polybutylene terephthalate product has an acid concentration of less than about 2 meq/kg.

14. The method of claim 1, wherein less than 1 wt. % of the butanediol reacts to form tetrahydrofuran in the reacting step.

15. A polymer product formed by the method of claim 1.

16. A method for preparing a macrocyclic polyester oligomer, the method comprising the step of heating a polybutylene terephthalate polymer having an acid concentration no greater than about 10 meq/kg in an organic solvent in the presence of a depolymerization catalyst.

17. The method of claim 16, wherein the organic solvent comprises ortho-dichlorobenzene.

18. The method of claim 16, wherein the depolymerization catalyst comprises titanium and the concentration of the depolymerization catalyst in the mixture is less than about 2 mol Ti per 100 mol monomer repeat units.

19. The method of claim 18, wherein the concentration of the depolymerization catalyst in the mixture is within a range from about 0.25 mol Ti to about 1.25 mol Ti per 100 mol monomer repeat units.

20. The method of claim 16, wherein the polybutylene terephthalate polymer has an acid concentration of less than about 7 meq/kg.

21. The method of claim 16, wherein the polybutylene terephthalate polymer has an acid concentration of less than about 5 meq/kg.

22. The method of claim 16, wherein the polybutylene terephthalate polymer has an acid concentration of less than about 2 meq/kg.

23. A method for preparing a macrocyclic polyester oligomer, the method comprising the steps of:

(a) reacting a diol with at least one member selected from the group consisting of an acid, an ester, a diacid, a diester, a dicarboxylic acid, and a dialkyl ester in an organic solvent in the presence of a catalyst at a temperature no greater than about 240° C. and at a pressure no less than about atmospheric pressure, thereby forming a mixture comprising low-acid polymer solids;

(b) maintaining a concentration of polymer solids in the mixture within a first range;

(c) reducing the concentration of polymer solids following step (b); and (d) maintaining the concentration of polymer solids in the mixture within a second range in the presence of heat, thereby producing a macrocyclic polyester oligomer.

24. The method of claim 23, wherein step (b) produces a polyester having an acid concentration no greater than about 7 meq/kg.

25. The method of claim 23, wherein step (b) produces a polyester having an acid concentration no greater than about 2 meq/kg.

26. The method of claim 23, wherein step (a) is conducted at a temperature no greater than about 210° C.

27. The method of claim 23, further comprising the step of purifying the macrocyclic polyester oligomer.

28. The method of claim 23, wherein the mixture following step (d) comprises substantially non-gellular precipitated linears.

29. The method of claim 23, wherein the organic solvent comprises ortho-dichlorobenzene.

30. A continuous process for preparing a macrocyclic polyester oligomer, the process comprising:

a first unit operation having an output stream, wherein the first unit operation is configured to react 1,4-butanediol with dimethylterephthalate in an organic solvent in the presence of a catalyst at a temperature no greater than about 240° C. and at a pressure no less than about atmospheric pressure, thereby forming low-acid polymer solids; and a second unit operation having an input stream that comprises at least a portion of the output stream of the first unit operation, wherein the second unit operation is configured to react its contents in the presence of heat, thereby producing a macrocyclic polyester oligomer.

31. A method for preparing a low-acid polybutylene terephthalate product, the method comprising the step of reacting butanediol with dimethylterephthalate or terephthalic acid or both in an organic solvent in the presence of a catalyst at a temperature no greater than about 240° C. and at a pressure no less than about atmospheric pressure.

32. The method of claim 1, wherein the organic solvent comprises at least one member selected from the group consisting of xylene, methylene chloride, chlorobenzene, naphthalene, toluene, tetramethylbenzene, and methylnaphthalene.

33. The method of claim 1, wherein the organic solvent comprises an alkane.

34. The method of claim 33, wherein the organic solvent comprises at least one member selected from the group consisting of tetradecane and hexadecane.

35. The method of claim 1, wherein the organic solvent comprises a perfluoro compound.

36. The method of claim 35, wherein the organic solvent comprises at least one member selected from the group consisting of perfluoro(tri-n-butylamine) and perfluoro(tri-n-pentylamine).

37. The method of claim 1, wherein the reacting step is conducted at about the boiling point of the organic solvent.

38. The method of claim 1, wherein the polybutylene terephthalate product has an acid concentration of less than about 10 meq/kg.

* * * * *